(12) United States Patent
Yoden

(10) Patent No.: US 11,477,516 B2
(45) Date of Patent: Oct. 18, 2022

(54) SERVICES OVER WIRELESS COMMUNICATION WITH HIGH FLEXIBILITY AND EFFICIENCY

(71) Applicant: Koji Yoden, Tamba (JP)

(72) Inventor: Koji Yoden, Tamba (JP)

( * ) Notice: Subject to any disclaimer, the term of this patent is extended or adjusted under 35 U.S.C. 154(b) by 491 days.

(21) Appl. No.: 16/383,574

(22) Filed: Apr. 13, 2019

(65) Prior Publication Data

US 2019/0320219 A1 Oct. 17, 2019

Related U.S. Application Data

(60) Provisional application No. 62/656,990, filed on Apr. 13, 2018.

(51) Int. Cl.
*H04N 21/436* (2011.01)
*H04N 21/433* (2011.01)
*H04N 21/422* (2011.01)
*H04W 8/00* (2009.01)
*H04N 21/485* (2011.01)

(52) U.S. Cl.
CPC ..... *H04N 21/436* (2013.01); *H04N 21/42204* (2013.01); *H04N 21/4331* (2013.01); *H04N 21/4858* (2013.01); *H04W 8/005* (2013.01); *H04N 21/4333* (2013.01)

(58) Field of Classification Search
None
See application file for complete search history.

(56) References Cited

U.S. PATENT DOCUMENTS

| | | | | |
|---|---|---|---|---|
| 7,246,367 B2 * | 7/2007 | Iivonen | ............ | H04N 21/23106 725/86 |
| 8,046,801 B2 * | 10/2011 | Ellis | ............ | H04N 21/4821 725/38 |
| 8,307,395 B2 * | 11/2012 | Issa | ............ | G06Q 10/10 725/54 |
| 8,392,947 B2 * | 3/2013 | Grannan | ............ | H04N 7/186 725/50 |
| 8,479,238 B2 * | 7/2013 | Chen | ............ | H04N 7/17336 725/86 |
| 9,037,683 B1 | 5/2015 | Yoden | | |
| 9,112,849 B1 * | 8/2015 | Werkelin Ahlin | ...... | H04L 63/10 |
| 9,253,430 B2 * | 2/2016 | Levine | ............ | H04N 21/4438 |
| 9,615,146 B2 * | 4/2017 | Karnalkar | ............ | H04M 3/567 |
| 9,716,861 B1 * | 7/2017 | Poel | ............ | G06F 3/1454 |
| 10,068,012 B2 * | 9/2018 | Bates | ............ | G06F 16/48 |

(Continued)

*Primary Examiner* — An Son P Huynh

(57) ABSTRACT

Generally, according to aspects of the present invention, a media content item may be casted by a user equipment (UE) to another UE over a local area network (LAN). The UE (cast device) may cast a local media content item stored on the cast device to said another UE (media playback device) by streaming the local media content item to the media playback device over the LAN, so that the media playback device may play back the local media content item. The cast device may cast an online media content item stored on a remote server to the media playback device by causing the server to stream the online media content item to the media playback device over the Internet, so that the media playback device may play back the online media content item. Various embodiments of the present invention provide great efficiency and flexibility in such cast of a media content item from a UE to another UE.

14 Claims, 43 Drawing Sheets

(56) References Cited

U.S. PATENT DOCUMENTS

| | | | |
|---|---|---|---|
| 10,154,122 B1* | 12/2018 | Coburn, IV | H04L 12/2803 |
| 10,555,031 B1* | 2/2020 | Almeida | H04N 21/47217 |
| 10,664,524 B2* | 5/2020 | Sarkar | H04L 67/2804 |
| 10,715,881 B2* | 7/2020 | Qu | H04N 21/4756 |
| 10,820,034 B2* | 10/2020 | Amento | H04N 21/472 |
| 10,999,331 B1* | 5/2021 | Marchand | H04L 65/1073 |
| 2005/0262542 A1* | 11/2005 | DeWeese | H04N 7/17318 348/E7.071 |
| 2007/0157281 A1* | 7/2007 | Ellis | H04N 21/6582 725/74 |
| 2007/0220580 A1* | 9/2007 | Putterman | H04N 7/17318 348/E7.071 |
| 2008/0022322 A1* | 1/2008 | Grannan | H04N 21/43615 348/E7.086 |
| 2009/0061841 A1* | 3/2009 | Chaudhri | H04M 1/72409 455/420 |
| 2009/0210946 A1* | 8/2009 | Cohen | G06Q 30/0601 705/26.1 |
| 2011/0069940 A1* | 3/2011 | Shimy | G11B 27/105 386/296 |
| 2011/0078717 A1* | 3/2011 | Drummond | H04N 21/4821 715/764 |
| 2012/0257112 A1* | 10/2012 | Fritsch | H04N 7/15 348/580 |
| 2012/0278495 A1* | 11/2012 | Furbeck | H04N 21/6181 709/231 |
| 2013/0173765 A1* | 7/2013 | Korbecki | H04N 21/42209 709/221 |
| 2013/0219423 A1* | 8/2013 | Prickett | H04L 65/4084 725/32 |
| 2014/0068692 A1* | 3/2014 | Archibong | H04L 67/22 725/116 |
| 2014/0081954 A1* | 3/2014 | Elizarov | H04N 21/2408 707/722 |
| 2014/0269757 A1* | 9/2014 | Park | H04L 49/201 370/432 |
| 2014/0359647 A1* | 12/2014 | Shoemake | H04N 21/44008 725/10 |
| 2015/0070516 A1* | 3/2015 | Shoemake | H04N 21/4542 348/207.11 |
| 2016/0149891 A1* | 5/2016 | Kuper | H04N 21/43615 726/9 |
| 2016/0196106 A1* | 7/2016 | Hammer | H04J 3/06 381/79 |
| 2017/0185276 A1* | 6/2017 | Lee | H04L 41/22 |
| 2017/0289807 A1* | 10/2017 | Mendonca | G06F 21/629 |
| 2017/0353506 A1* | 12/2017 | Warrick | H04L 65/60 |
| 2018/0233137 A1* | 8/2018 | Torok | G06F 3/167 |
| 2018/0255332 A1* | 9/2018 | Heusser | H04H 20/18 |
| 2019/0110091 A1* | 4/2019 | Guo | H04L 67/1095 |
| 2019/0182300 A1* | 6/2019 | Simotas | H04L 65/4076 |
| 2019/0306054 A1* | 10/2019 | Iyer | H04L 45/306 |

* cited by examiner

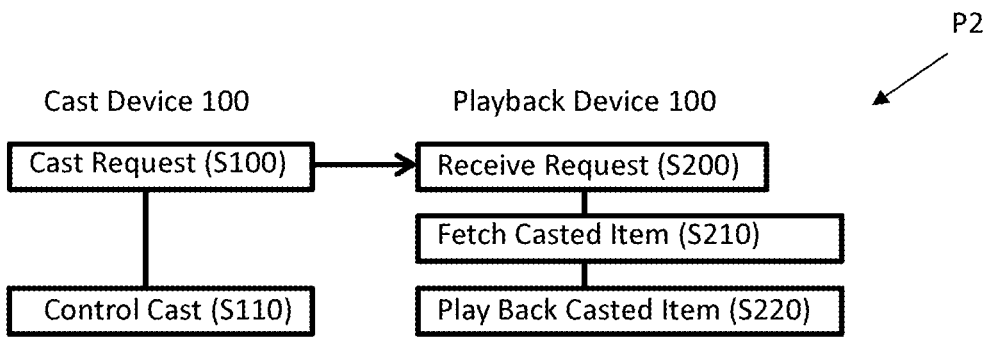
FIG. 6
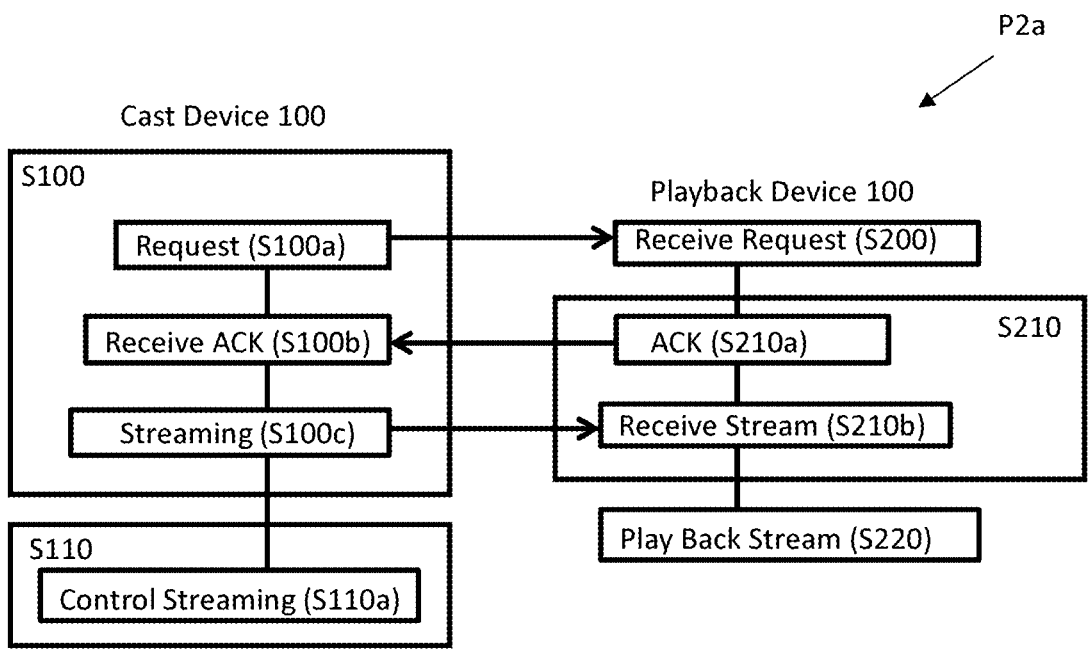
FIG. 7A
FIG. 7B

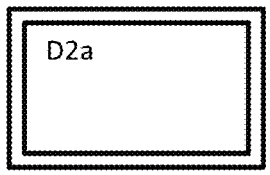
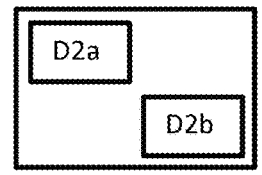
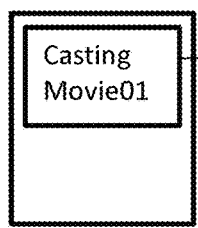
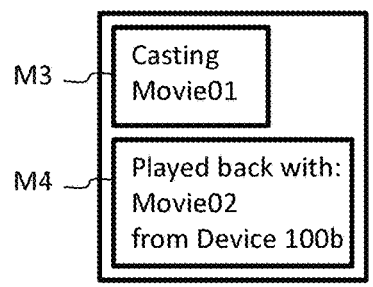
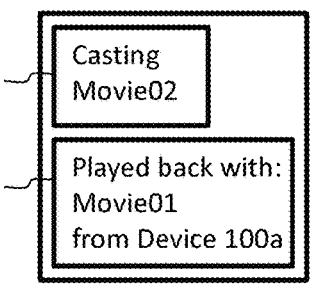
FIG. 11E
FIG. 11F
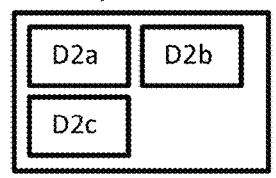
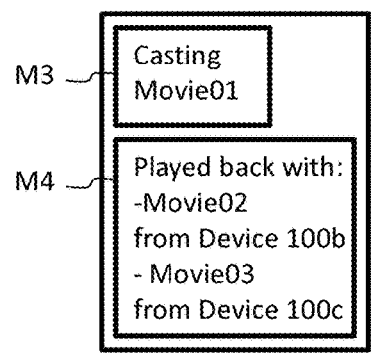
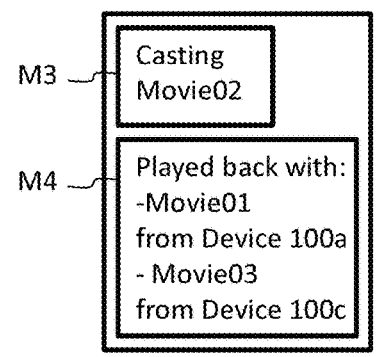
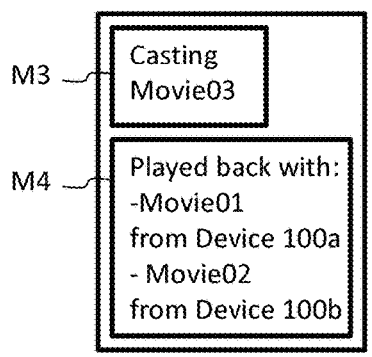
FIG. 11G

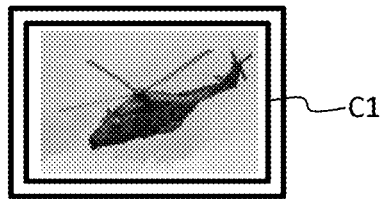
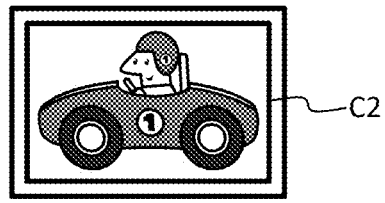
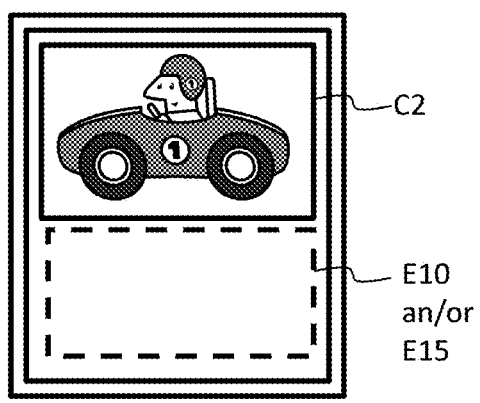
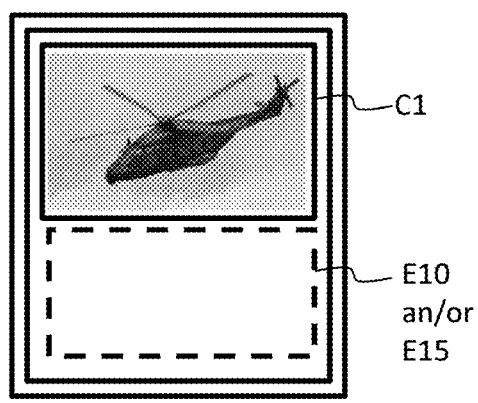
FIG. 13H
FIG. 13I
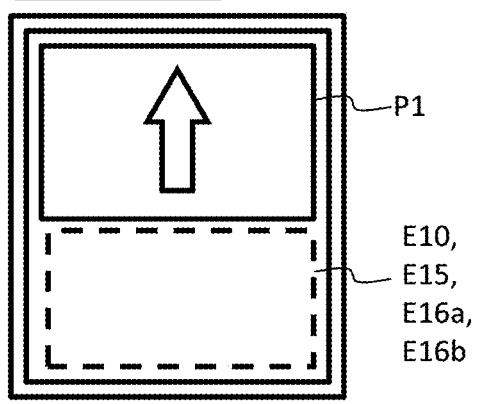
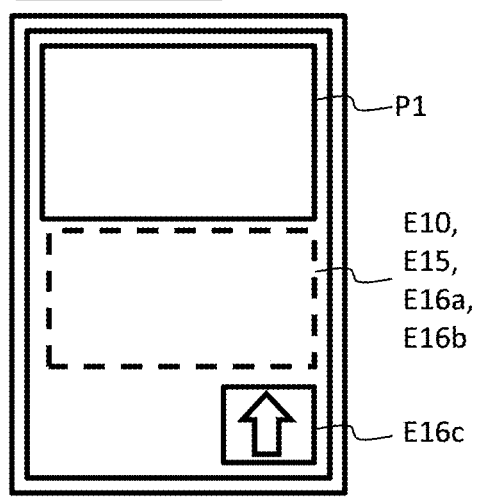
FIG. 13J
FIG. 13K 102
| Name | ID | Status | Priority |
|---|---|---|---|
| Media Playback Device 100a | aaa.bbb.ccc.ddd | Available | 2 |
| Media Playback Device 100b | eee.fff.ggg.hhh | Available | 3 |
| Media Playback Device 100c | iii.jjj.kkk.lll | Occupied | 1 |
FIG. 15A
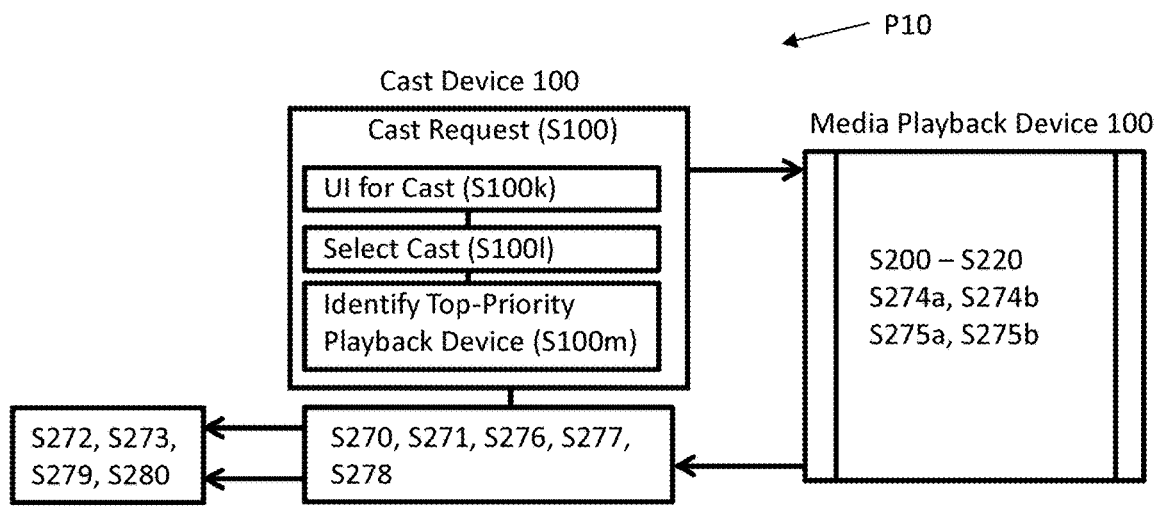
FIG. 15B
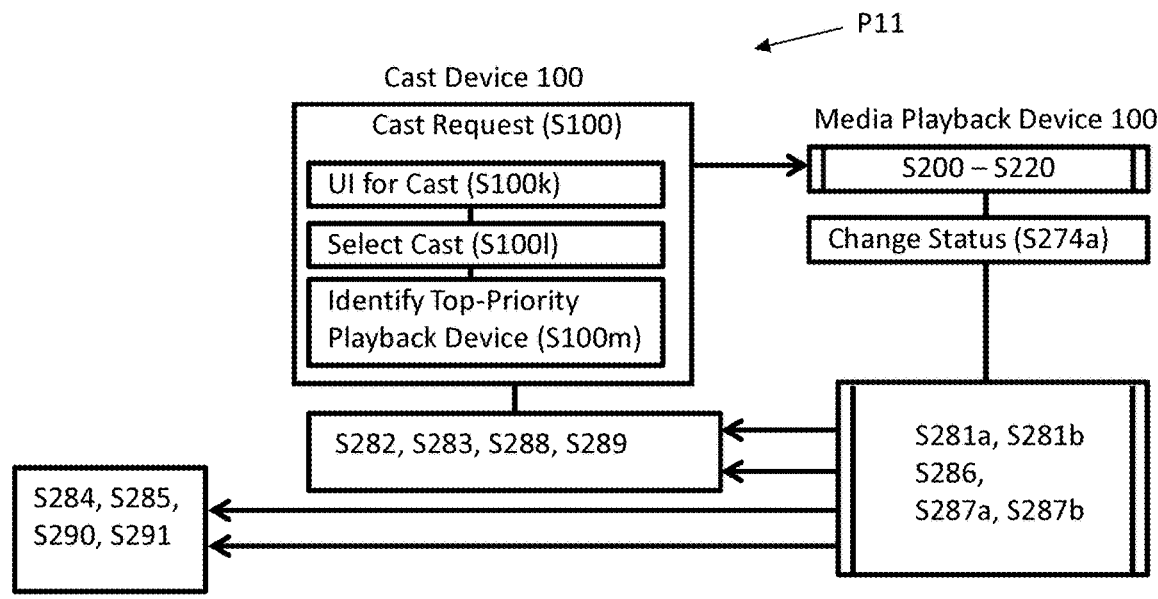
FIG. 15C 102
| Name | ID | Category | Video | Audio |
|---|---|---|---|---|
| Media Playback Device 100a | aaa.bbb.ccc.ddd | Wireless Speaker | No | Yes |
| Media Playback Device 100b | eee.fff.ggg.hhh | Smart TV | Yes | Yes |
| Media Playback Device 100c | iii.jjj.kkk.lll | Digital Picture Frame | Yes | No |
FIG. 16A
103
| Category | Video | Audio | Icon |
|---|---|---|---|
| Wireless Speaker | No | Yes |  |
| Smart TV | Yes | Yes |  |
| Digital Picture Frame | Yes | No |  |
FIG. 16B

| 102 | | |
|---|---|---|
| Name | ID | Supervisor |
| Cast Device 100A | AAA.BBB.CCC.DDD | No |
| Cast Device 100B | EEE.FFF.GGG.HHH | Yes |
| Cast Device 10C | III.JJJ.KKK.LLL | No |

102
| Name | ID | Auido In/Out |
|---|---|---|
| UE 100a | aaa.bbb.ccc.ddd | In |
| UE 100b | eee.fff.ggg.hhh | Out |
| UE 100c | iii.jjj.kkk.lll | Out |
FIG. 18A
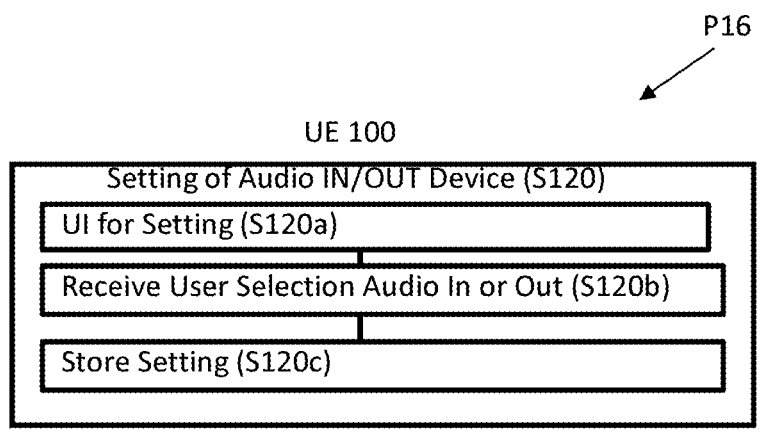
FIG. 18B
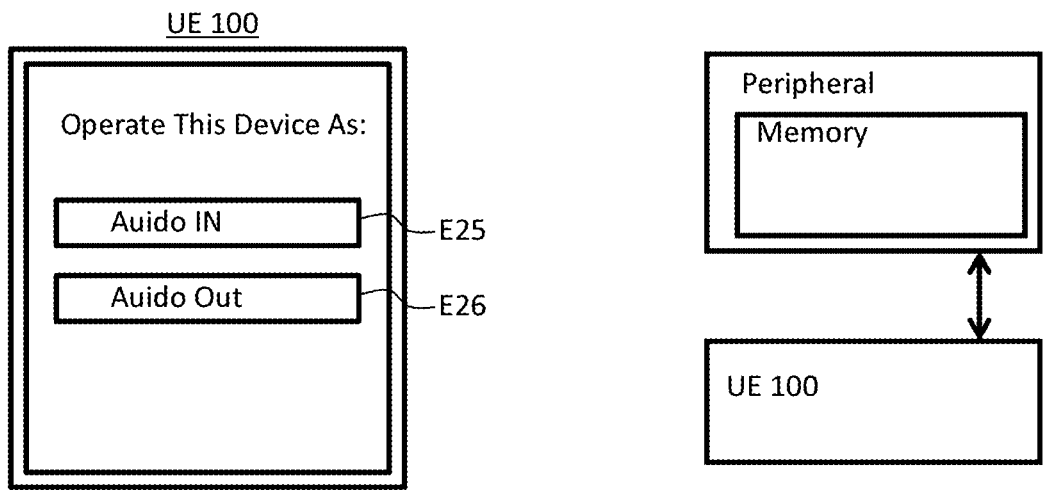
FIG. 18C  FIG. 18E

SERVICES OVER WIRELESS
COMMUNICATION WITH HIGH
FLEXIBILITY AND EFFICIENCY

CROSS REFERENCE TO RELATED APPLICATIONS

This application claims the benefit of U.S. provisional patent application 62/656,990 filed on Apr. 13, 2018 entitled "Cast of Local or Remote Resource to Second Endpoint by First Endpoint", the content of which is incorporated herein by reference in its entirety.

BACKGROUND

The present disclosure generally relates to wireless communication systems and relates methods. Particularly, the present disclosure is directed to wireless communication systems and related methods that may provide communication services over wireless communications with high flexibility and efficiency.

Today, a variety of services have been provided on wireless communication platforms as a huge amount of data is able to be conveyed over wireless communications. An example of such wireless communication platforms may be a cellular phone system, including a system pursuant to the third-generation (3G) mobile communication standard in compliance with International Mobile Telecommunications (IMT) 2000 specifications, fourth-generation (4G) mobile communication standard in compliance with IMT-Advanced specifications, fifth-generation (5G) mobile communication standard in compliance with IMT-2020, and/or beyond. In such mobile communication systems, there are provided services such as a telephone communication via a Core Network (CN) of the system for communication between distant users in a circuit-switched connection; a connection to the Internet via the CN; a voice communication using a Voice Over Internet Protocol (VoIP) server coupled to the Internet for a VoIP communication between distant users; a video and/or audio streaming using a streaming server coupled to the Internet for streaming of media content items to users. Another example of the wireless communication platforms may be a wireless local area network (WLAN) or Wi-Fi network defined by, for example, IEEE 802.11 and/or 802.15 specifications. There are provided services over a WLAN such as: discovery of devices in the same WLAN for wireless communication between the devices; and a "cast" of a media content item that enables a user's mobile device (e.g., a smartphone) in the WLAN to initiate streaming of a local or online media content item to a discovered media playback device such as a smart TV in the same WLAN for second screen experience. "Google Cast" or "Chromecast built-in" technology introduced by Google may be an example of implementation of the cast service. Aspects of the technology underlying the cast service are described, for example, in U.S. Pat. No. 9,037,683 filed in Feb. 24, 2013, entitled "Media Asset Streaming Over Network To Devices" and its continuation applications, the content of which is incorporated herein by reference in its entirety.

The present disclosure addresses improvement, enhancement, or argumentation of wireless communication services with greater flexibility and efficiency.

SUMMARY

Generally, according to aspects of the present invention, a media content item may be casted by a user equipment (UE) to another UE over a local area network (LAN). The UE (cast device) may cast a local media content item stored on the cast device to said another UE (media playback device) by streaming the local media content item to the media playback device over the LAN, so that the media playback device may play back the local media content item. The cast device may cast an online media content item stored on a remote server to the media playback device by causing the server to stream the online media content item to the media playback device over the Internet, so that the media playback device may play back the online media content item.

In some aspects of the present invention, the media playback device may configured to cache a media content item upon reception of streaming of the media content item. When there is a cached media content item stored on the media playback device, the media playback device may play back the cached media content item in place of newly receiving cast of the media content item. A user interface (UI) for control of playback of a cached media content item or for control of playback of a casted media content item, may be selectively activated on the media playback device.

In some aspects of the present invention, a layout for video presentation on a display of the media playback device may vary depending on if there is a conflicting playback in progress which invokes presentation of video that could conflict with a potential playback of a casted media content item (video content item). A first screen on which the casted media content item is played back may be displayed along with or over a second screen on which the conflicting media content item is played back. The layout of the first screen with respect to the second screen may be changeable in response to a user input.

In some aspects of the present invention, a layout for video presentation on a display of the media playback device may vary depending on how many casts the media playback device is receiving concurrently. One or more screens on which individually-casted media content items are played back, may be arranged depending on the number of casts concurrently in progress.

In some aspects of the present invention, when a plurality of media content items have a "collaborative relationship" in which the media content items are suited for collaboration to generate a new production, the media content items may be casted concurrently to the media playback device which may then play back the media content items concurrently.

In some aspects of the present invention, The cast device may play back a media content item (first media content item) locally on the cast device itself during casting of another media content item (second media content item) to the media playback device. During the simultaneous local playback and cast, the cast device may selectively control the local playback or cast through a UI on the cast device. Also, during the simultaneous local playback and cast, the cast device may switch the local playback and cast back and forth, namely, switch the first media content item from the local playback to cast to the media playback device and switch the second media content item from the cast to the local playback on the cast device.

In some aspects of the present inventions, the cast device may be allowed to cast a media content item only to an available media playback device that is not playing back another casted media content item, namely, restricted against casting of a media content item to any media playback device that is already playing back another casted media content item, among discovered media playback devices, so as to prevent confliction between the two casts. For such restriction, the availability of each media playback device may be managed by the cast device. On the cast device, only "available" media playback devices may be selectable through a UI as a cast destination.

In some aspects of the present invention, the priorities of media playback devices may be managed by the cast device in addition to the availability of the media playback devices. Each media playback device may be assigned a specific priority that indicates the priority to be selected as a cast destination. The media playback device in the "available" status having the highest priority may be always identified as a destination of each cast. Accordingly, when the cast device performs multiple casts of media content items, the media playback devices may be identified as destinations of the casts one by one in descending order of priority.

In some aspects of the present invention, the cast device may facilitate casts of media content items to multiple media playback devices intuitively through a GUI. The GUI may present first icons representing discovered media playback devices and second icons representing castable media content items. A method may be provided to allow the user to intuitively link a media playback device with a media content item using the first and second icons on the GUI, to initiate cast of the linked media content item to the linked media playback device. The user may be allowed to perform the linkage of a media content item and media playback device on a GUI, through which the user may be then allowed to control the playback of the media content item at the linked media playback device during the playback.

In some aspects of the present invention, each cast device may be set as one of a supervisory cast device and a non-supervisory cast device. The supervisory cast device may be authorized to supervise casts in the LAN, namely, approve or disapprove casts requested by other cast devices in the LAN. The non-supervisory cast device may have no such authority to supervise casts. Casts requested by a non-supervisory cast device may be processed by the media playback device only when the supervisory cast device has approved them. The setting of whether the cast device is supervisory or non-supervisory may be stored on each cast device.

In some aspects of the present invention, each UE in the LAN may be set as one of a device operative as a microphone system to input sound for cast of the sound ("audio-in device") and a device operative as a loudspeaker system to output sound inputted through the cast ("audio-out device"). One or more UEs set as an audio-in device and one or more UEs set as an audio-out device may constitute a public address (PA) system, public notification system, or wireless microphone system where sound such as voice inputted by the audio-in devices is casted and outputted by the audio-out devices over the LAN. Each UE may be set as either one of the audio-in device and audio-out device manually in response to a user selection or automatically upon connection to a peripheral device such as a microphone and speaker. On the audio-in device, the user may be allowed to control the volume of sound for public address through a GUI.

In some aspects of the present invention, the media playback device may suspend fetch and playback of a casted media content item when performing another task, until the performance of the task ends. The fetch and playback of the casted media content item may be automatically initiated upon finish or termination of the performance of the conflicting task.

In some aspects of the present invention, a cast destination (first cast destination) determined a first time may be switched or changed to another cast destination (second cast destination) on the basis of movement of the cast device (e.g., movement of the user carrying the cast device) within the LAN or over multiple local area networks. Specifically, the cast device may switch the cast destination from a first media playback device to a second media playback device upon movement of the cast device closer to the second media playback device away from the first media playback device, during cast of a media content item to the first media playback device. The second media playback device may be present in the same LAN as the first media playback device, or in another LAN other than the LAN the first media playback device resides in.

In some aspects of the present invention, if cast of a media content item on a media playback device (first media playback device) is lost or accidentally stopped for some reason associated with the WLAN communication, the cast may be resumed on a newly discovered media playback device (second media playback device). Specifically, the cast device may resume the interrupted or accidentally terminated cast to the second media playback device upon discovering the second media playback device within a predetermined time period after the accidental termination. The second media playback device may be present in the same LAN as the first media playback device, or in another LAN other than the LAN the first media playback device resides.

In some aspects of the present invention, a UI for control of an ongoing cast may appear on a media playback device, so that the ongoing cast may be controlled through the media playback device instead of through the cast device. A GUI for control of the ongoing cast may be displayed along with video presentation associated with playback of a casted video content item, on a display of the media playback device.

In some aspects of the present invention, where a media content item contains both of a video content item and audio content item which may be combined together by the server, the cast device may cast the video and audio content items separately to distinct media playback devices. Streaming of the video content item may be directed to a first media playback device, while streaming of the video content item may be directed to a second media playback device. The aspects may be advantageously applied to, for example, a video communication application (e.g., video conference, video chat, etc.) where an audio stream associated with voice inputted through a microphone of a participant (a UE) and a video stream associated with images captured by a camera of the participant may be combined together by the server into a communication stream which may be then streamed by the server to another participant (another UE) for the video communication over the Internet.

DRAWINGS

FIG. 1 schematically illustrates an example of a system including at least one mobile network, at least one local area network, and the Internet, according to some embodiments.

FIG. 2 schematically illustrates an example of a mobile network in a system, according to some embodiments.

FIG. 3 schematically illustrates an example of a local area network (LAN) in a system, according to some embodiments.

FIG. 4 schematically illustrates an example of a local are network (LAN) in which user equipments (UEs) reside in the LAN, according to some embodiments.

FIG. 5 is a flowchart illustrating an example of a typical discovery process for the UEs to discover one another over the LAN, according to some embodiments.

FIG. 6 schematically illustrates an example of a database for management of UEs, according to some embodiments.

FIG. 7A is a flowchart illustrating an example of a general process for cast of a media content item, according to some embodiments.

FIG. 7B is a flowchart illustrating an example of a specific process for cast of a local media content item that is stored locally on a cast device, according to some embodiments.

Figure 8A:
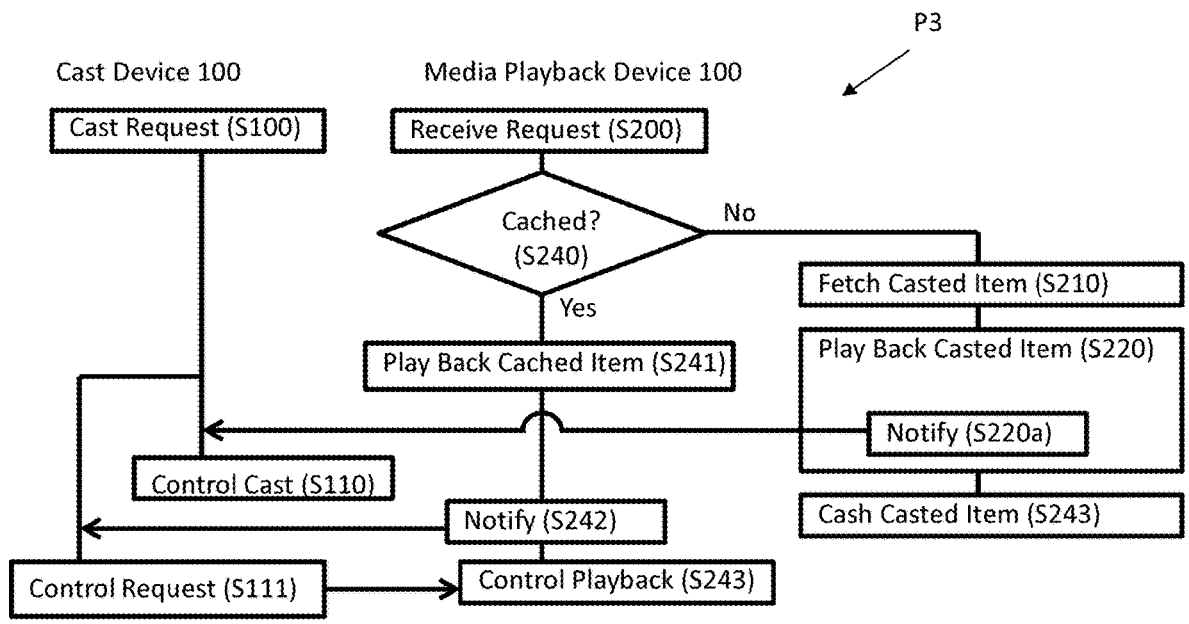
FIG. 8A is a flowchart illustrating an example of a process for conditional use of a cached media content item that is cached on a media playback device, according to some embodiments.
Figure 8B:
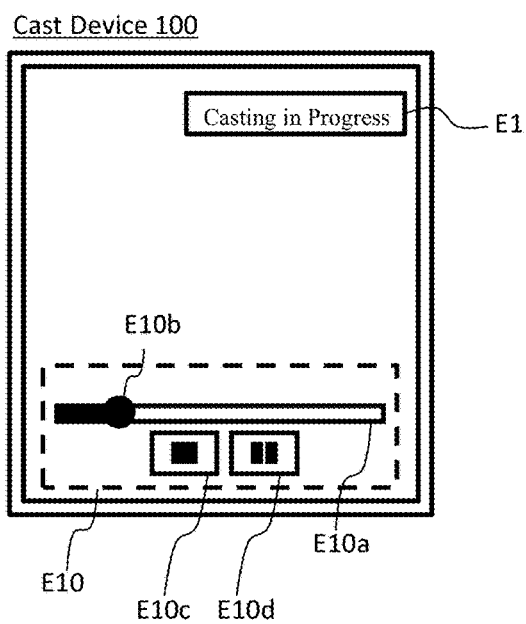

FIG. 8B schematically illustrates an example of a first graphical user interface (GUI) displayed on a display of a cast device for control of an ongoing cast, according to some embodiments.

Figure 8C:
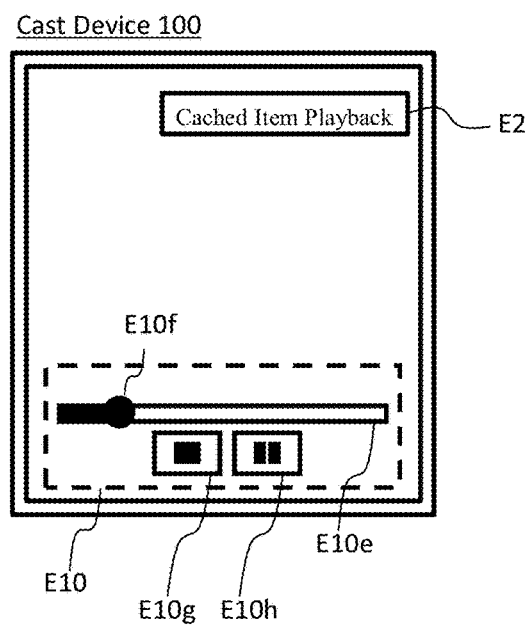

FIG. 8C schematically illustrates an example of a second graphical user interface (GUI) displayed on a display of a cast device for control of an ongoing playback of a cached media content item, according to some embodiments.

Figure 9A:
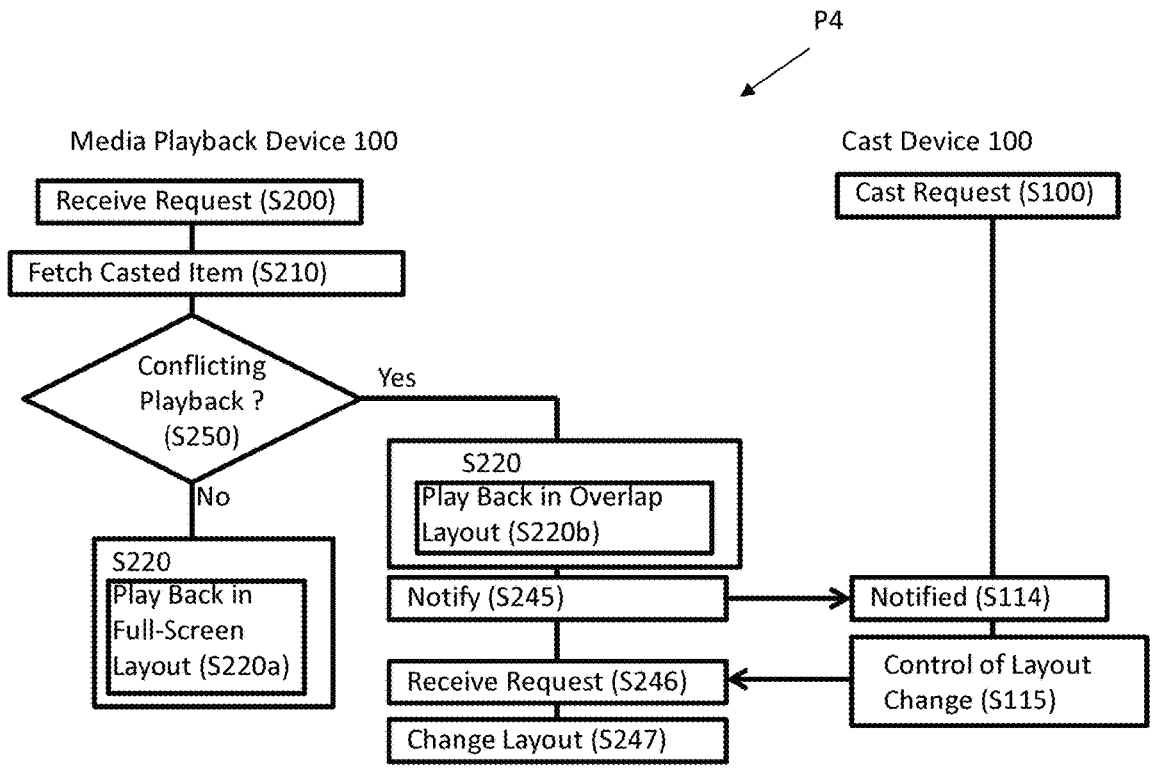

FIG. 9A is a flowchart illustrating an example of a process for dynamically changing a cast screen layout for arranging a cast screen on which video generated by playback of a casted media content is presented, according to some embodiments.

Figure 9B:
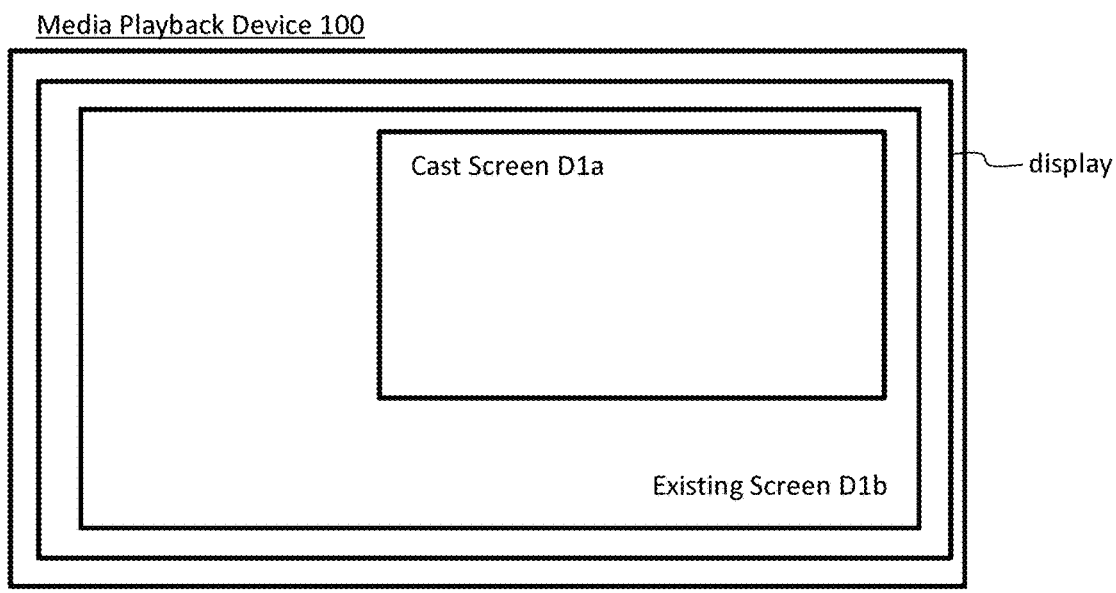

FIG. 9B schematically illustrates an example of a cast screen layout in which a cast screen is displayed over another existing screen, according to some embodiments.

Figure 9C:
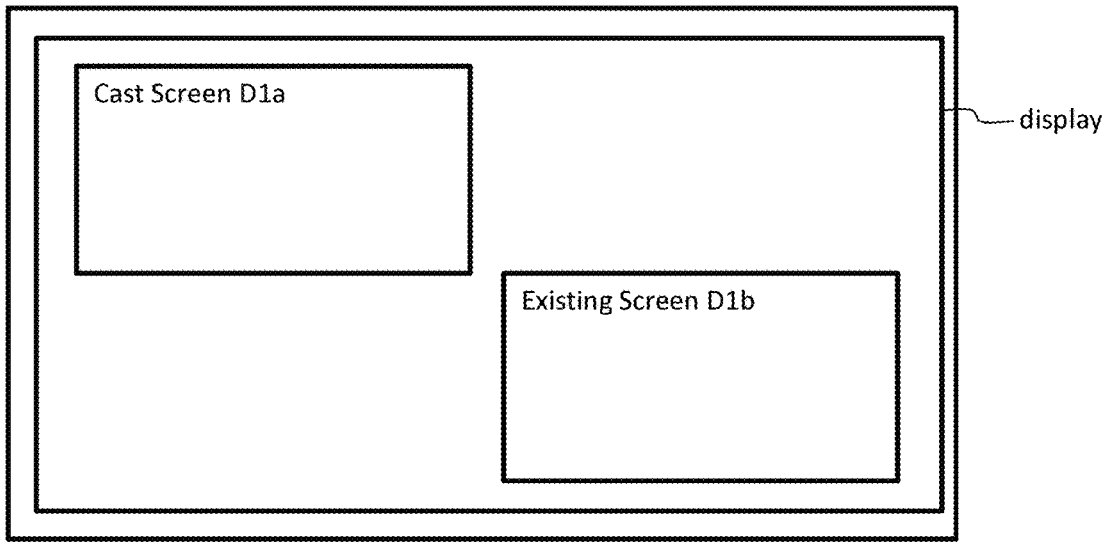

FIG. 9C schematically illustrates an example of a cast screen layout in which a cast screen and another existing screen share the display area of a display so that the both screens are fully visible, according to some embodiments.

Figure 9D:
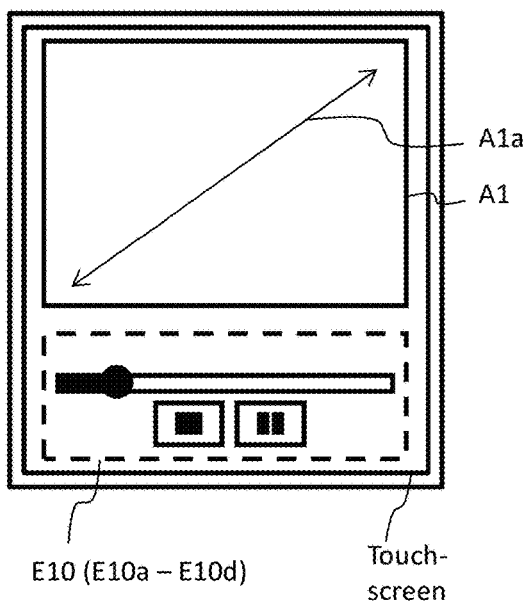

FIG. 9D schematically illustrates an example of a GUI for control of the size of a cast screen, according to some embodiments where a cast device is provided with a touch screen.

Figure 9E:
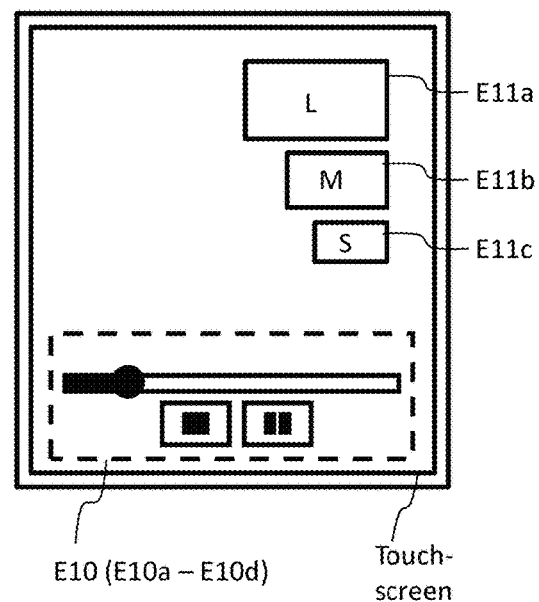

FIG. 9E schematically illustrates an example of a GUI for control of the size of a cast screen, according to some embodiments where a cast device is provided with a touch screen.

Figure 9F:
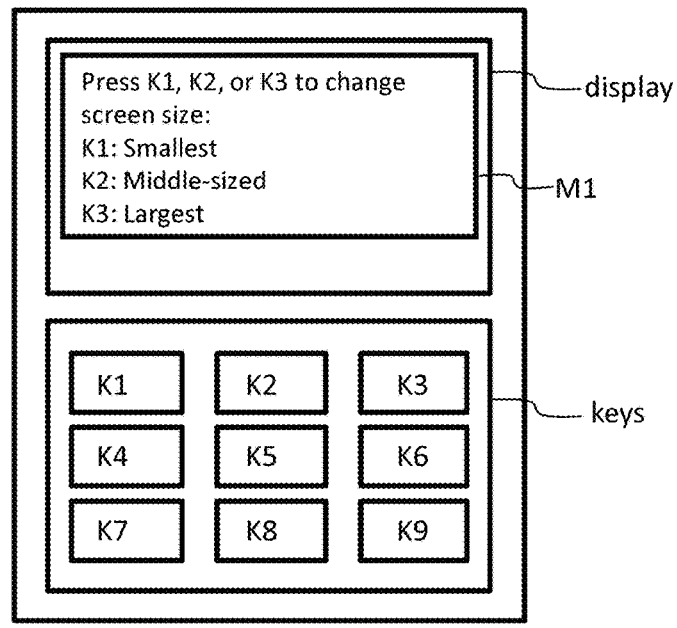

FIG. 9F schematically illustrates an example of a GUI for control of the size of a cast screen, according to some embodiments where a cast device is provided with a mechanical input device such as a keypad including keys besides a display.

Figure 10B:
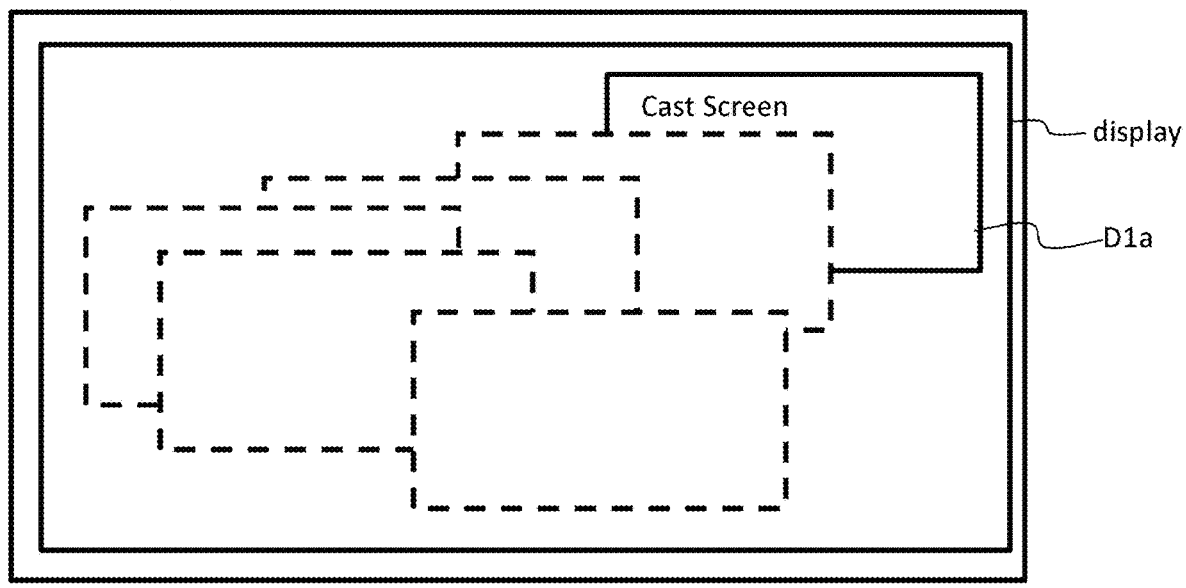
Figure 10A:
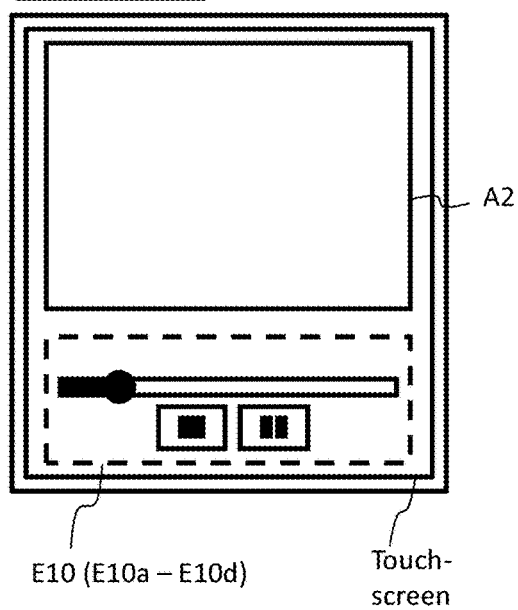

FIG. 10A schematically illustrates an example of a GUI for control of the position of a cast screen in a screen layout, according to some embodiments where a cast device is provided with a touch screen.

FIG. 10B schematically illustrates an example where a user gesture of "swiping" or "dragging" in any desired direction on a display of a cast device can move the position of a cast screen on a media playback device to the position corresponding to the received gesture.

Figure 10C:
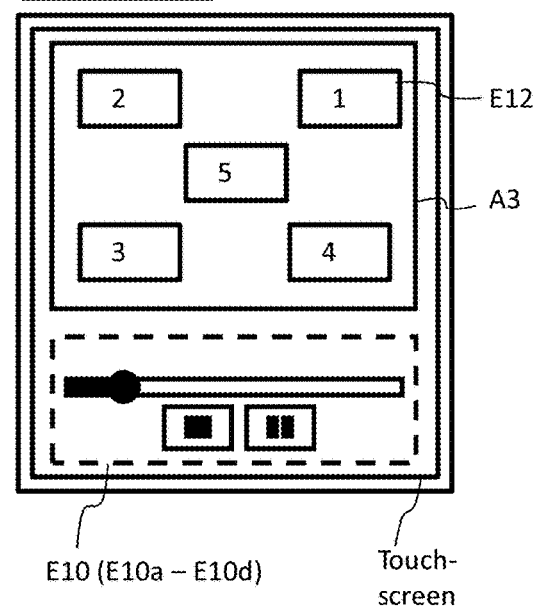

FIG. 10C schematically illustrates an example of a GUI for control of the position of a cast screen in a screen layout, according to some embodiments where a cast device is provided with a touch screen.

Figure 10D:
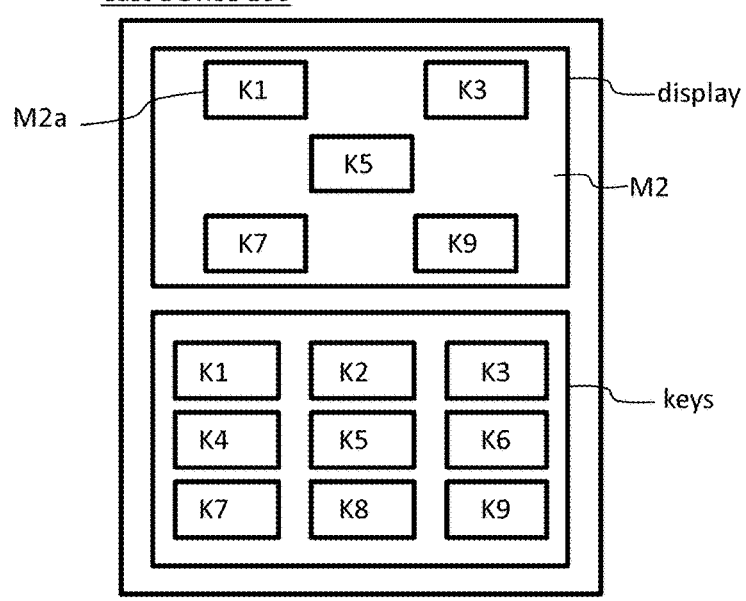

FIG. 10D schematically illustrates an example of a GUI for control of the position of a cast screen in a screen layout, according to some embodiments where a cast device is provided with a mechanical input device such as a keypad including keys besides a display.

Figure 10E:
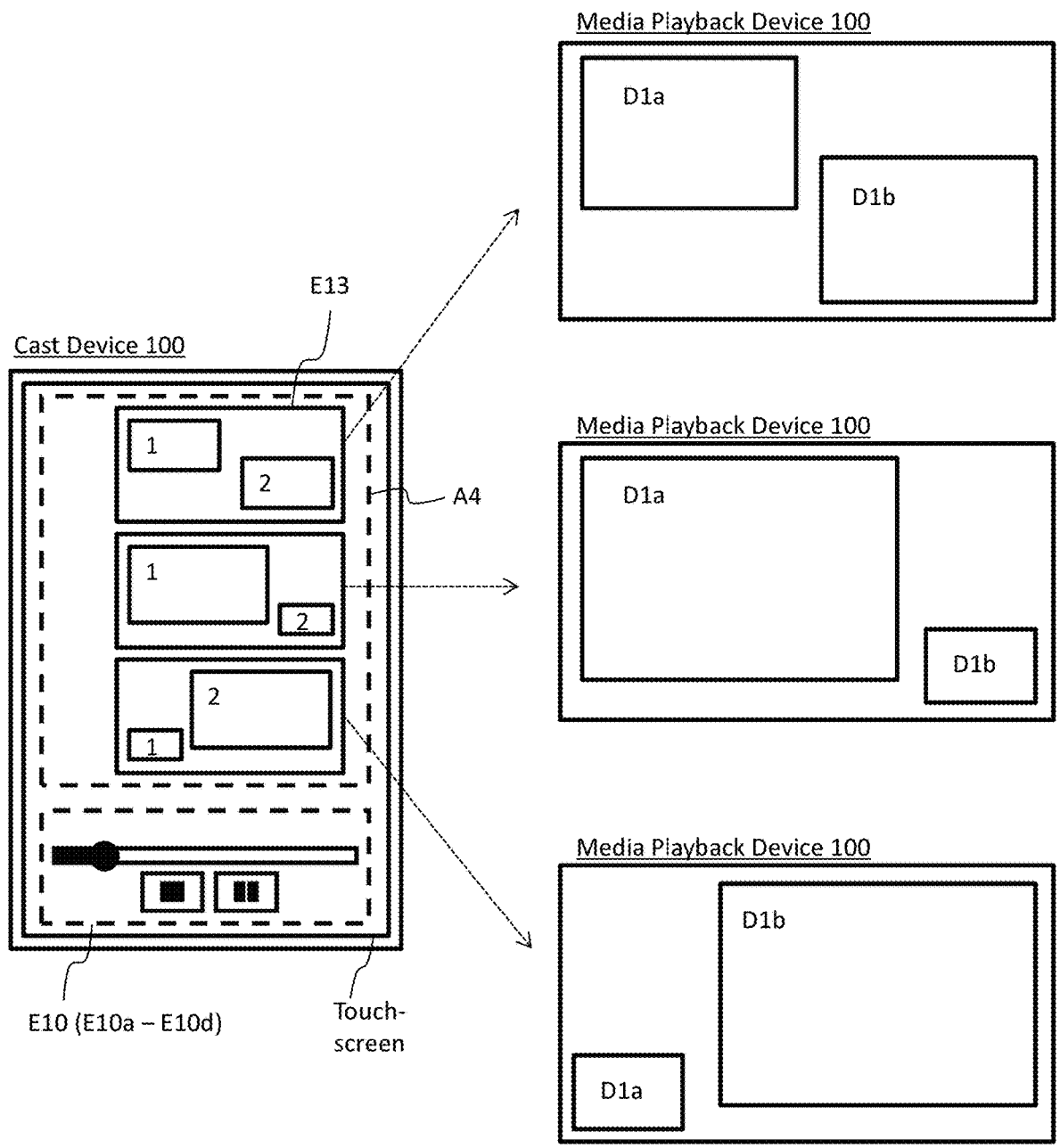

FIG. 10E schematically illustrates an example of a GUI for control of a screen layout by means of layout templates, according to some embodiments where a cast device is provided with a touch screen.

Figure 11A:
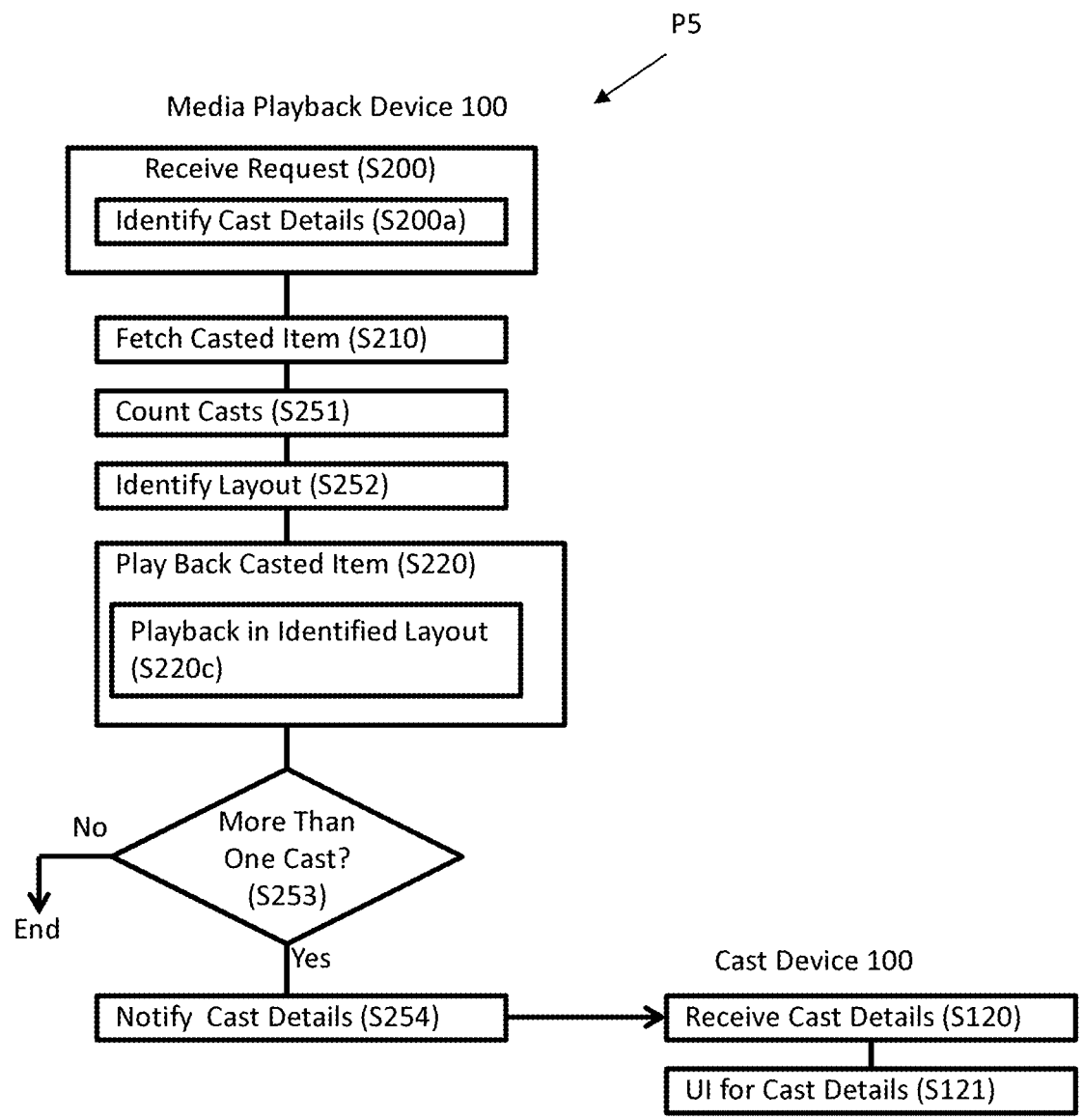

FIG. 11A is a flowchart illustrating an example of a process for concurrent playback of two or more casted video content items, according to some embodiments.

Figure 11B:
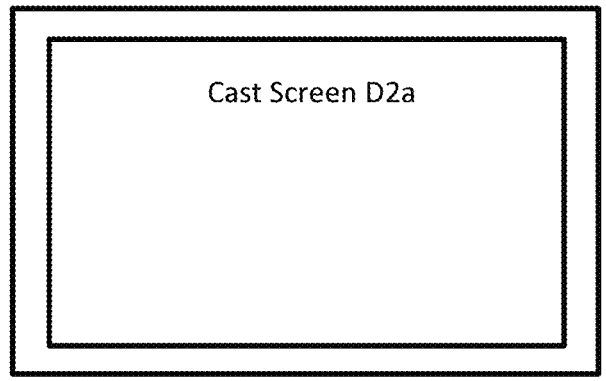

FIG. 11B schematically illustrates an example of a screen layout for one cast, in which a single cast screen for the one cast is arranged in the middle, preferably in a full-screen manner, according to some embodiments.

Figure 11C:
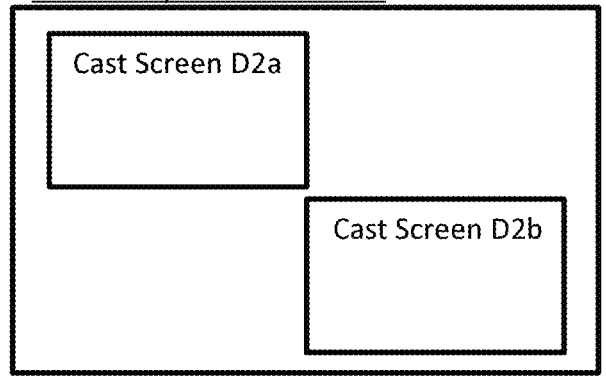

FIG. 11C schematically illustrates an example of a screen layout for two casts, in which two cast screens for the two casts are so arranged as to make every cast screen visible, with one of the cast screens being arranged at the upper left and the other one being arranged at the lower right, according to some embodiments.

Figure 11D:
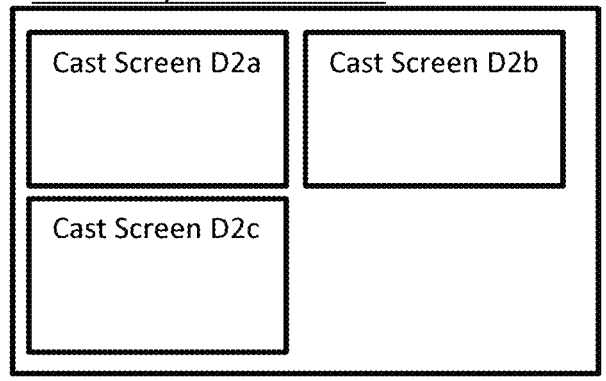

FIG. 11D schematically illustrates an example of a screen layout for three casts, in which three cast screens for the three casts are so arranged as to make every cast screen visible, with first cast screen being arranged at the upper left, second cast screen being arranged at the upper right, and third cast screen being arranged at the lower left, according to some embodiments.

FIG. 11E illustrates an example of a screen layout in a first situation where only one cast device has initiated a cast (first cast) of a video content item, according to some embodiments.

FIG. 11F illustrates an example of a screen layout in a second situation transitioning from the first situation, where another cast device 100 has initiated a cast (second cast) of a video content item while playback of the media content item associated with the first cast is still in progress, according to some embodiments.

FIG. 11G illustrates an example of a screen layout in a third situation transitioning from the second situation, where another cast device 100 has further initiated a cast (third cast) of a video content item while playbacks of the media content items associated with the first and second casts are still in progress.

Figure 12A:
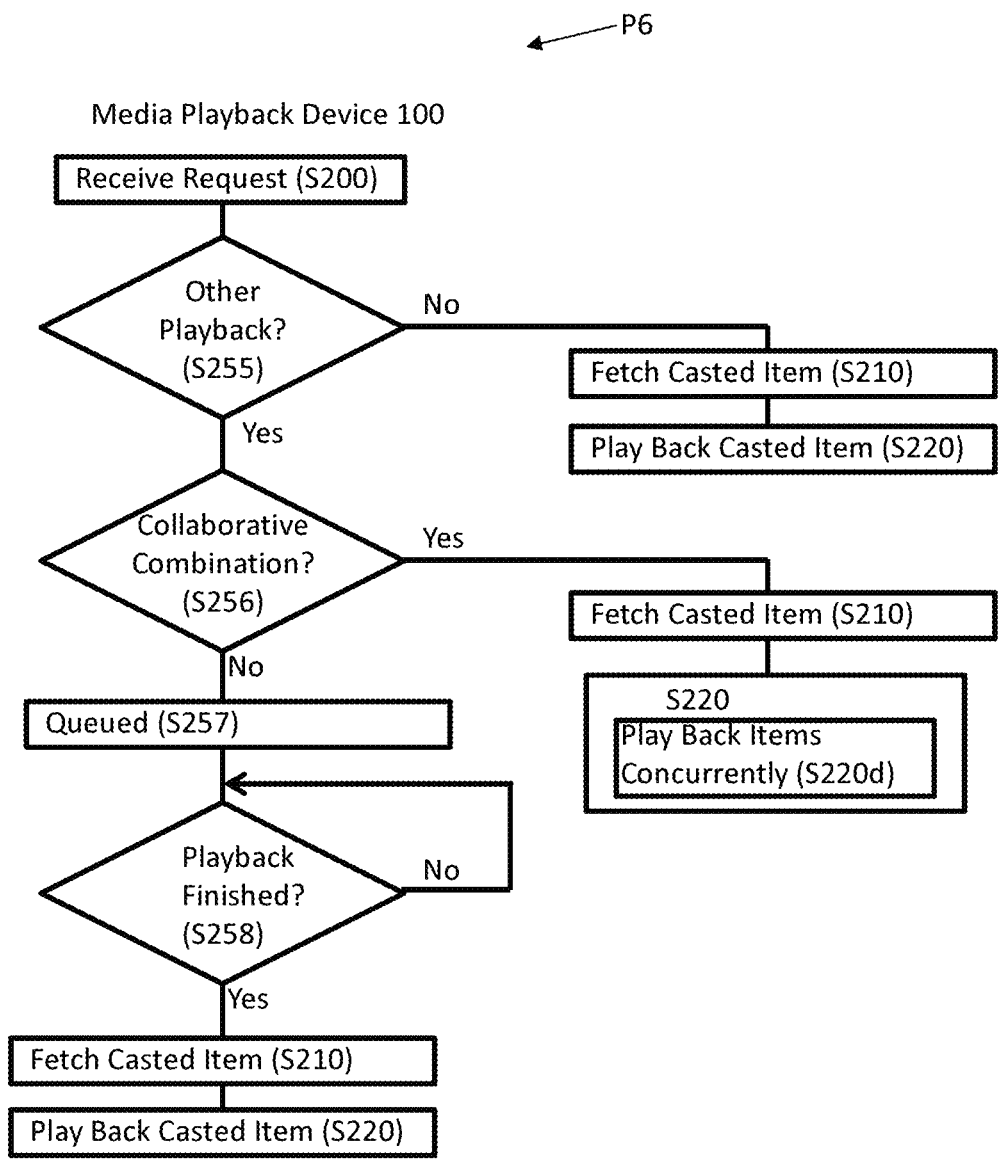

FIG. 12A is a flowchart illustrating an example of a process for generating and playing back a new collaborative production using multiple media content items, according to some embodiments.

Figure 13A:
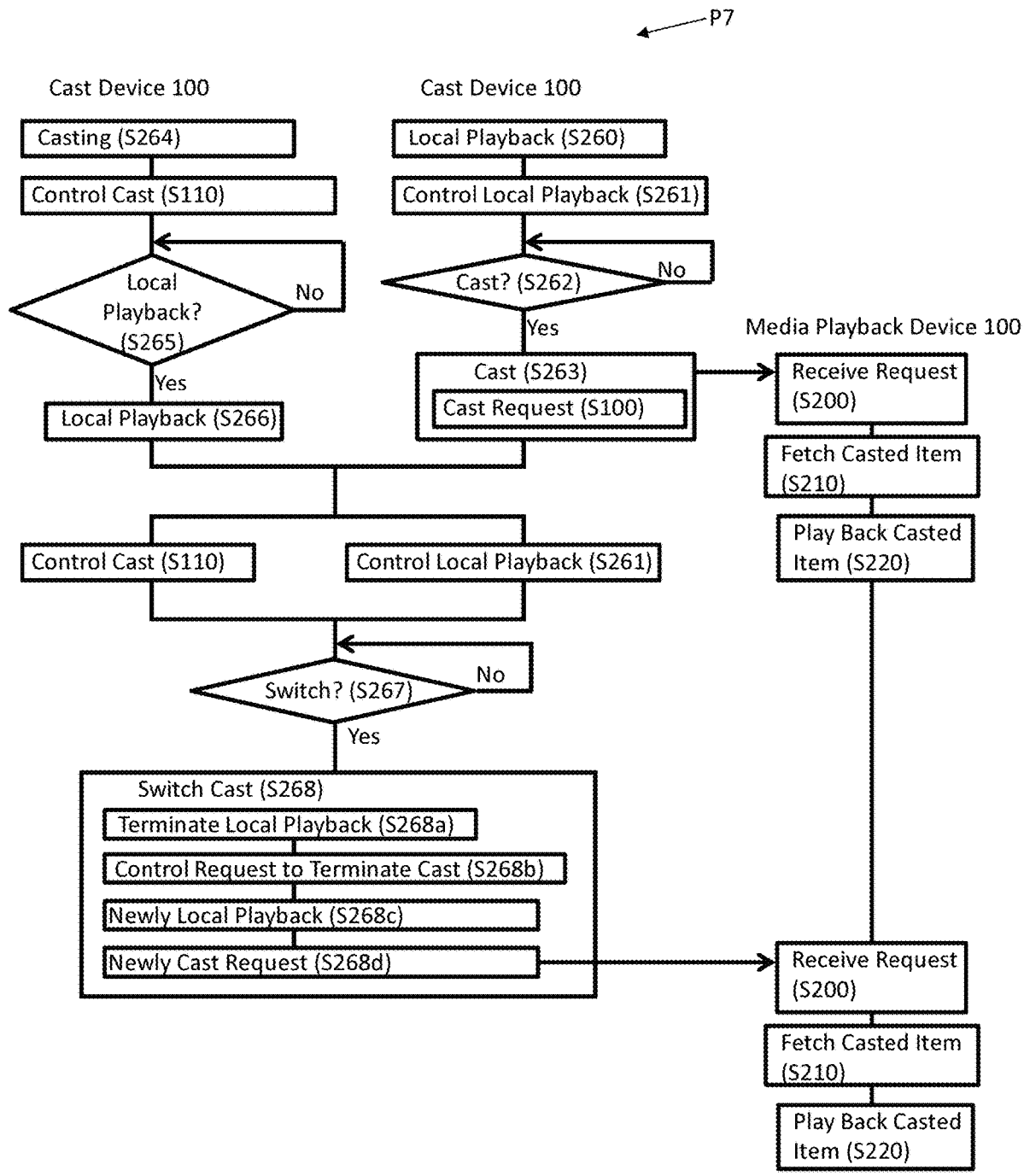

FIG. 13A is a flowchart illustrating an example of a process for simultaneous local playback of a media content item and cast of media content item and for switch of the media content items, according to some embodiments.

Figure 13B:
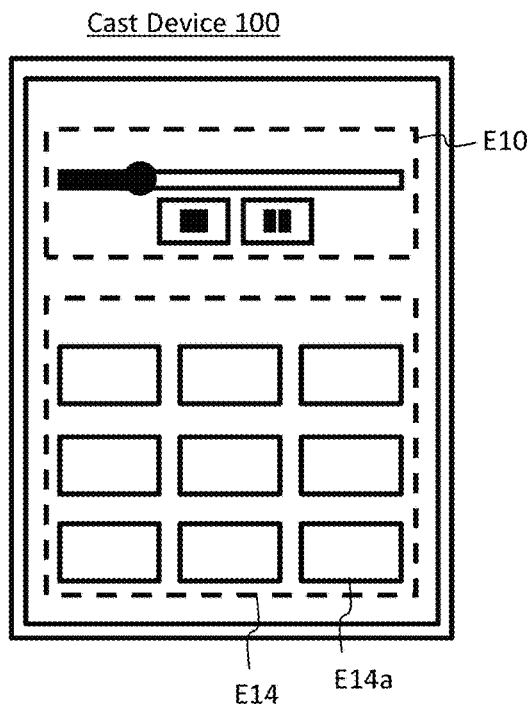

FIG. 13B schematically illustrates a GUI for control of cast of a media content item, through which to receive a user selection to initiate a local playback of another media content item, according to some embodiments.

Figure 13D:
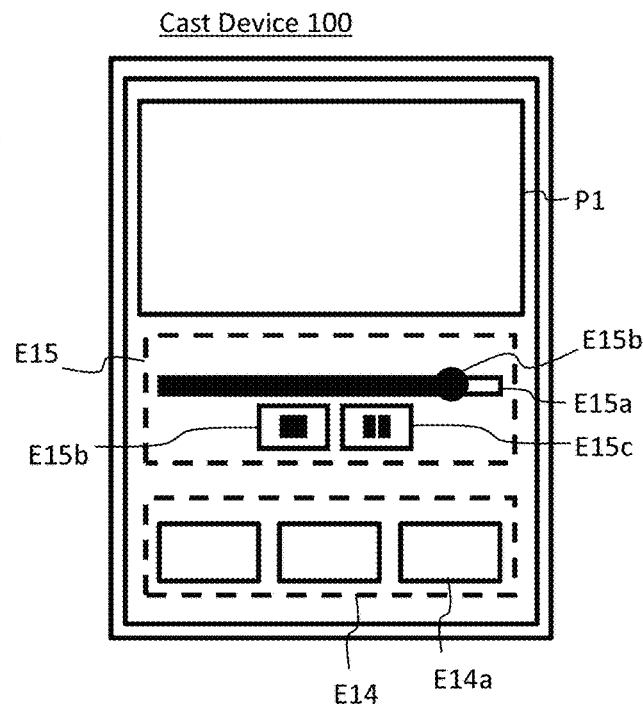
Figure 13C:
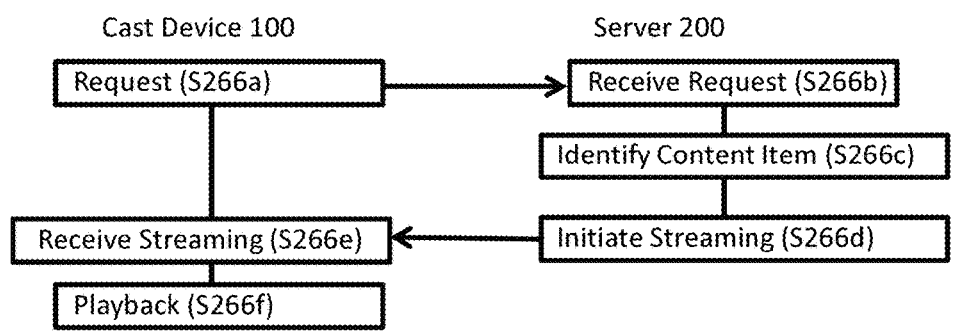

FIG. 13C is a flowchart illustrating an example of a flow for playing back an online media content item locally on a cast device, according to some embodiments.

FIG. 13D schematically illustrates a GUI for control of a local playback of a media content item, through which to receive a user selection to initiate cast of another media content item, according to some embodiments.

Figure 13E:
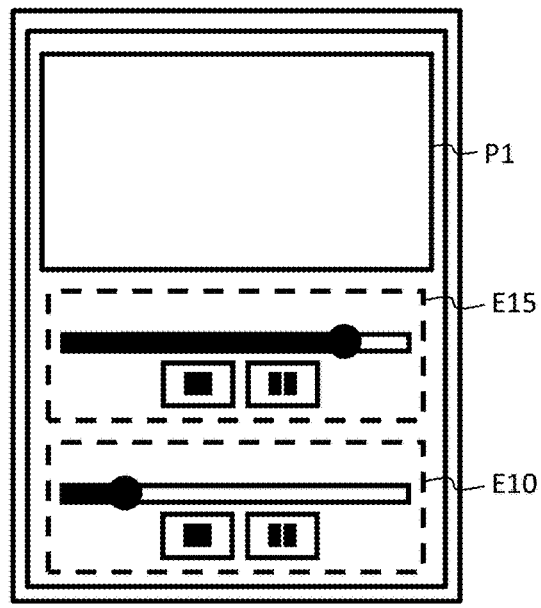

FIG. 13E schematically illustrates an example of a GUI through which to selectively control an ongoing local playback of a media content item or cast of a media content item when the local playback and cast are in progress simultaneously, according to some embodiments.

Figure 13F:
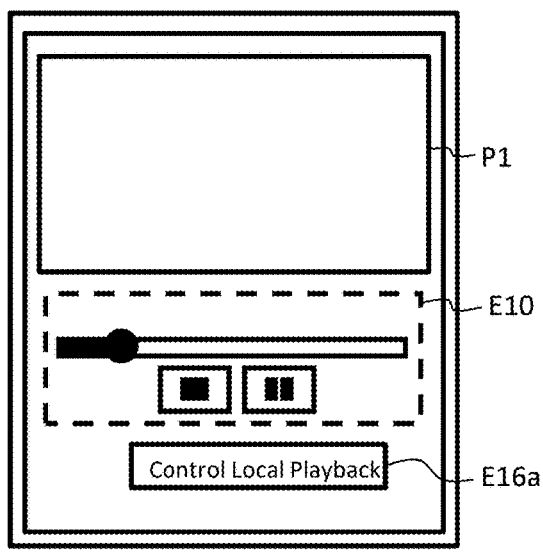

FIG. 13F schematically illustrates a GUI for control of a cast of a media content item while the cast and local playback are in progress simultaneously, according to some embodiments.

Figure 13G:
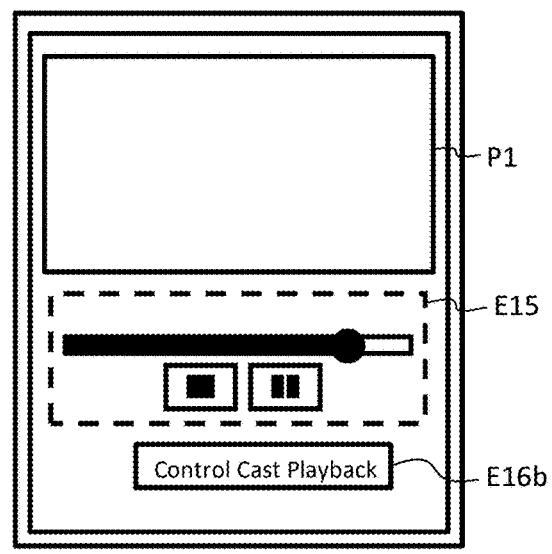

FIG. 13G schematically illustrates a GUI for control of a local playback of a media content item while the local playback and cast are in progress simultaneously, according to some embodiments.

FIG. 13H schematically illustrates a first situation where video associated with a local playback of a first video content item is displayed on a cast device while video associated with cast of a second video content item is displayed on a media playback device, according to some embodiments.

FIG. 13I schematically illustrates a second situation, transitioning from the first situation, where video associated with cast of the first video content item is displayed on a media playback device while video associated with a local playback of the second video content item is displayed on a cast device, according to some embodiments.

FIG. 13J schematically illustrates a GUI through which to receive a user gesture on a touch screen on a cast device to switch media content items, according to some embodiments.

FIG. 13K schematically illustrates a GUI through which to receive a user selection of a GUI element to switch media content items, according to some embodiments.

Figures 14A, 14B:
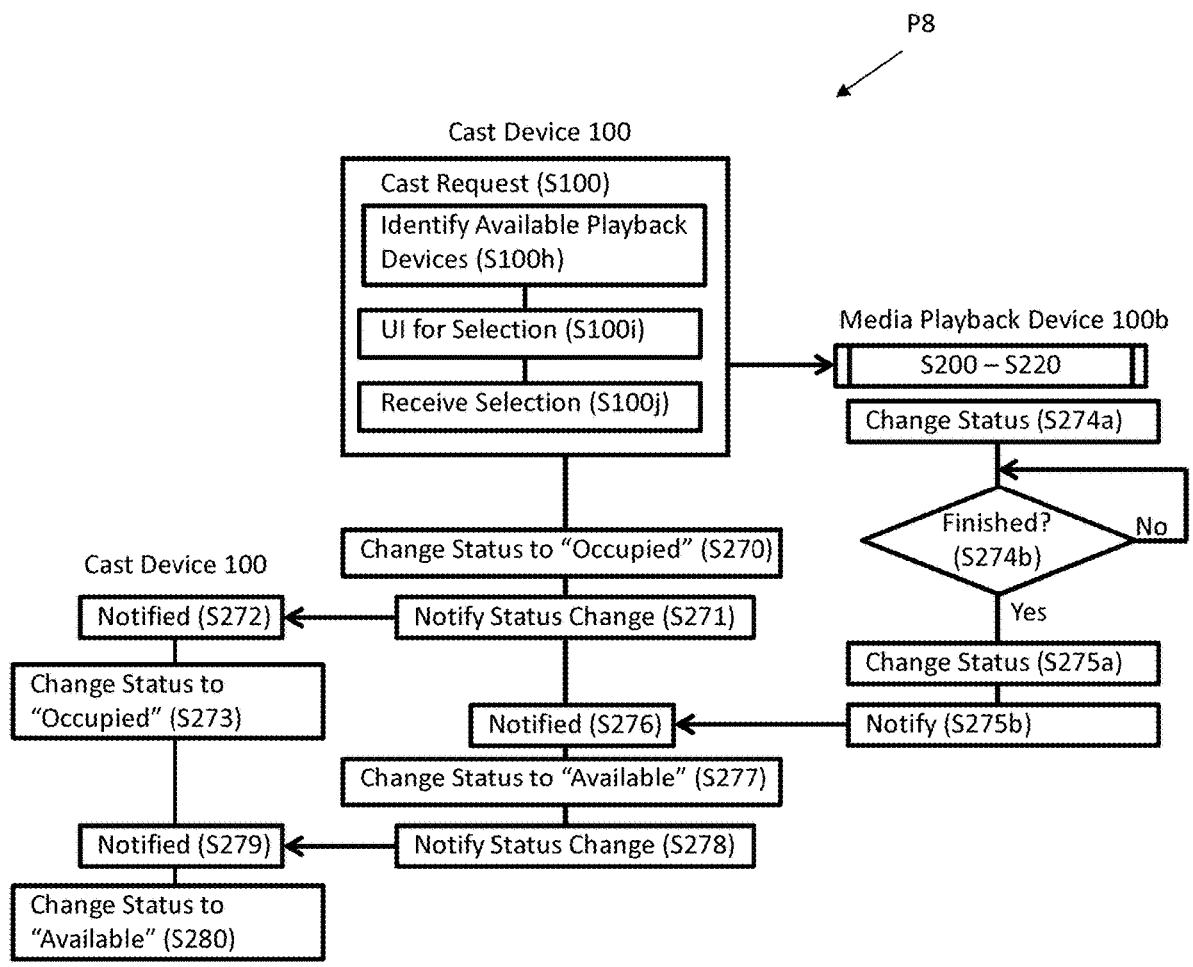

FIG. 14A schematically illustrates an example of a database or look-up table for management of the availability of each media playback device, according to some embodiments.

FIG. 14B is a flowchart illustrating an example of a process for a restricted cast, according to some embodiment where each cast device is configured to notify changes of the statuses of media playback devices.

Figure 14C:
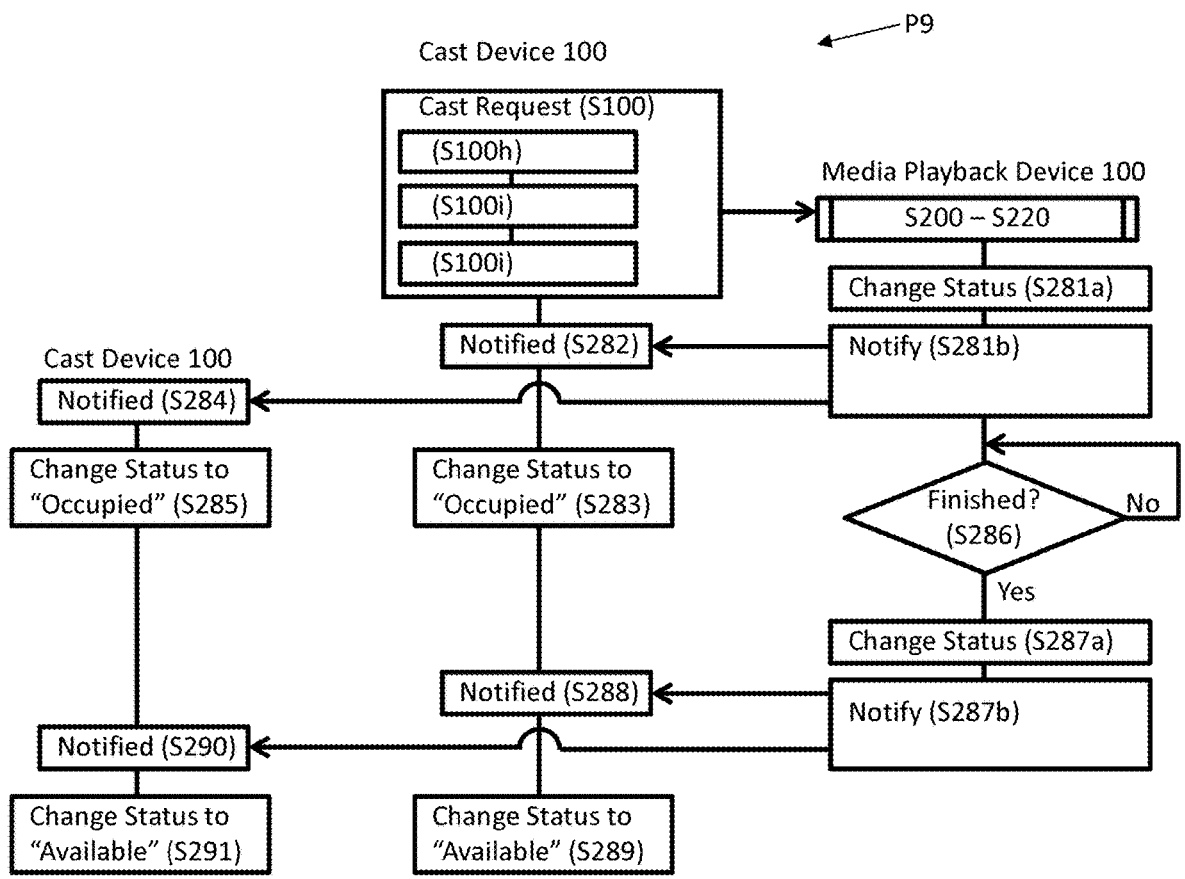

FIG. 14C is a flowchart illustrating an example of a process for a restricted cast, according to some embodiment where each media playback device is configured to notify changes of the statuses of the media playback device.

Figures 14D, 14E:
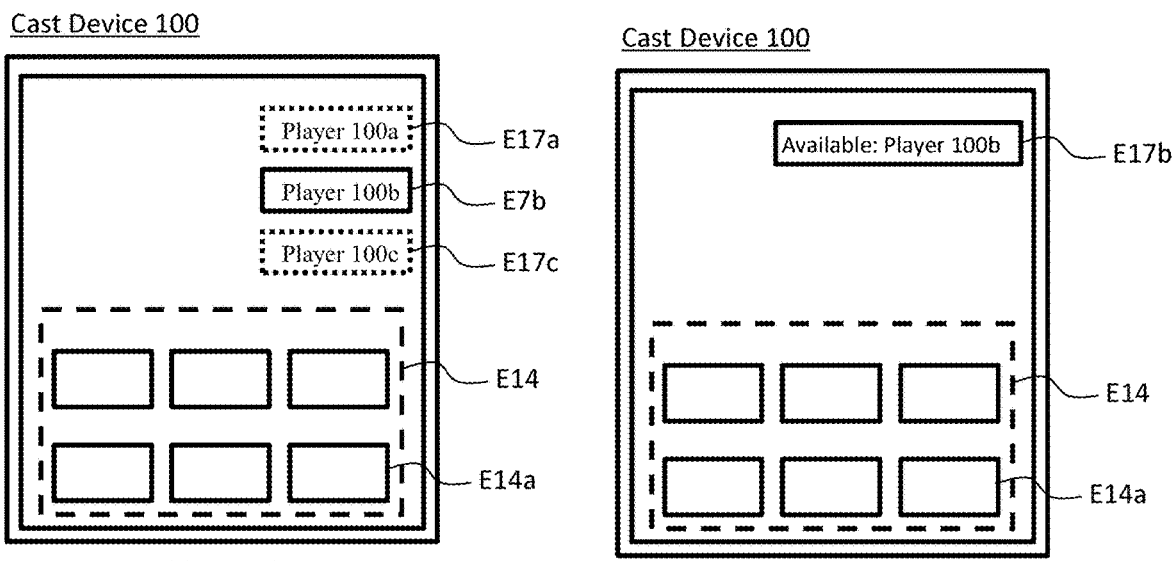

FIG. 14D schematically illustrates an example of a GUI through which to receive a user selection of an available media cast device as a cast destination, according to some embodiments.

FIG. 14E schematically illustrates an example of a GUI through which to receive a user selection of an available media cast device as a cast destination, according to some embodiments.

FIG. 15A schematically illustrates an example of a database or look-up table for management of the availability and priority of each media playback device, according to some embodiments.

FIG. 15B is a flowchart illustrating an example of a process for cast of a media content item with reference to the availabilities and priorities of media playback devices, according to some embodiments.

FIG. 15C is a flowchart illustrating an example of a process for cast of a media content item with reference to the availabilities and priorities of media playback devices, according to some embodiments.

Figure 15D:
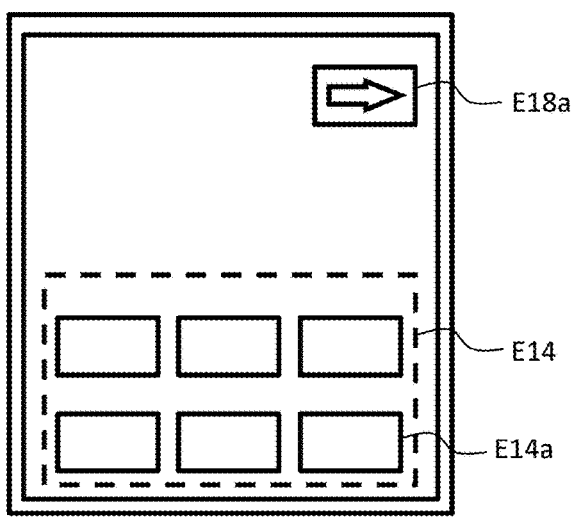

FIG. 15D schematically illustrates an example of a GUI for initiation of cast of a media content item with reference to the availabilities and priorities of media playback devices, according to some embodiments.

Figure 15E:
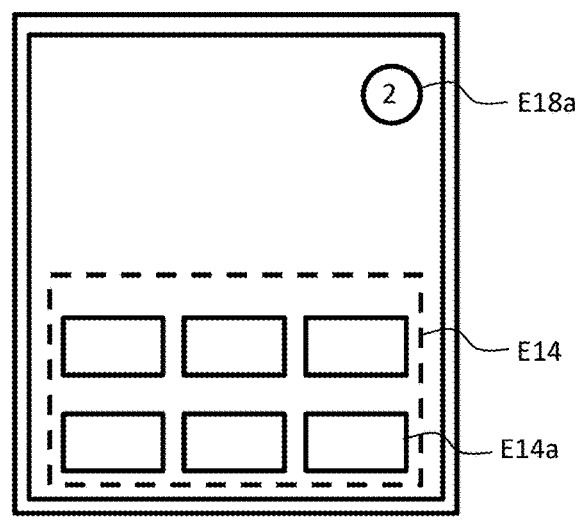

FIG. 15E schematically illustrates an example of a GUI for initiation of cast of a media content item with reference to the availabilities and priorities of media playback devices, according to some embodiments.

FIG. 16A schematically illustrates an example of a database or look-up table on which the product category and associated at least one playable content type for each UE may be managed, according to some embodiments.

FIG. 16B schematically illustrates an example of a database or look-up table on a cast device to manage icons for representing media playback devices that are distinct from one another depending on the product categories, according to some embodiments.

Figure 16C:
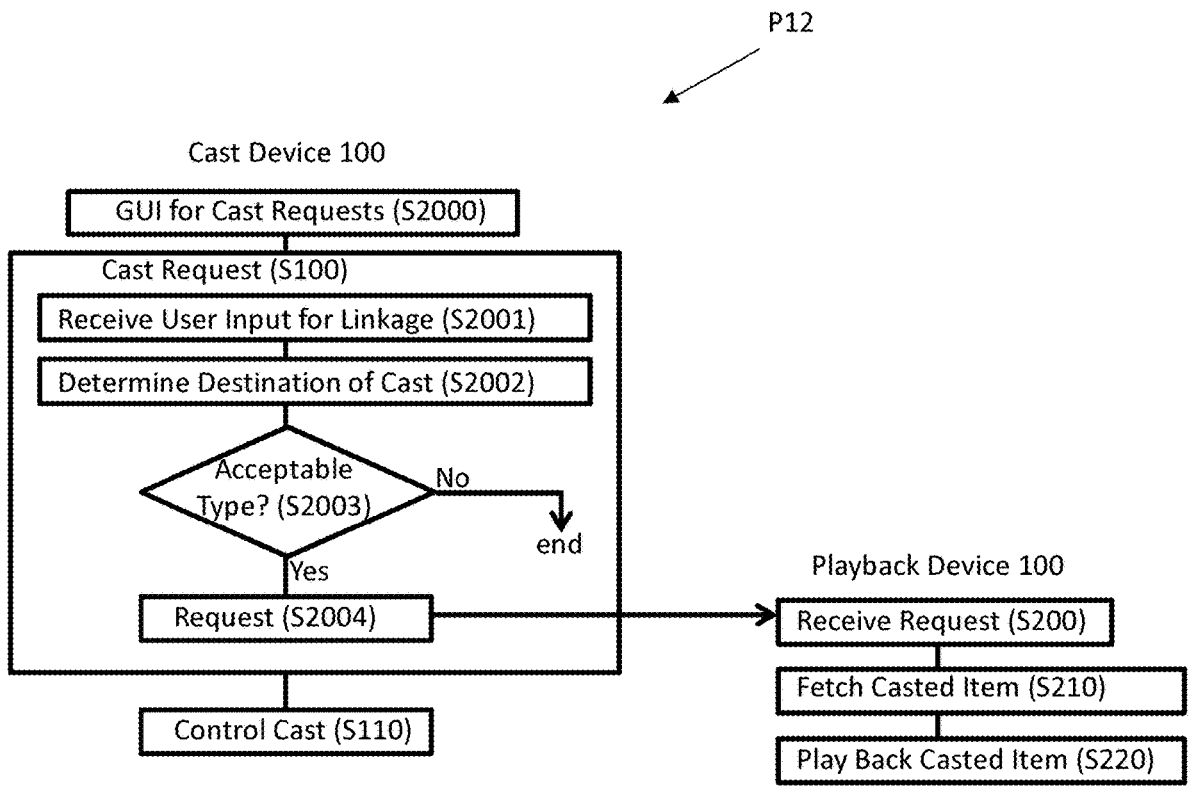

FIG. 16C is a flowchart illustrating an example of a process for initiation of cast of a media content item using first icons representing discovered media playback devices and second icons representing castable media content items, according to some embodiments.

Figure 16D:
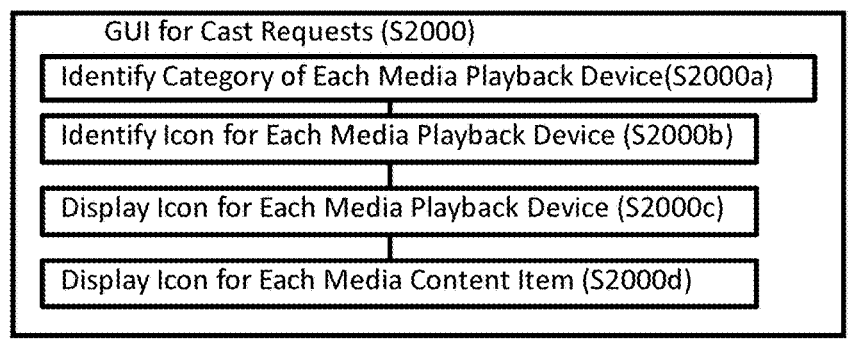

FIG. 16D is a flowchart illustrating an example of a flow for displaying a GUI for initiation of cast of a media content item using first icons representing discovered media playback devices and second icons representing castable media content items, according to some embodiments.

Figure 16E:
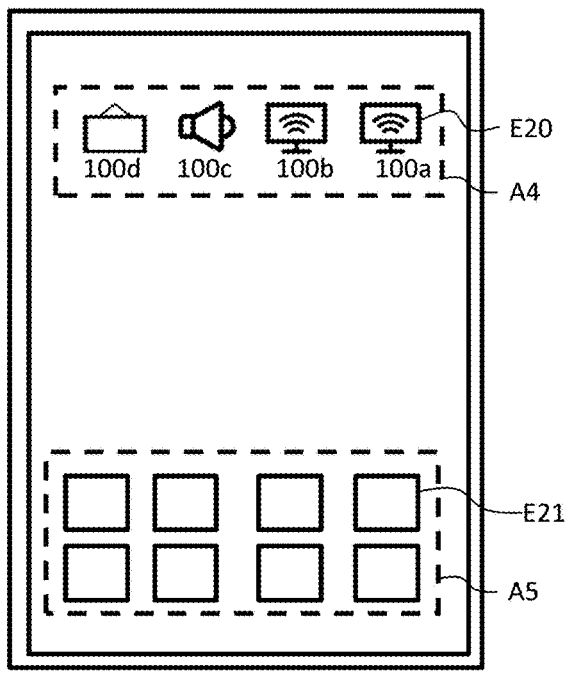

FIG. 16E schematically illustrates an example of a GUI for initiation of cast of a media content item using first icons representing discovered media playback devices and second icons representing castable media content items, in which four discovered media playback devices and multiple castable media content items are presented, according to some embodiments.

Figure 16F:
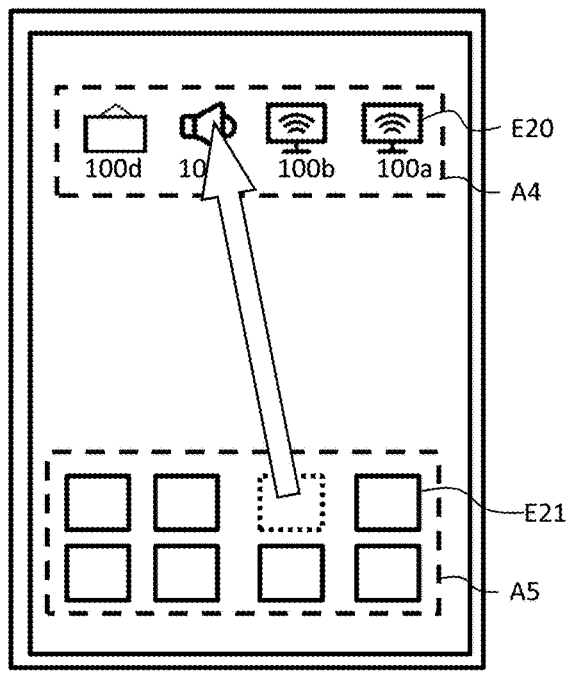

FIG. 16F schematically illustrates an example of initiation of cast of a media content item using the first and second icons through the GUI illustrated in FIG. 16E, according to some embodiments.

Figure 16G:
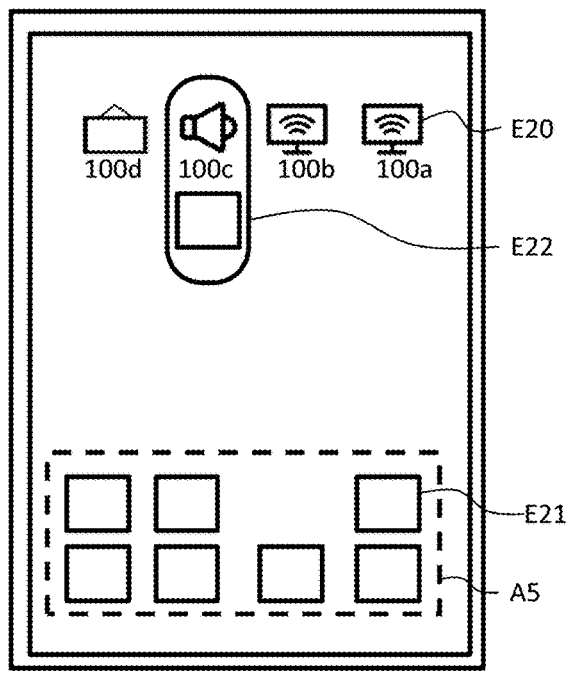

FIG. 16G schematically illustrates an example of a GUI for initiation of cast of a media content item using first icons representing discovered media playback devices and second icons representing castable media content items, in which a visual indication is presented indicative of a linkage relationship between a selected media content item and a selected media playback device, according to some embodiments.

Figure 16H:
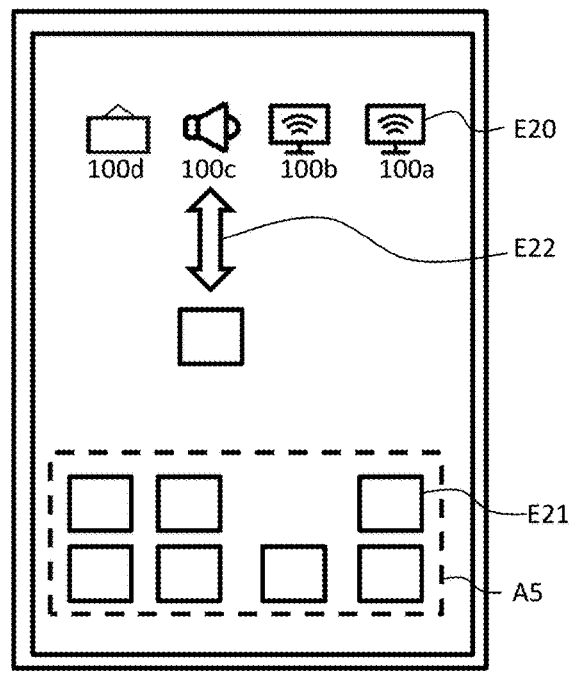

FIG. 16H schematically illustrates an example of a GUI for initiation of cast of a media content item using first icons representing discovered media playback devices and second icons representing castable media content items, in which a visual indication is presented indicative of a linkage relationship between a selected media content item and a selected media playback device, according to some embodiments.

Figure 16I:
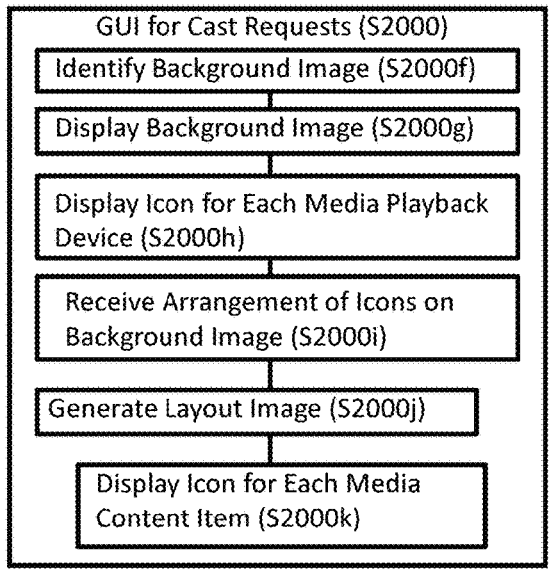

FIG. 16I is a flowchart illustrating an example of a flow for display of a GUI including first icons representing discovered media playback devices and second icons representing castable media content items over a layout image indicative of a place at which the media playback devices reside, according to some embodiments.

Figure 16J:
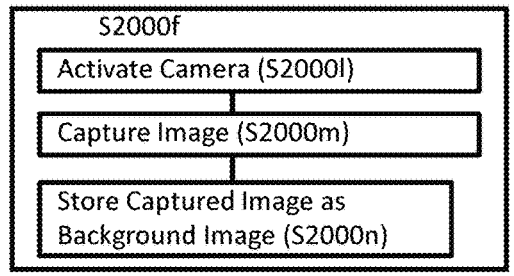

FIG. 16J is a flowchart illustrating an example of a flow for capturing an image using a camera to generate a layout image indicative of a place at which media playback devices reside, according to some embodiments.

Figure 16K:
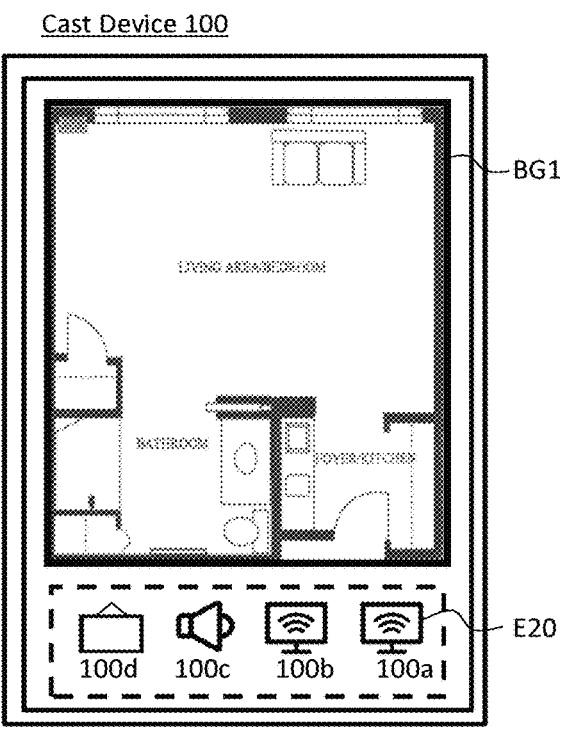

FIG. 16K schematically illustrates an example of a GUI for initiation of cast of a media content item, including a layout image on which first icons representing discovered media playback devices can be arranged, according to some embodiments.

Figure 16L:
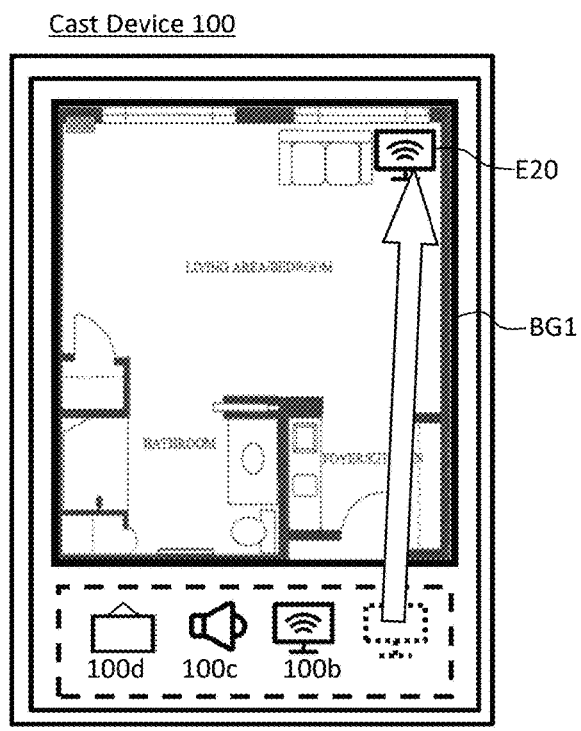

FIG. 16L schematically illustrates an example of arrangement of first icons representing discovered media playback devices onto a layout image on a GUI, according to some embodiments.

Figure 16M:
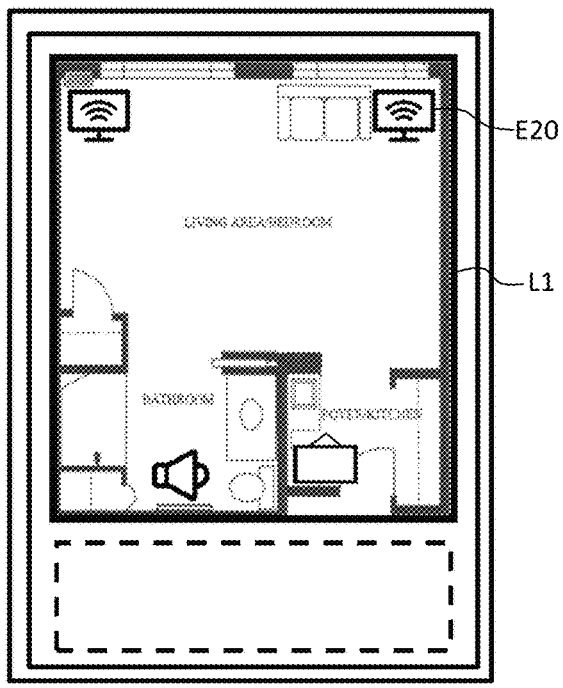

FIG. 16M schematically illustrates an example of a GUI for initiation of cast of a media content item, in which first icons representing discovered media playback devices have been arranged on a layout image, according to some embodiments.

Figure 16N:
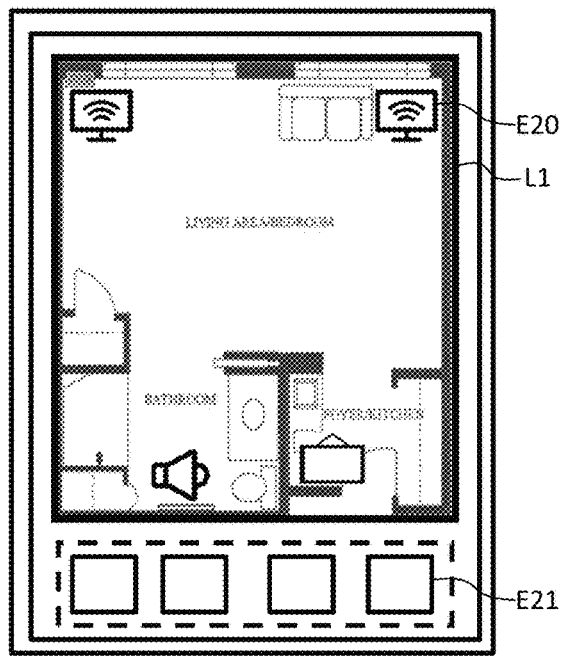

FIG. 16N schematically illustrates an example of a GUI for initiation of cast of a media content item, in which second icons representing castable media content items along with a layout image on which first icons representing discovered media playback devices have been arranged, according to some embodiments.

Figure 16O:
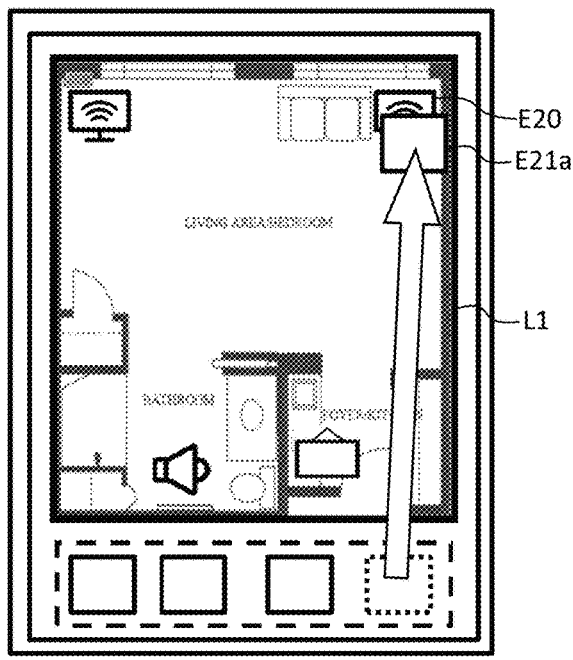

FIG. 16O schematically illustrates an example of linkage of a first icon representing a selected media playback device with a second icon representing a selected media content item on a GUI, according to some embodiments.

Figure 16P:
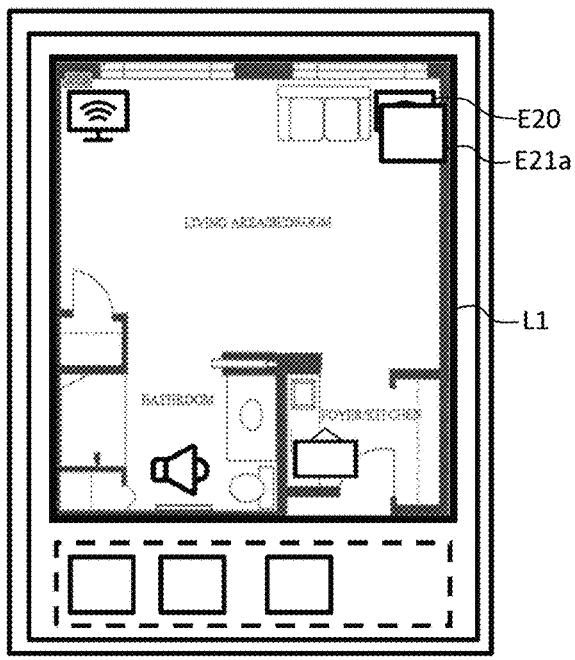

FIG. 16P schematically illustrates an example of a GUI for initiation of cast of a media content item, in which a first icon representing a selected media playback device and a second icon representing a selected media content item have been linked with one another, according to some embodiments.

Figure 16Q:
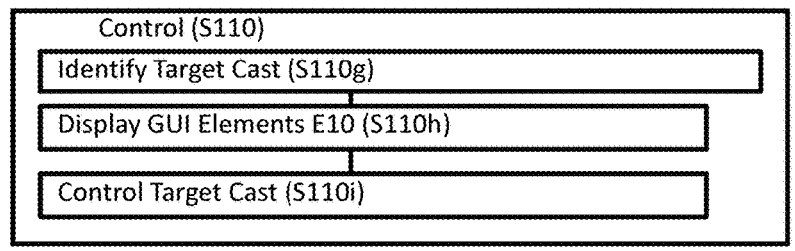

FIG. 16Q is a flowchart illustrating an example of a flow for control of cast on a GUI, according to some embodiments.

Figures 16R, 16S:
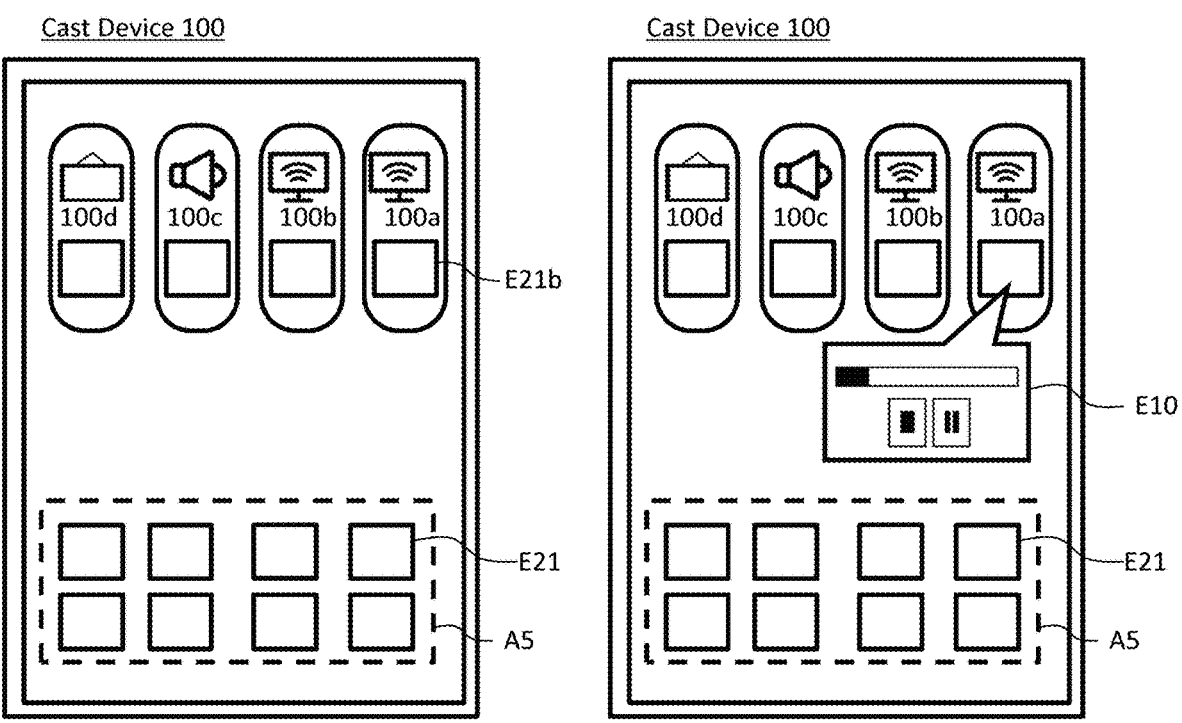

FIG. 16R schematically illustrates an example of a GUI for control of an ongoing cast, including a visual indication indicative of what media content item is casted to what media playback device, according to some embodiments.

FIG. 16S schematically illustrates an example of a GUI for control of an ongoing cast, including a visual indication indicative of what media content item is casted to what media playback device, in which a GUI element for the control has been popped up in connection with the visual indication, according to some embodiments.

Figure 16T:
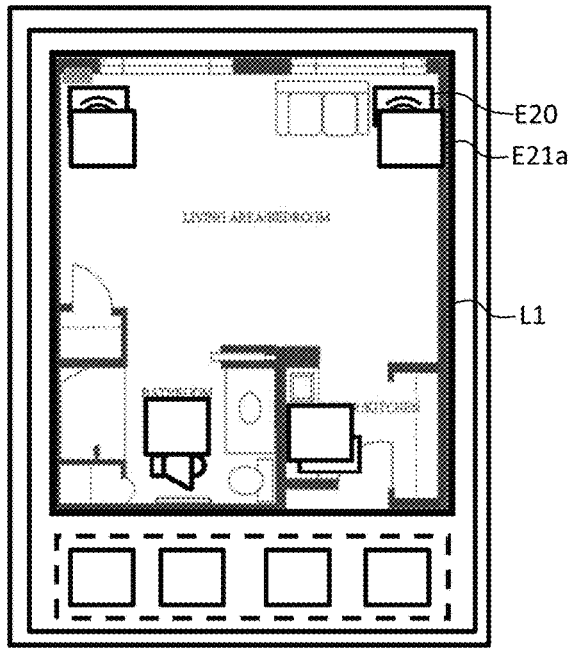

FIG. 16T schematically illustrates an example of a GUI for control of an ongoing cast, including a visual indication indicative of what media content item is casted to what media playback device on a layout image, according to some embodiments.

Figure 16U:
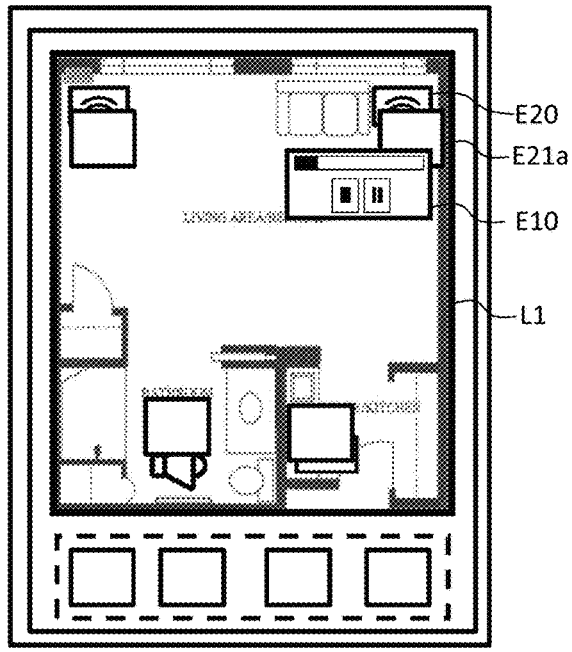

FIG. 16U schematically illustrates an example of a GUI for control of an ongoing cast, including a visual indication indicative of what media content item is casted to what media playback device on a layout image, in which a GUI element for the control has been popped up in connection with the visual indication, according to some embodiments.

Figure 16V:
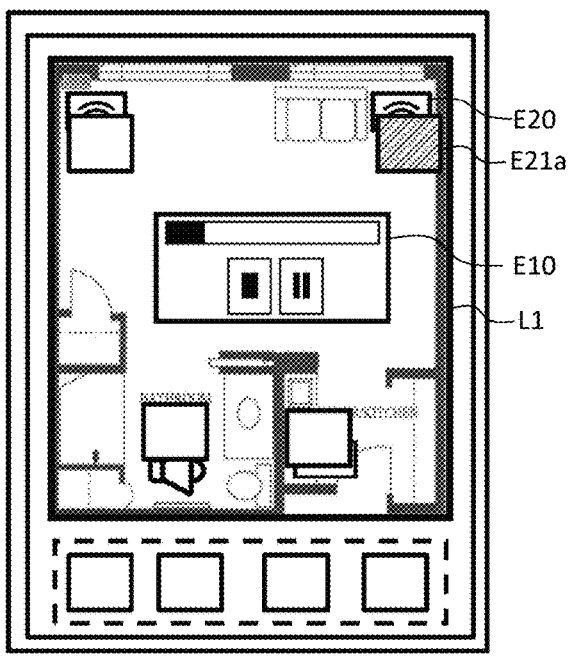

FIG. 16V schematically illustrates an example of a GUI for control of an ongoing cast, including a visual indication indicative of what media content item is casted to what media playback device on a layout image, in which a GUI element for the control has been popped up independently from the visual indication, according to some embodiments.

Figures 17A, 17B:
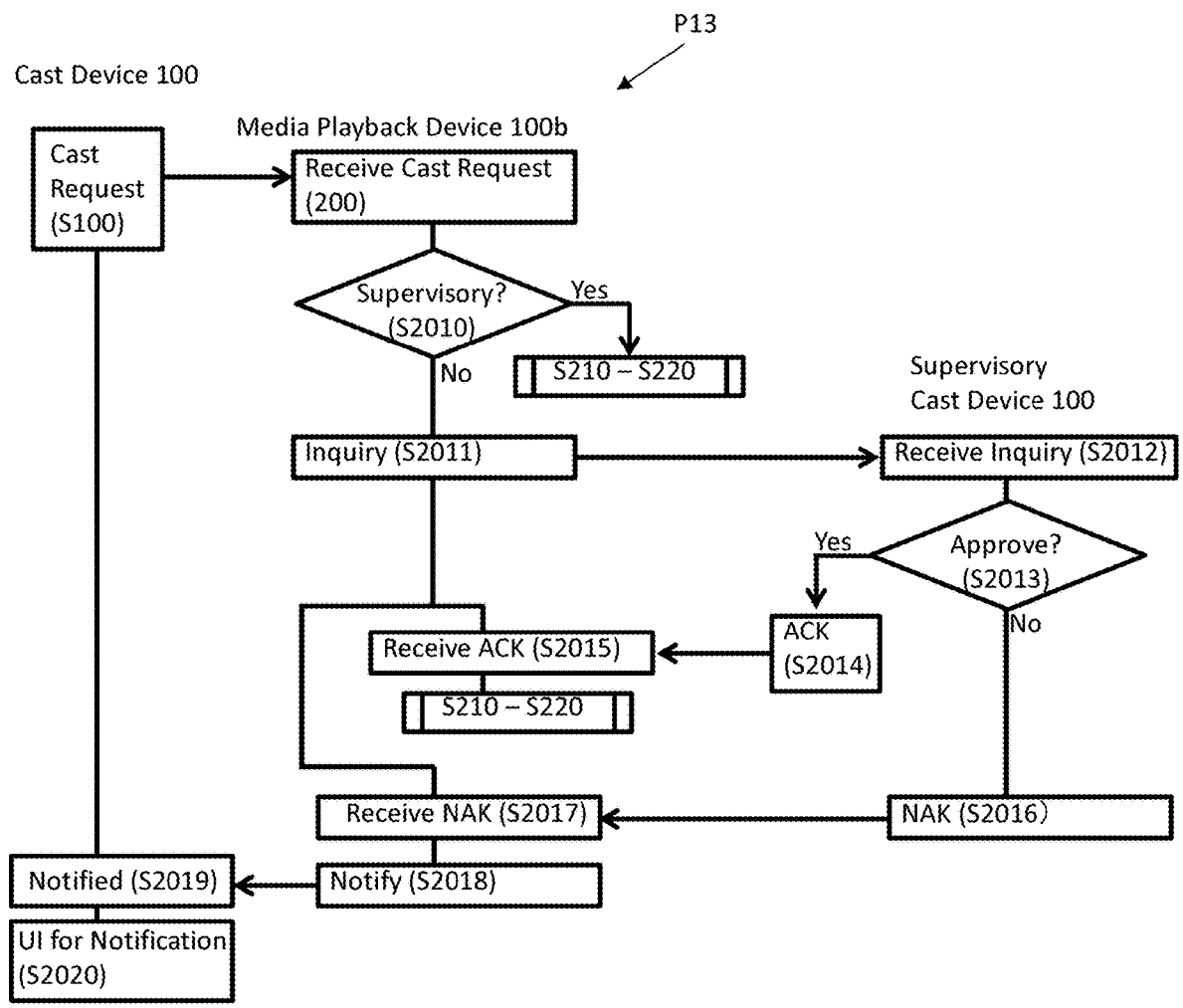

FIG. 17A schematically illustrates an example of a database or look-up table for management of whether each media playback device is supervisory or non-supervisory, according to some embodiments.

FIG. 17B is a flowchart illustrating an example of a process for initiation of cast of a media content item upon approval by a supervisory media playback device, according to some embodiments.

Figure 17C:
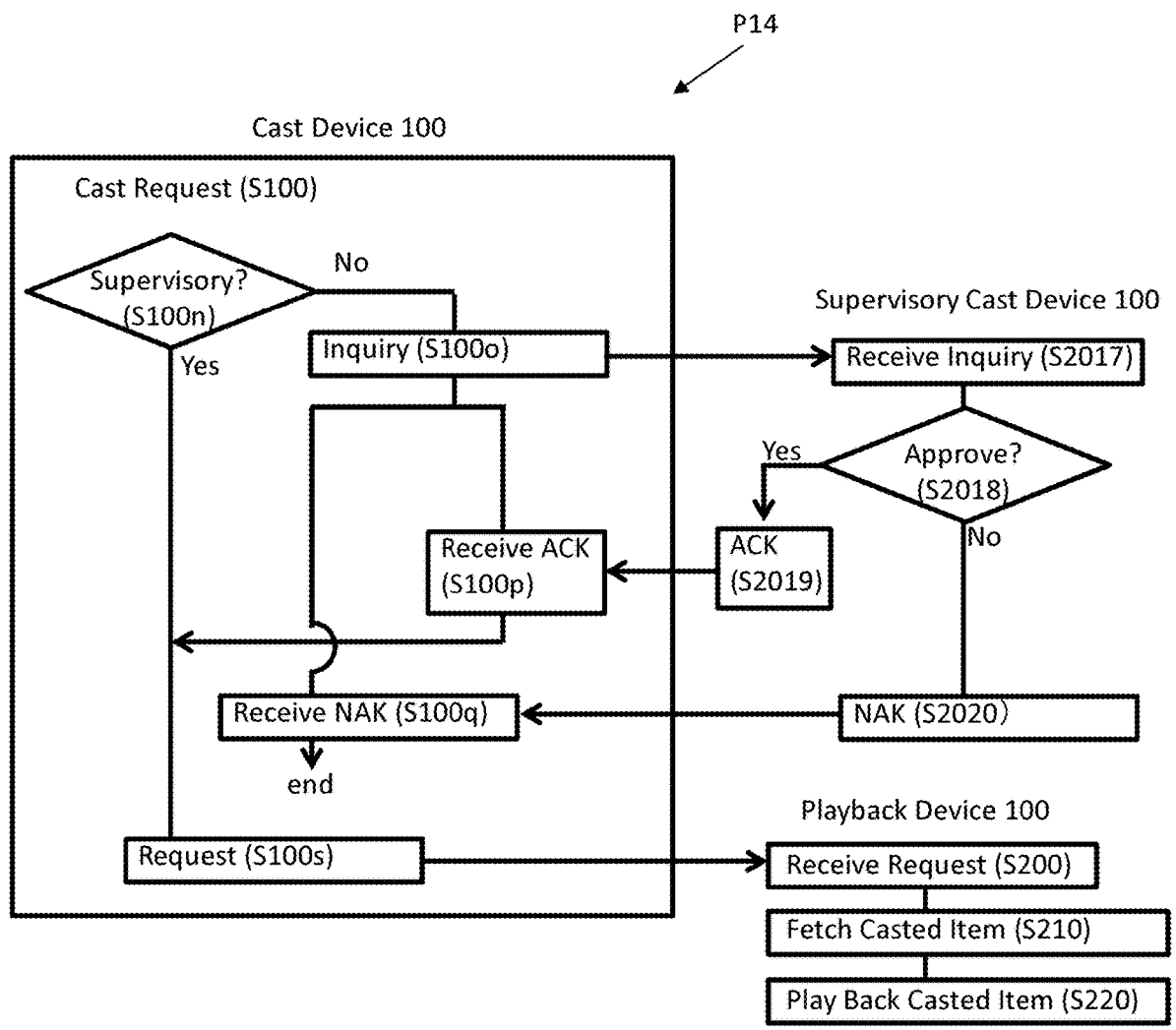

FIG. 17C is a flowchart illustrating an example of a process for initiation of cast of a media content item upon approval by a supervisory media playback device, according to some embodiments.

FIG. 18A schematically illustrates an example of a database or look-up table for management of the category (i.e., audio-in device or audio-out device) for each discovered UE, according to some embodiments.

FIG. 18B is a flowchart illustrating an example of a process for manual setting of a UE as an audio-in device or audio-out device for a PA system, according to some embodiments.

FIG. 18C schematically illustrates an example of a GUI through which to receive a user selection to set a UE as one of an audio-in device and audio-out device, according to some embodiments.

Figure 18D:
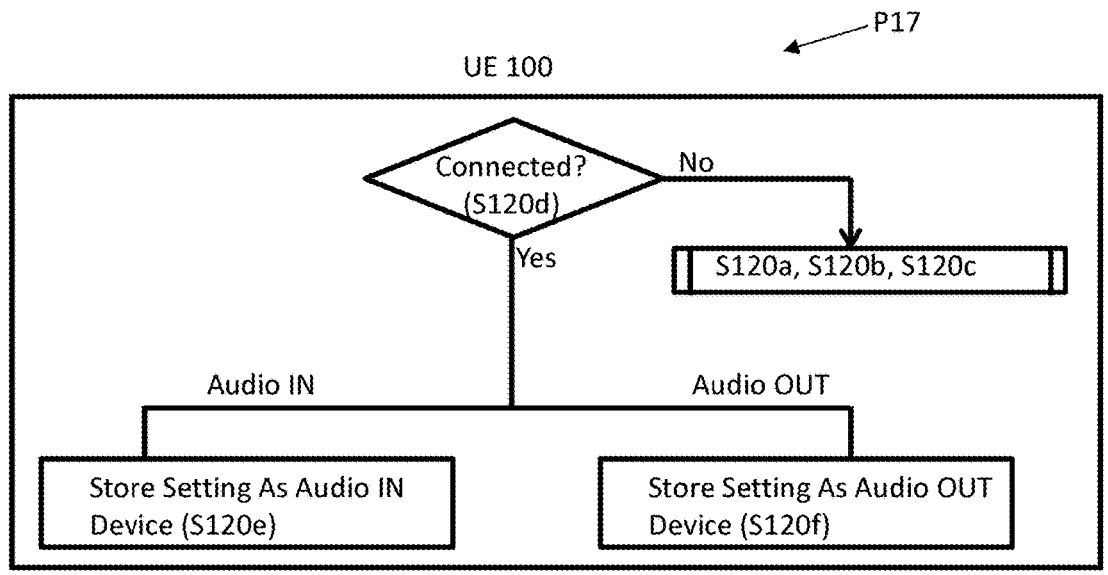

FIG. 18D is a flowchart illustrating an example of a process for automatic setting of a UE as one of an audio-in device and audio-out device depending on whether a peripheral device for audio input or output is connected to the UE, according to some embodiments.

FIG. 18E schematically illustrates an example of connection between a UE and a peripheral device, in which the UE reads identification information stored on the peripheral device to automatically set the UE as one of an audio-in device and audio-out device, according to some embodiments.

Figure 18F:
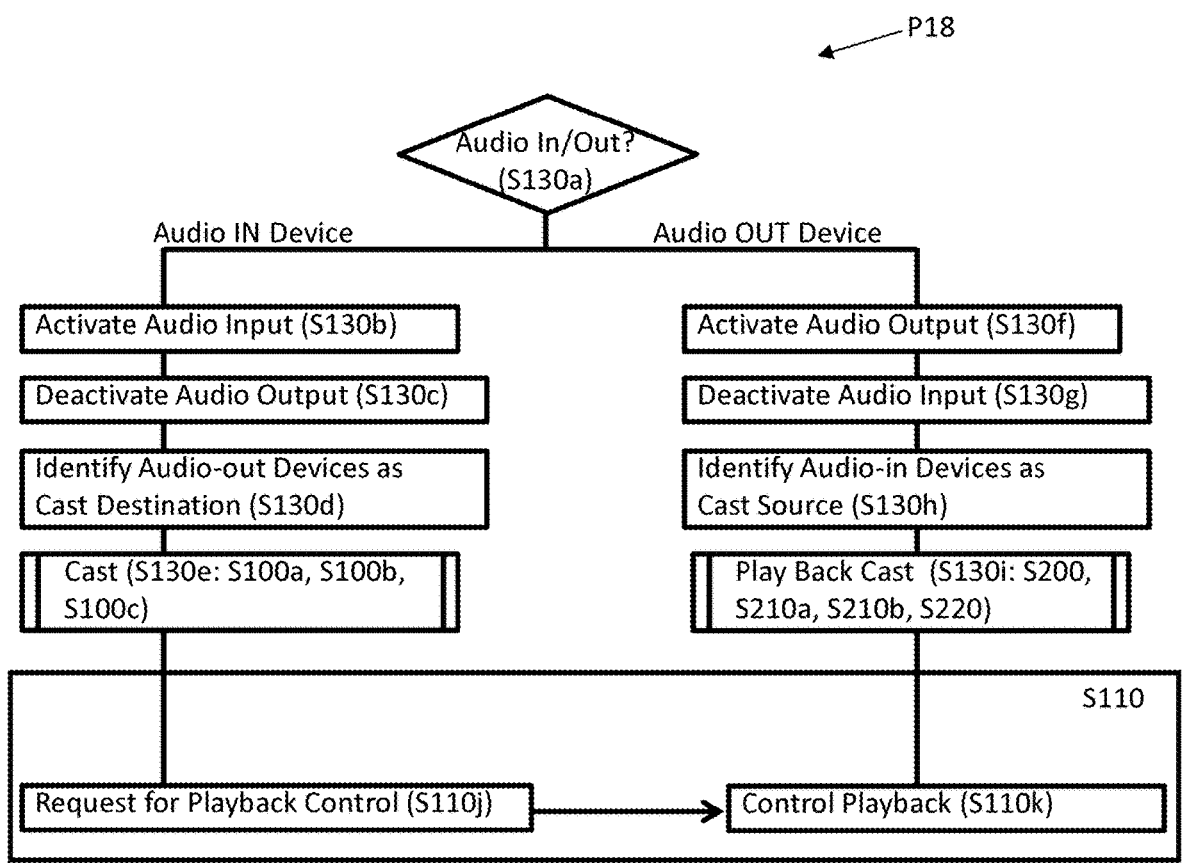

FIG. 18F is a flowchart illustrating an example of a process for a UE operating as an audio-in device or audio-out device for a PA system, according to some embodiments.

Figure 18G:
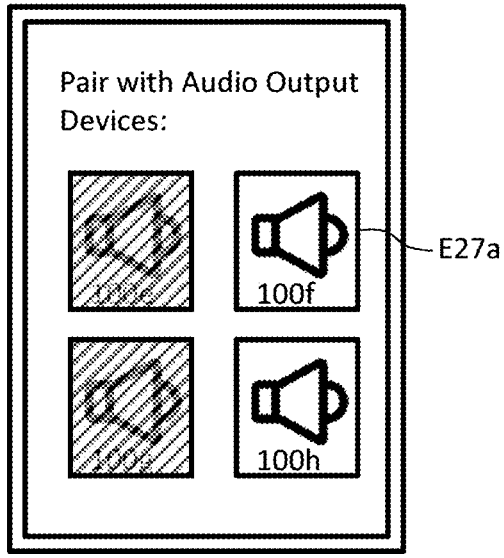

FIG. 18G schematically illustrates an example of a GUI on an audio-in device, through which to receive a user selection to pair with at least one audio-out device, according to some embodiments.

Figure 18H:
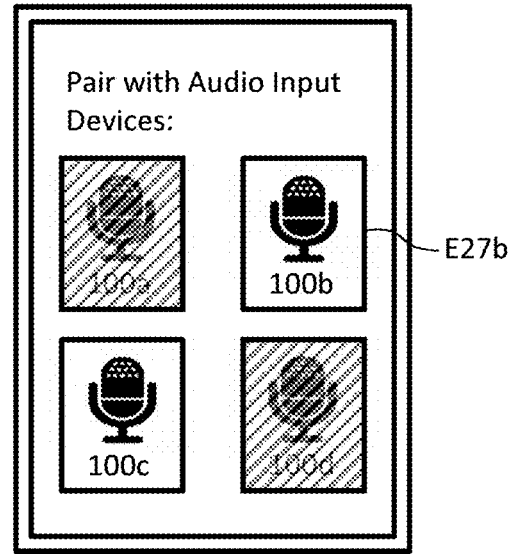

FIG. 18H schematically illustrates an example of a GUI on an audio-out device, through which to receive a user selection to pair with at least one audio-in device, according to some embodiments.

Figure 18I:
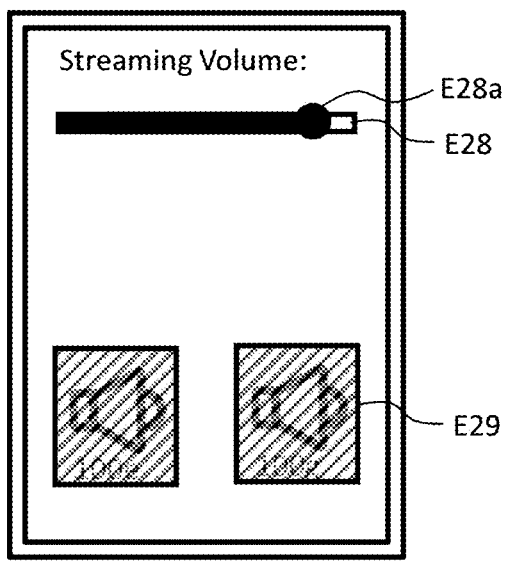

FIG. 18I schematically illustrates an example of a GUI on an audio-in device for control of the volume of at least one paired audio-out device, according to some embodiments.

Figure 18J:
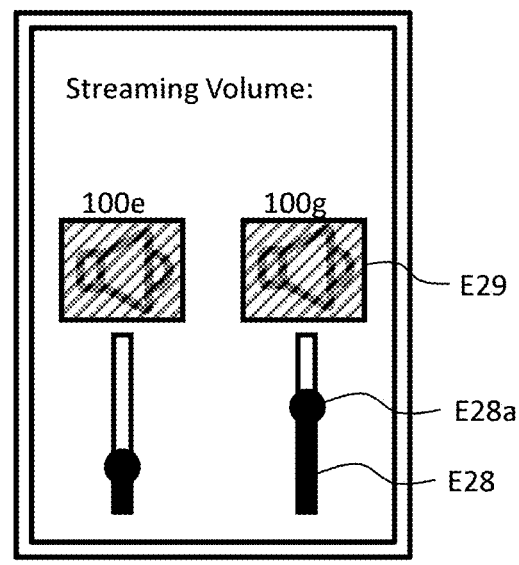

FIG. 18J schematically illustrates an example of a GUI on an audio-in device for control of the volume of at least one paired audio-out device, according to some embodiments.

Figure 18K:
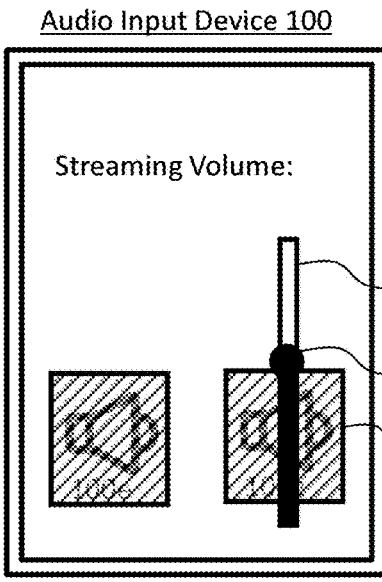

FIG. 18K schematically illustrates an example of a GUI on an audio-in device for control of the volume of at least one paired audio-out device, according to some embodiments.

Figure 19B:
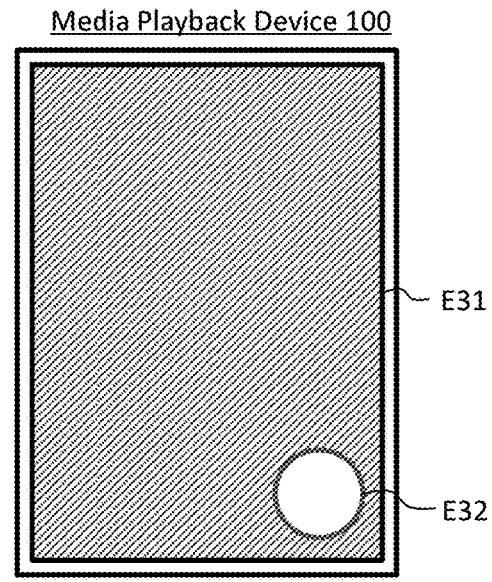
Figure 19A:
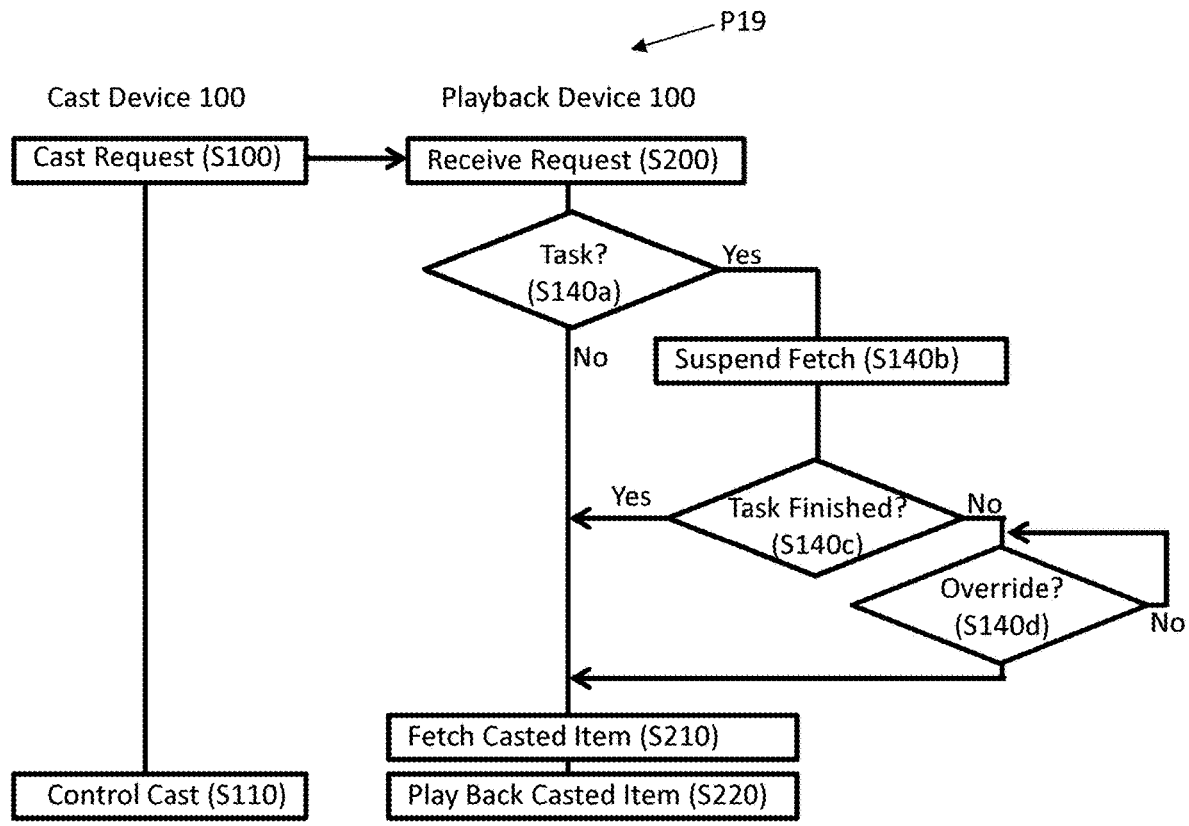

FIG. 19A is a flowchart illustrating an example of a process for automatic suspension of playback of a casted media content item and automatic initiation of the suspended playback, according to some embodiments.

FIG. 19B schematically illustrates an example of a GUI on a media playback device that prompts a user to override a conflicting task with initiation of a suspended playback of a casted media content item, according to some embodiments.

Figure 20A:
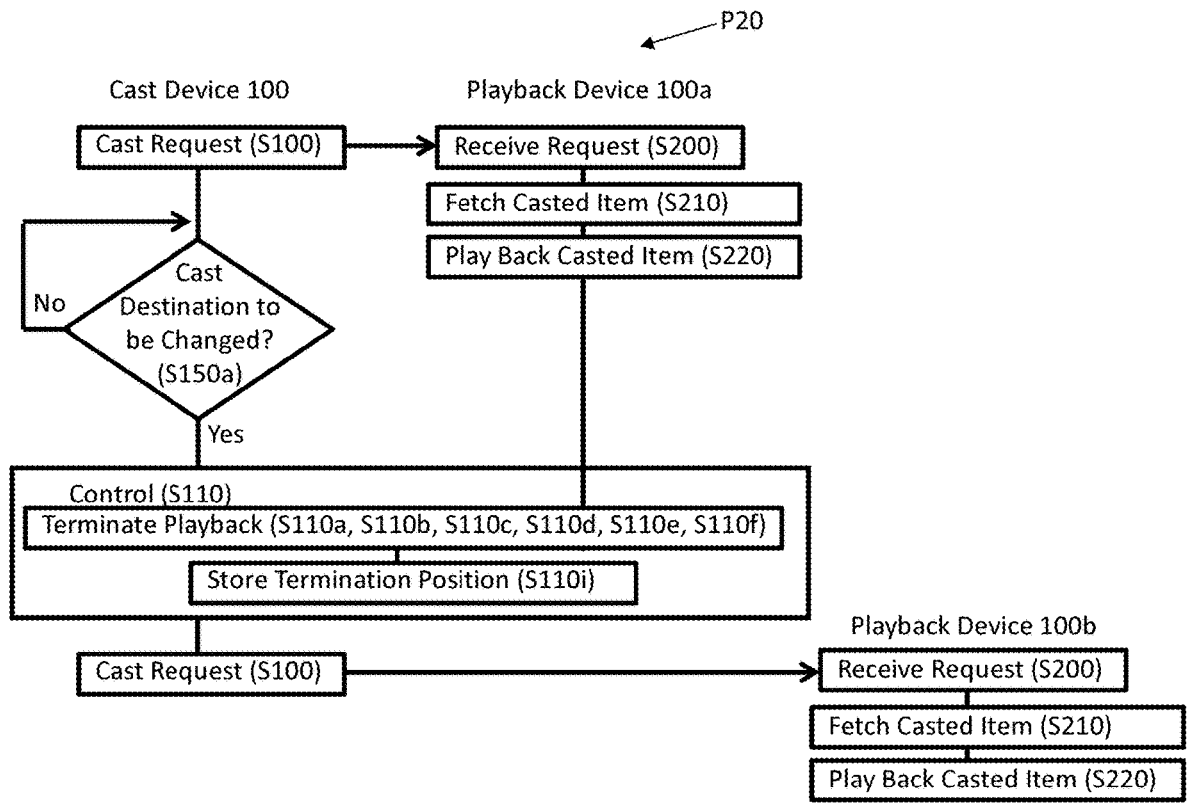

FIG. 20A is a flowchart illustrating an example of a process for switch of cast destinations in response to movement of a cast device, according to some embodiments.

Figure 20B:
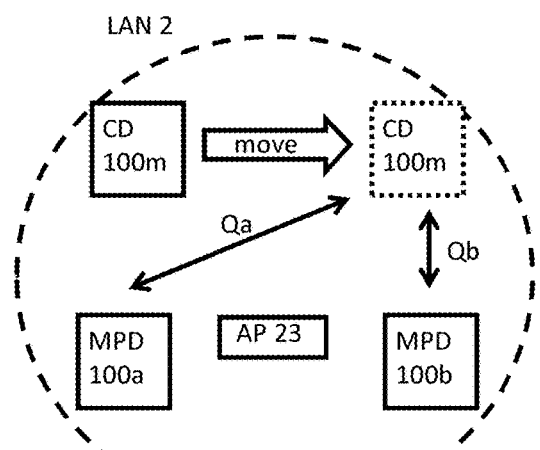

FIG. 20B schematically illustrates an exemplary situation where a cast destination has been changed from a first media playback device into a second media playback device that is present in the same local area network as the first media playback device, according to some embodiments.

Figure 20C:
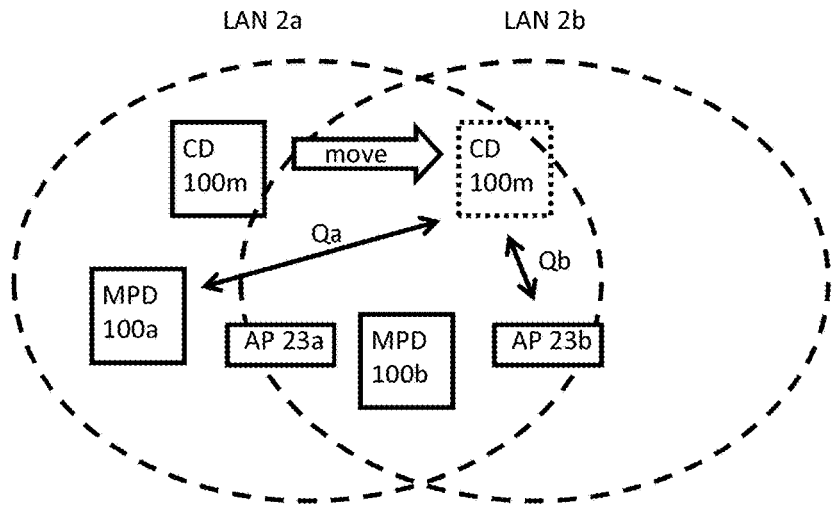

FIG. 20C schematically illustrates an exemplary situation where a cast destination has been changed from a first media playback device into a second media playback device that is present in a local area network adjacent to another local area network in which the first media playback device resides, according to some embodiments.

Figure 21A:
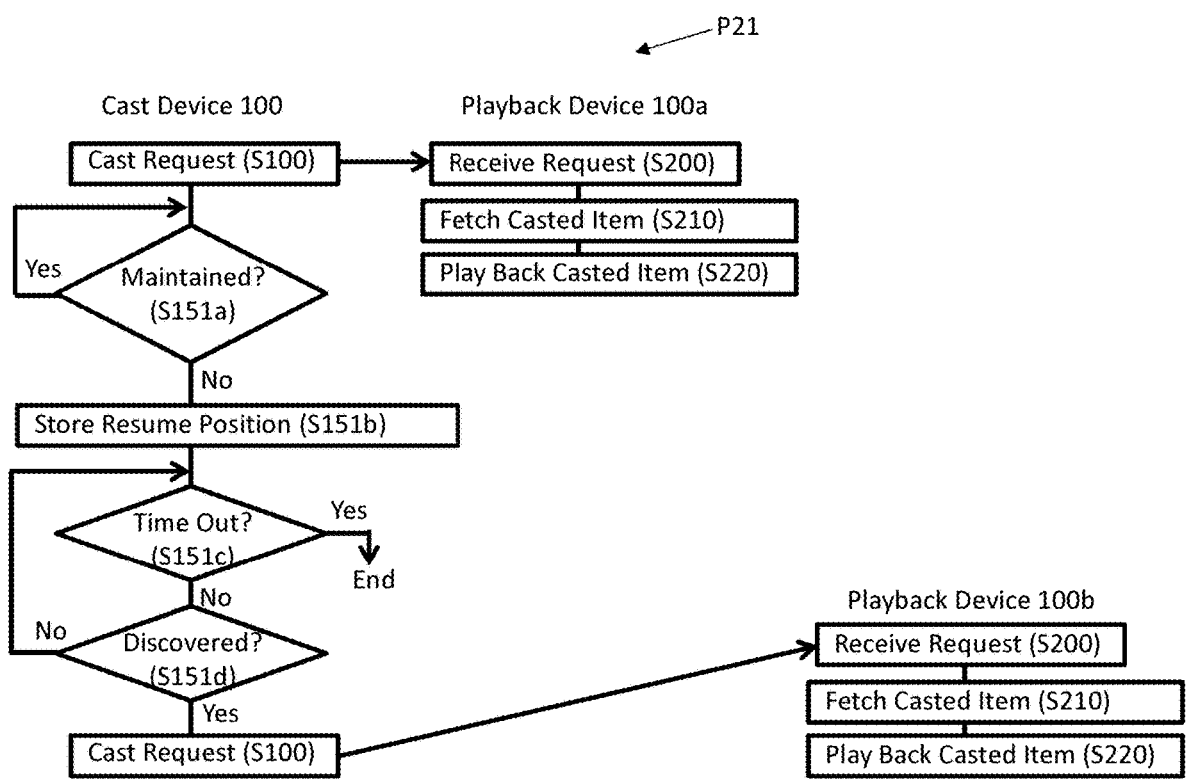

FIG. 21A is a flowchart illustrating an example of a process for resume of an interrupted cast, according to some embodiments.

Figure 21B:
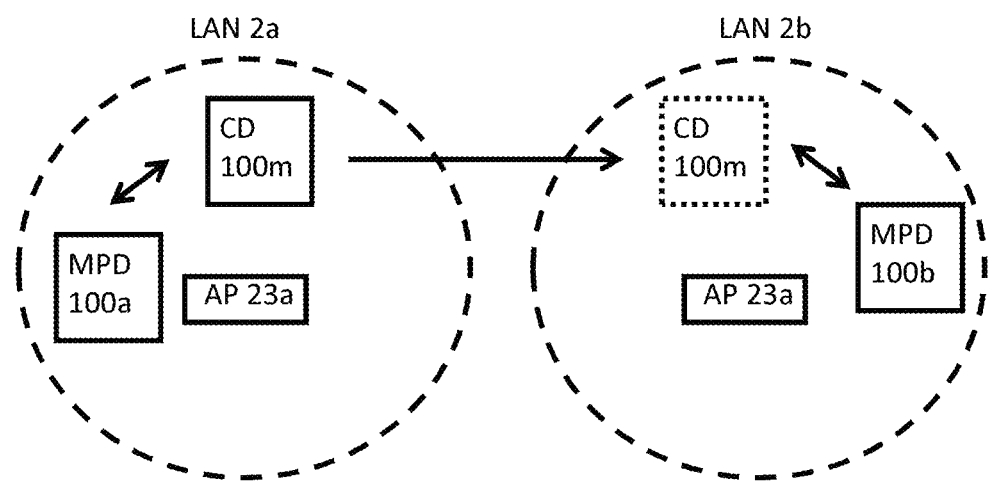

FIG. 21B schematically illustrates an exemplary situation where a cast interrupted on a first media playback device is resumed on a second media playback device that is present in a local area network adjacent to another local area network in which the first media playback device resides, according to some embodiments.

Figure 22D:
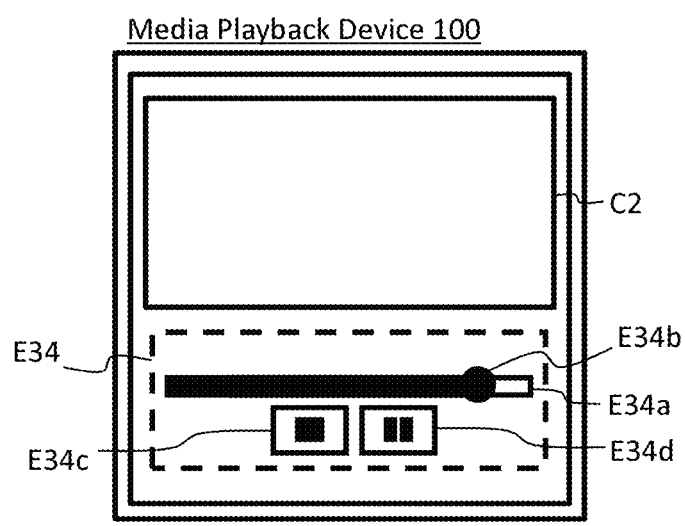
Figure 22A:
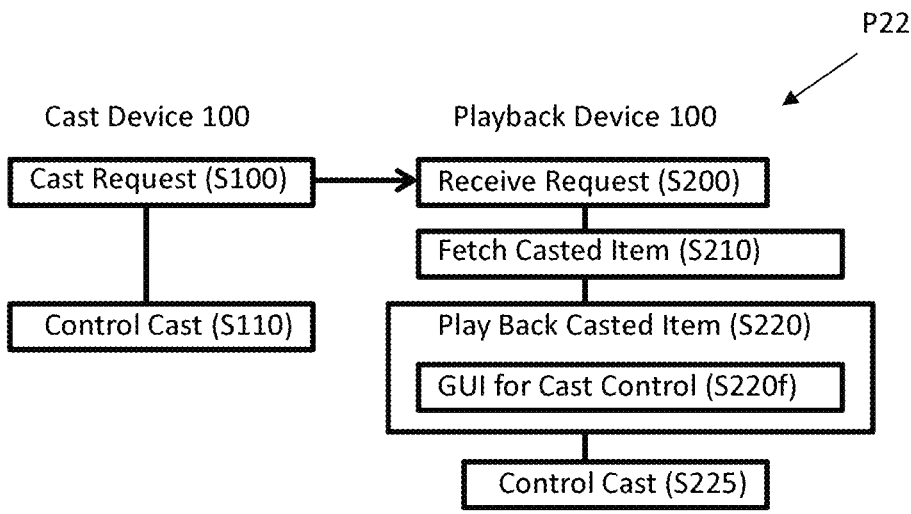

FIG. 22A is a flowchart illustrating an example of a process for control of a cast through a UI on a media playback device 100, according to some embodiments.

Figure 22B:
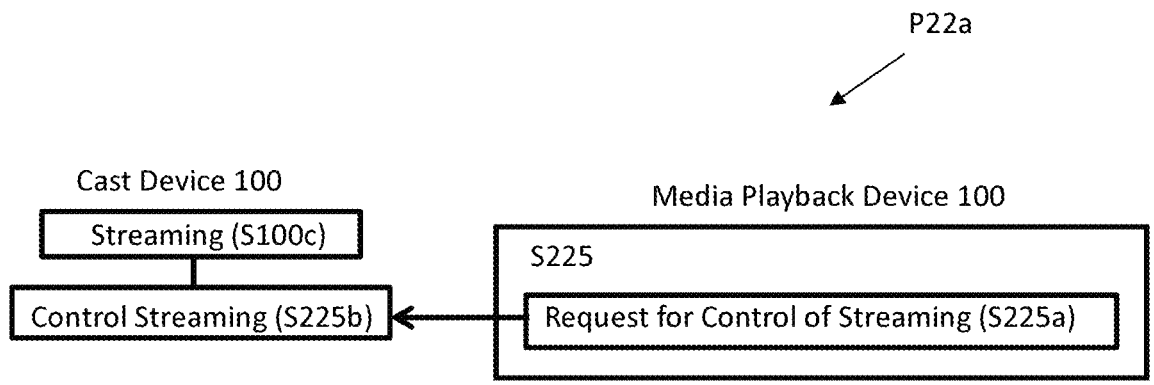

FIG. 22B is a flowchart illustrating an example of a process for control of a cast through a UI on a media playback device 100, in a situation where a local media content item is streamed over a local area network, according to some embodiments.

Figure 22C:
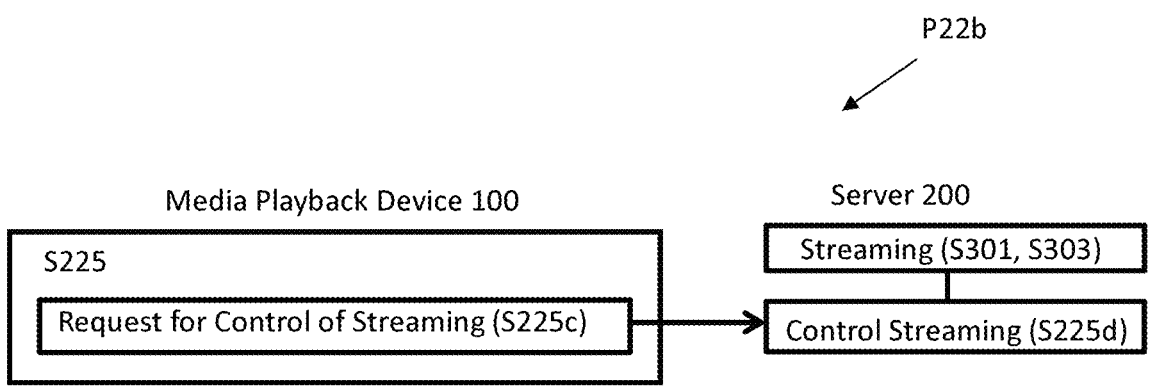

FIG. 22C is a flowchart illustrating an example of a process for control of a cast through a UI on a media playback device 100, in a situation where an online media content item is streamed over the Internet, according to some embodiments.

FIG. 22D schematically illustrates an example of a GUI displayed on a media playback device for control of an ongoing cast of a media content item, according to some embodiments.

Figure 23A:
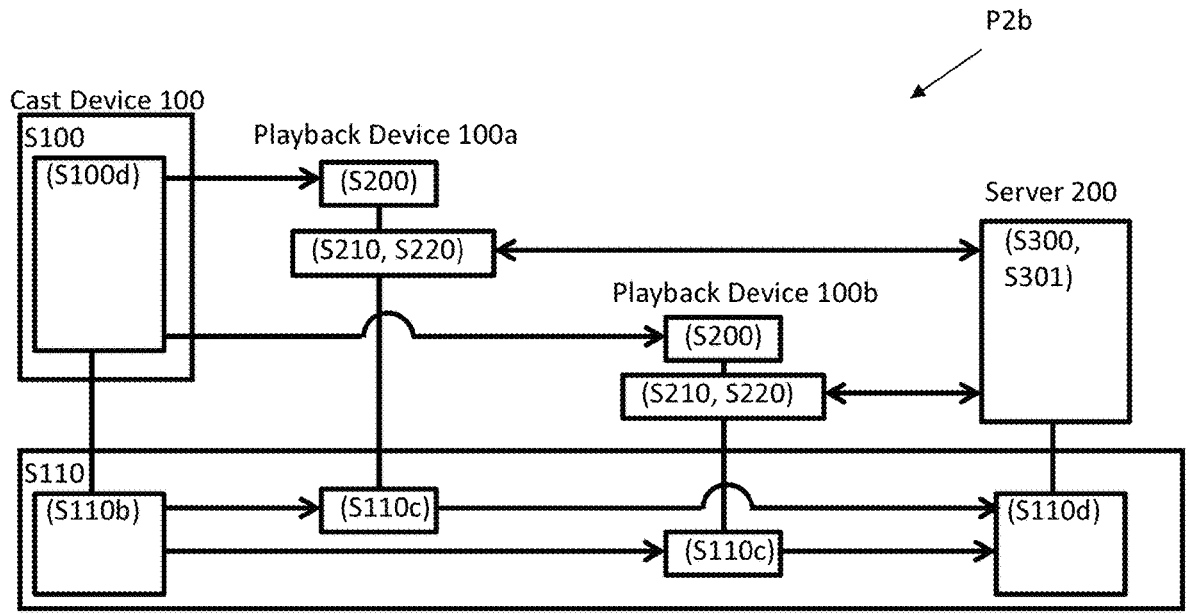

FIG. 23A is a flowchart illustrating an example of a process for a "split cast" for casting video and audio content items to different destinations, according to some embodiments.

Figure 23B:
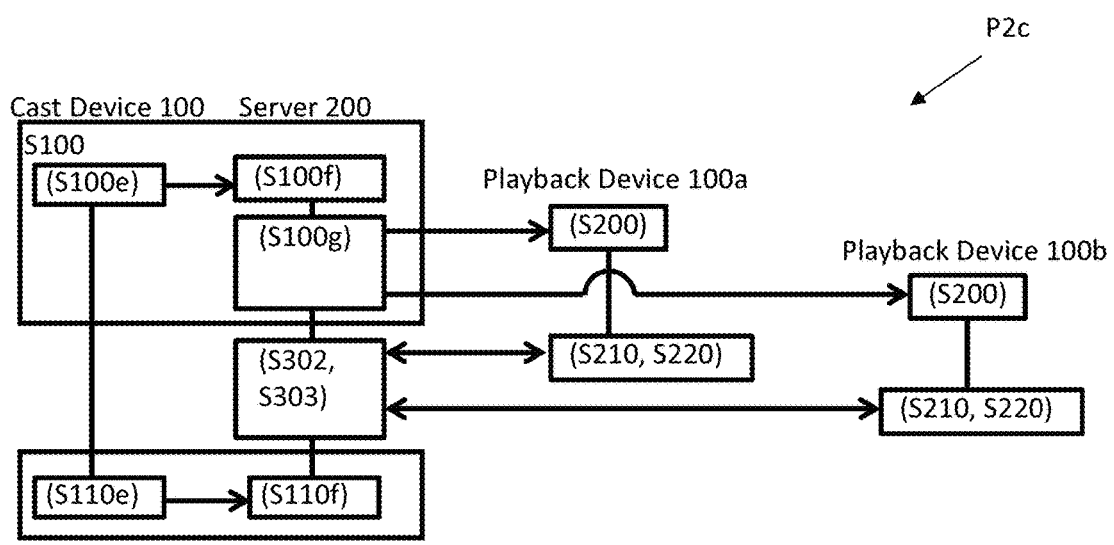

FIG. 23B is a flowchart illustrating an example of a process for a "split cast" for casting video and audio content items to different destinations, according to some embodiments.

Figure 23C:
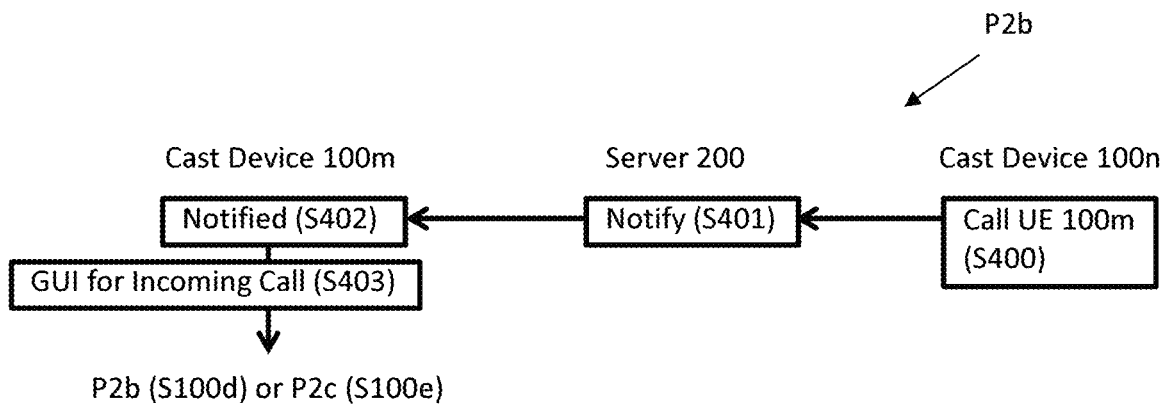

FIG. 23C is a flowchart illustrating an example of a process for a "split cast" for casting video and audio streams to different destinations in a video communication, according to some embodiments.

Figure 23D:
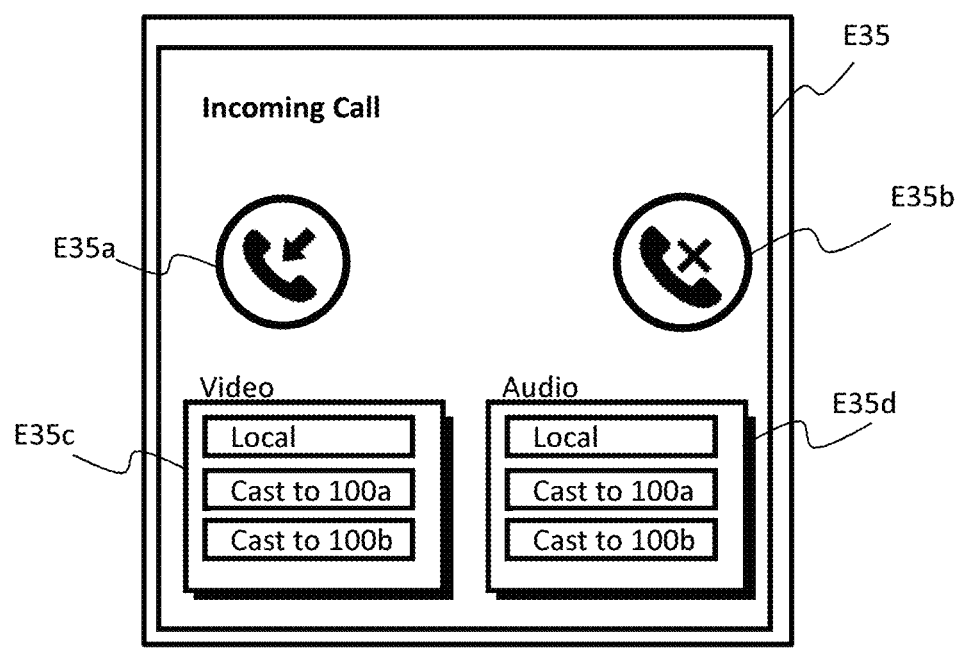

FIG. 23D schematically illustrates an example of a GUI on a cast device upon an incoming call from a caller in a video communication, through which to cast video and audio streams to different destinations, according to some embodiments.

Figure 23E:
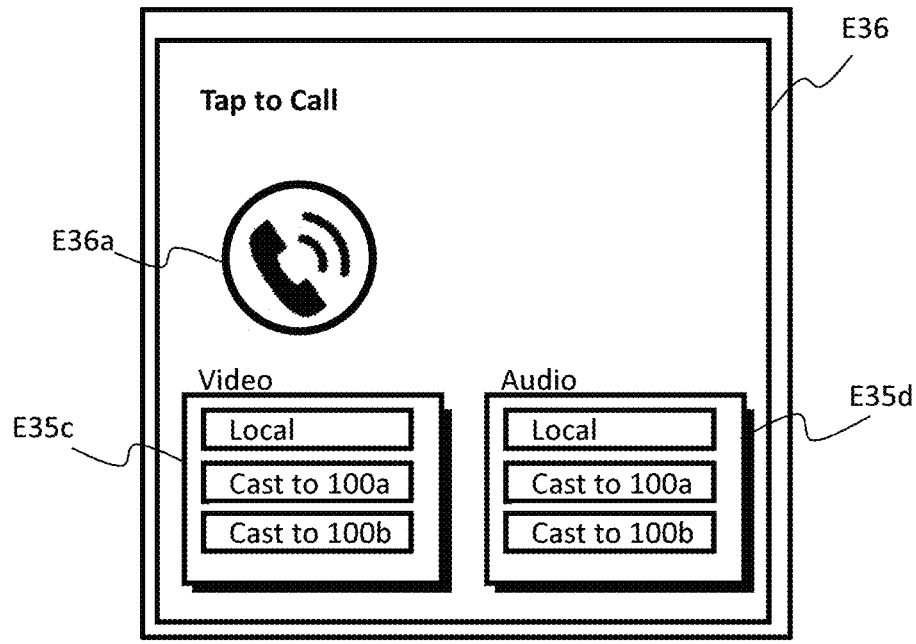

FIG. 23E schematically illustrates an example of a GUI on a cast device upon initiation of a call to a callee in a video communication, through which to cast video and audio streams to different destinations, according to some embodiments.

Figure 23F:
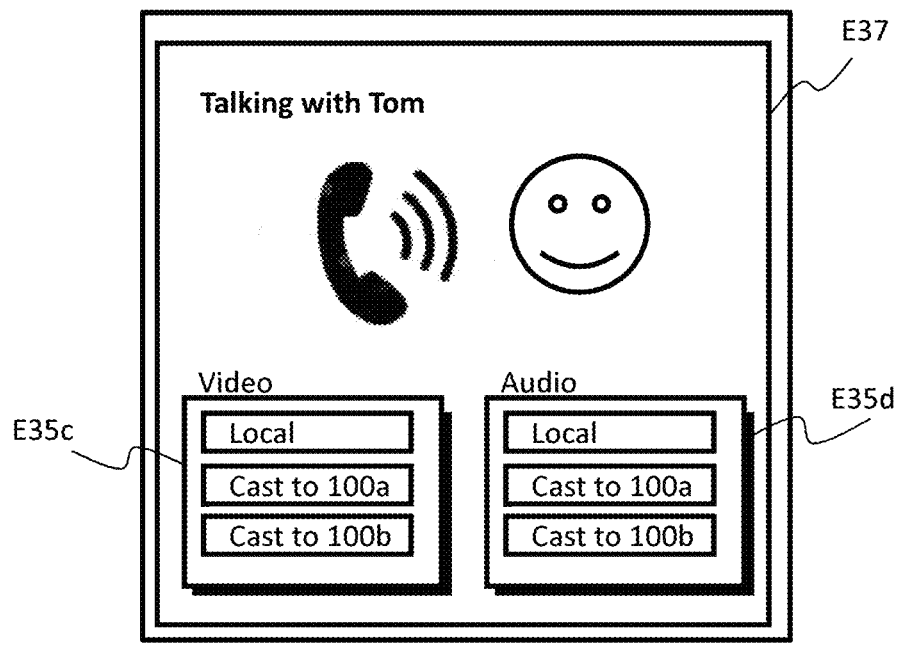

FIG. 23F schematically illustrates an example of a GUI on a cast device during a video communication, through which to cast video and audio streams to different destinations, according to some embodiments.

Figure 24A:
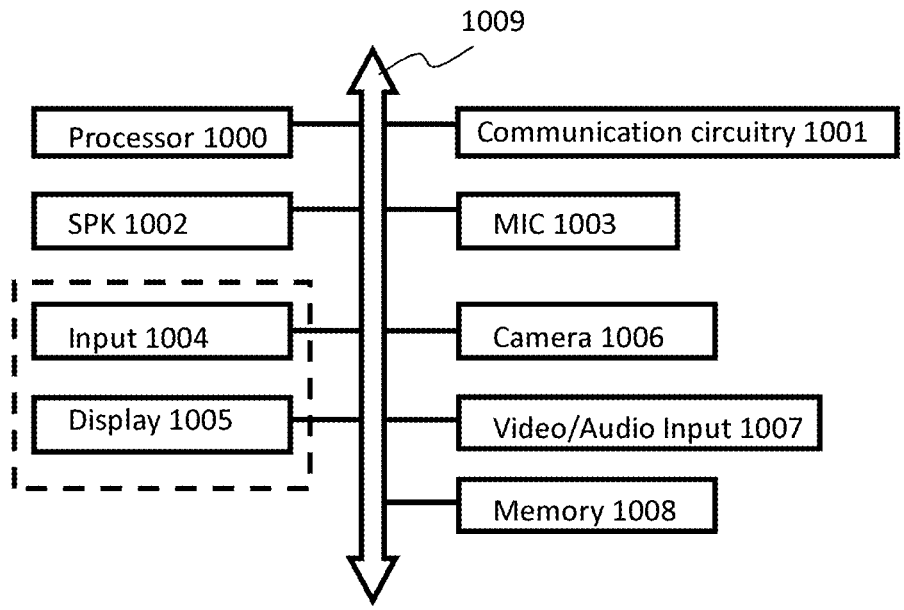

FIG. 24A is a block diagram illustrating an example of a structure of a UE operative as a cast device or media playback device, according to some embodiments.

Figure 24B:
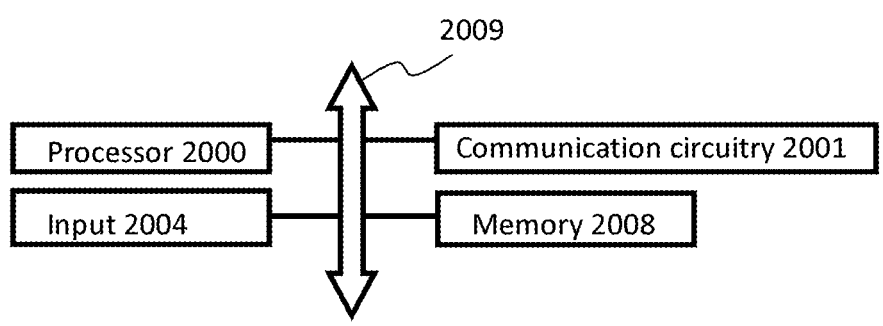

FIG. 24B is a block diagram illustrating an example of a structure of a server for streaming an online media content item, according to some embodiments.

DETAILED DESCRIPTION

System Overview

Embodiments are described herein with reference to the attached drawings. Embodiments are only for the purpose of describing exemplary implementations of the inventive concept defined by Claims, and therefore are not intended to limit in any way the scope of the claimed invention.

In some embodiments, a system may includes at least one mobile network and/or and at least one local area network (LAN), both of which may be connected to the Internet. In the mobile network, at least one multi-access edge computing (MEC) server may be provided in a radio access network (RAN) and/or a core network (CN). The MEC server may run an app hosted thereon to provide a first service to user equipments (UEs) in a limited coverage associated with the RAN or CN. The MEC server may be associated with a particular cloud server accessible over the Internet that provides a second service associated with the first service. The first and second services may be simultaneously or concurrently provided to UEs, or one of the services may be selectively provided to the UEs. In the LAN, one or more UEs in the same LAN may mutually discover one another. A UE may "cast" a locally-stored or online media resource to at least one other discovered UE over the LAN, so that said other UE may play back the casted resource.

In the specification, a user equipment (UE) is generally a device designed to be used by an end-user in any form in the mobile network and/or LAN. The UE may be a mobile or portable one, or a fixed one installed or otherwise situated in a specific location. An example of such UE may include a cell phone, smartphone, tablet, laptop, personal computer (PC), personal digital assistant (PDA), smart watch, head mount display (HMD), display or monitor, loudspeaker, television set, smart TV, microphone, headphone, earphone, and other electronic devices, gadgets, appliances, etc. The UE may be referred to also as a terminal, mobile station, user device, node, endpoint, etc. The UE in the specification may include but is not limited to the "user equipment" defined in telecommunication standards or specifications such as IMT-Advance and IMT-2020.

Figure 1:
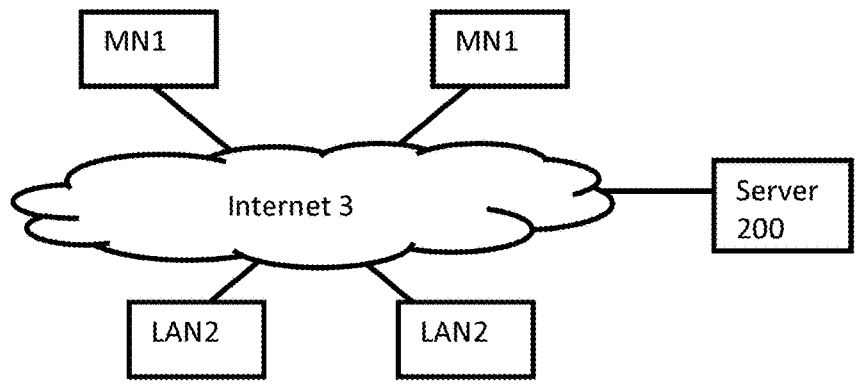

FIG. 1 schematically illustrates an example of a system according to some embodiments. The system may include at least one mobile network 1, at least one local area network (LAN) 2, and the Internet 3. The mobile network 1 may be a network distributed over cells (radio coverage areas) for providing wireless communication between UEs, which may be referred to also as a cellular network. The mobile network 1 may be a network system pursuant to the third-generation (3G) mobile communication standard in compliance with International Mobile Telecommunications (IMT) 2000 specifications and associated 3rd Generation Partnership Project (3GPP) specifications, fourth-generation (4G) mobile communication standard in compliance with IMT-Advanced specifications and associated 3GPP specifications, fifth-generation (5G) mobile communication standard in compliance with IMT-2020 specifications and associated 3GPP specifications, and/or beyond. Each mobile network 1 may be run, managed, or operated by a specific carrier, namely, telecommunication service provider. Two or more mobile networks may be connected together through gateways provided in the respective networks. Each mobile network 1 may be connected to the Internet 3 through a gateway. The LAN 2 may be a computer network that interconnects computers (e.g., UEs) in the LAN 2. The LAN 2 may be established or formed in a limited area such as a residence, school, laboratory, university campus, and office building. They system may further include a server computer 200 connected to the Internet 3 that is accessible from UEs in the mobile network 1 and LAN 2 over the Internet 3. The server computer 200 may have one or more apps hosted thereon to provide one or more services to the UEs over the Internet 3 by executing the apps.

Figure 2:
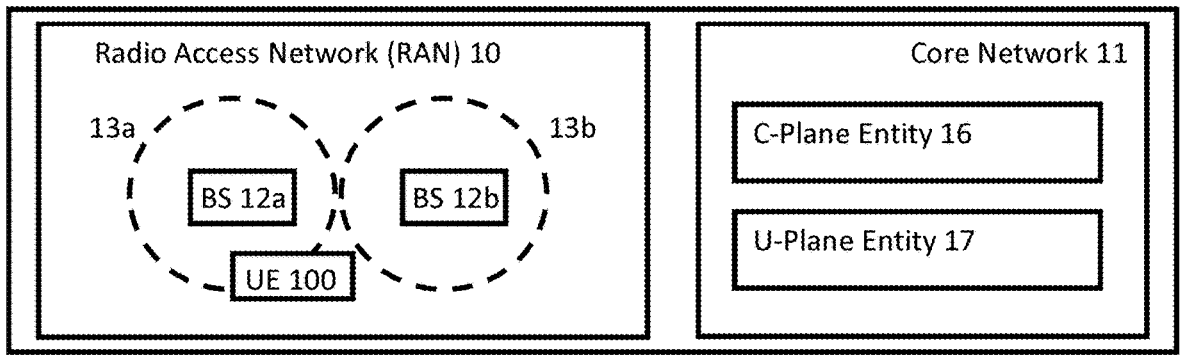

FIG. 2 schematically illustrates an example of the mobile network 1 in more detail, according to some embodiments.

As illustrated herein, the mobile network 1 may generally comprise a radio access network (RAN) 10 and a core network (CN) 11.

The RAN 10 is part of the mobile network 1 that enables the UEs 100 to wirelessly connect to the CN 11. The RAN 10 may comprise one or more base stations (BSes) 12 for providing radio (wireless) communications between the UEs 100 and CN 11. Each base station 12 may be a wireless communication station fixed in a given area on a land or a mobile base station in a form of a vehicle. Each base station 12 may provide a specific wireless coverage area, namely, a specific cell within which the UEs 100 are able to wirelessly communicate with the corresponding base station 12. The base station or BS 12 may be referred to also as a base transceiver station (BTS), Node B, eNode B (eNB), gNode B (gNB), etc. depending on the standard or specifications on which the mobile network 1 relies. Each cell provided by the BS 12 may be a macro cell (macrocell), micro cell (microcell), pico cell (picocell), femto cell (femtocell), etc. depending on the intensity of radio or largeness of coverage the BS 12 provides. The RAN 10 may also include one or more radio network controllers (RNCs) situated between one or more BS 12 and CN 11 to manage and control communications between the BS 12 and CN 11. In an aspect of a Centralized RAN (C-RAN) architecture, the BS 12 may include a centralized station such as a Baseband Unit (BBU) and Central Unit (CU), and one or more distributed stations such as Remote Radio Heads (RRHs) and Distributed Units (DUs) that are connected to and controlled by the centralized station. The BS 12 may have a radio communication coverage area of the centralized station that corresponds to the cells provided by the associated (connected) distributed stations. The BS 12 may have a radio communication coverage of a particular distributed station that corresponds to a cell provided by itself. In the example illustrated in FIG. 2, two base stations 12a and 12b are shown providing coverage areas 13a and 13b respectively while one UE 100 residing in the coverage area 13a is shown, for illustrative purposes only.

The CN 11 is another part, especially a core part, of the mobile network 1 that provides a variety of services to the UEs 100 connected to the CN 11 through the RAN 10. Most importantly, the CN 11 is configured to manage mobility and communication sessions of the UEs 100 and route or direct data between the UEs 100 in the RAN 10, between a UE 100 in the RAN 10 and a UE 100 in another RAN, and between a UE 100 in the RAN 10 and an entity in the Internet 3. In general, the CN 11 may comprise a Control Plane (C-Plane) function 16 that is responsible for management of the UEs and a User Plane (U-Plane) function 17 that is responsible for mainly routing or steering of user data transmitted from/to the UEs 100, which are functionally separated from one another. The management of the UEs 100 in the C-Plane function 16 may include management of mobility of the UEs 100 such as handover and location registration of the UEs 100, allocation of Internet Protocol (IP) addresses to the UEs 100, access authentication, etc. Data such as control messages used in the C-Plane function 16 may be referred to as C-Plane data. In the 4G mobile communication system where the RAN 10 and CN 11 are an evolved universal mobile telecommunications system terrestrial radio access network (E-UTRAN) and an evolved packet core (EPC), respectively, the C-Plane function 16 may be implemented by entities or nodes such as a Mobility Management Entity (MME) configured to manage mobility of the UEs 100; part of Packet Data Network Gateway (P-GW) or P-GW-U configured to allocate IP addresses to the UEs 100, serving as a gateway for communication with the Internet 3; etc. In the 5G mobile communication system, the C-Plane function 16 may be implemented by entities or nodes such as an Access and Mobility Management Function (AMF) configured to manage mobility of the UEs 100, a Session Management Function (SMF) configured to allocate IP addresses to the UEs 100 and manage communication sessions, etc. The user data processed in the U-Plane function 17 may include voice data for voice communication, video data for video communication, etc., which may be referred to also as U-Plane data. In the 4G mobile communication system, the U-Plane function 17 may be implemented by entities or nodes such as part of the P-GW or P-GW-C configured to route IP packets, etc. In the 5G mobile communication system, the U-Plane function 17 may be implemented by entities or nodes such as a User Plane Function (UPF) configured to route IP packets. The CN 11 may include more various elements for management of communications of the UEs 100 such as a home location register (HLR), home subscriber server (HSS), etc.

Figure 3:
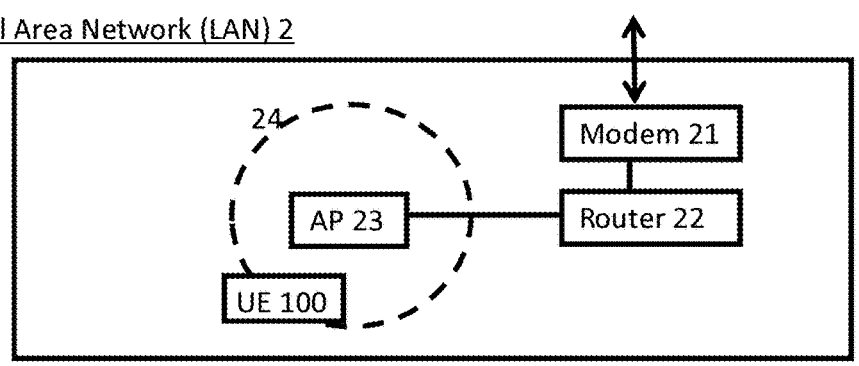

FIG. 3 schematically illustrates an example of the local area network or LAN 2 in more detail, according to some embodiments. As illustrated herein, the LAN 2 may generally comprise a modem 21 for modulation and demodulation of digital data to provide data communication between the LAN 2 and the Internet 3. An example of the modem 21 may be a cable modem, digital subscriber line (DSL) modem, optical modem, etc. The LAN 2 may further comprise a router 22 that is configured to route or forward communication data between the UEs 100 in the LAN 2 and between a UE 100 in the LAN 2 and other endpoints in the Internet 3. The LAN 2 may further comprise an access point (AP) 23 that is configured to provide a wireless local area network (WLAN) communication having a corresponding limited wireless coverage area 24 within which the UEs 100 can perform WLAN communications. The WLAN communication may be one which is pursuant to IEEE 802.11 specifications also known as Wi-Fi, IEEE 802.15 specifications, wireless optical communication or visible light communication also known as Light Fidelity (Li-Fi), or other short-range or close-range wireless communication for local area networking.

Cast in LAN 2

Figure 4:
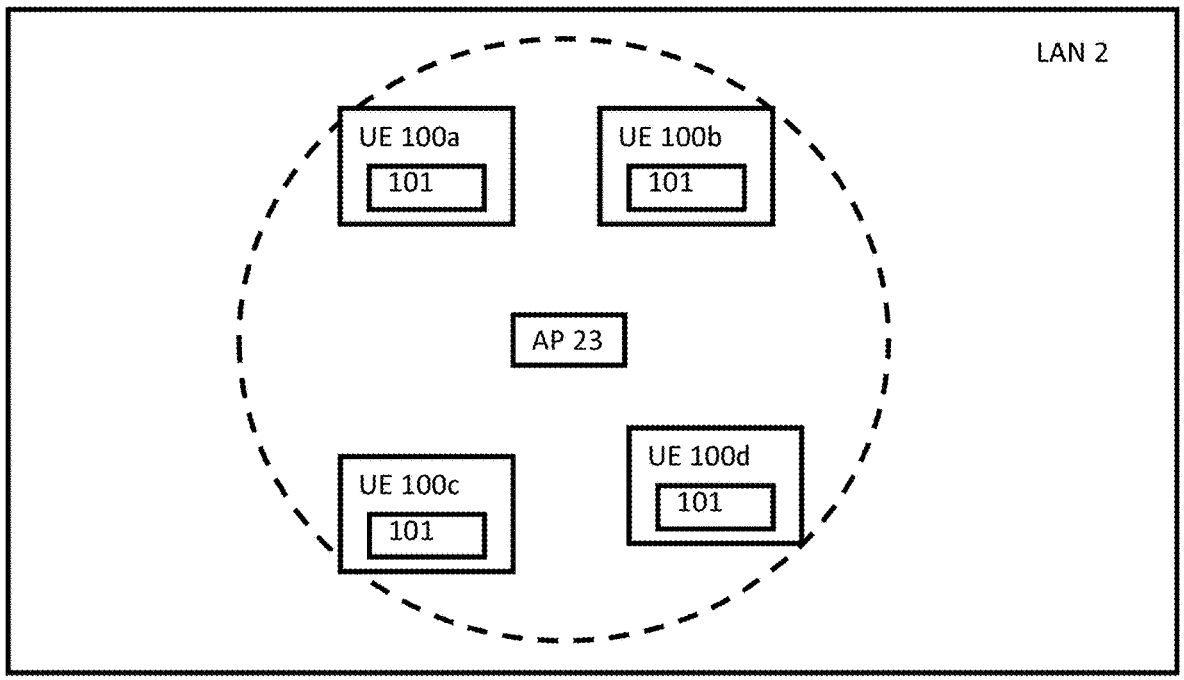

FIG. 4 schematically illustrates an example of the LAN 2 in which UEs 100 (UE 100a, UE 100b, UE 100c, UE 100d) reside in the LAN 2. In the LAN 2, UEs 100 may discover one another, and a UE 100 may "cast" a local or online media content item to another discovered UE 100 over the LAN 2. A UE 100 which is set as a "cast device" may perform the cast of the media content item, whereas a UE 100 which is set as a "media playback device" may receive the cast of the media content item and play back the media content item. The UE 100 as a cast device may determine the destination for playback of the media content item, namely, selectively play back the media content item locally on the UE 100 or cast the media content item to a discovered UE 100 as a media playback device. The cast device 100 may play back the media content item locally upon determining that the destination is the cast device 100 itself, whereas the cast device 100 may cast the media content item to the media playback device 100 upon determining that the destination is the media playback device 100. Each UE 100 may be categorized into one of a cast device and media playback device and set as one of the devices by default, or may be set as one of the devices manually in response to a user's selection or automatically in response to a given event such as installation and launch of a specific app. Each UE 100 may store therein attribute information 101 indicative of the attribute (i.e., quality, properties, or characteristics) of the corresponding UE 100. The attribute information 101 may indicate which category of "cast device" and "media playback device" the UE 100 is set to be or belongs to. A UE 100 as a cast device may store therein the attribute information 101 indicative of "cast device", whereas a UE 100 as a media playback device may store therein the attribute information 101 indicative of "media playback device". A UE 100 set as a cast device may be often simply referred to also as a cast device 100, while a UE 100 set as a media playback device may be often simply referred to also as a media playback device 100. A cast device 100 may have an app (cast app) installed thereon that includes instructions for casting a media content item to a discovered media playback device 100, whereas a media playback device 100 may have an app (player app) installed thereon that includes instructions fro receiving cast of a media content item from a cast device 100. Installation and launch of the cast app may automatically provide the attribute information 101 indicative of a cast device on the UE 100, causing the UE 100 to be set as a cast device, whereas installation and launch of the player app may automatically provide the attribute information 101 indicative of a media playback device on the UE 100, causing the UE 100 to be set as a media playback device. The UE 100 may allow the user to manually set the UE 100 to be a cast device or media playback device on an app installed on the UE 100, so that the attribute information 101 indicative of a cast device or media playback as manually set by the user may be stored on the UE 100.

Figure 5:
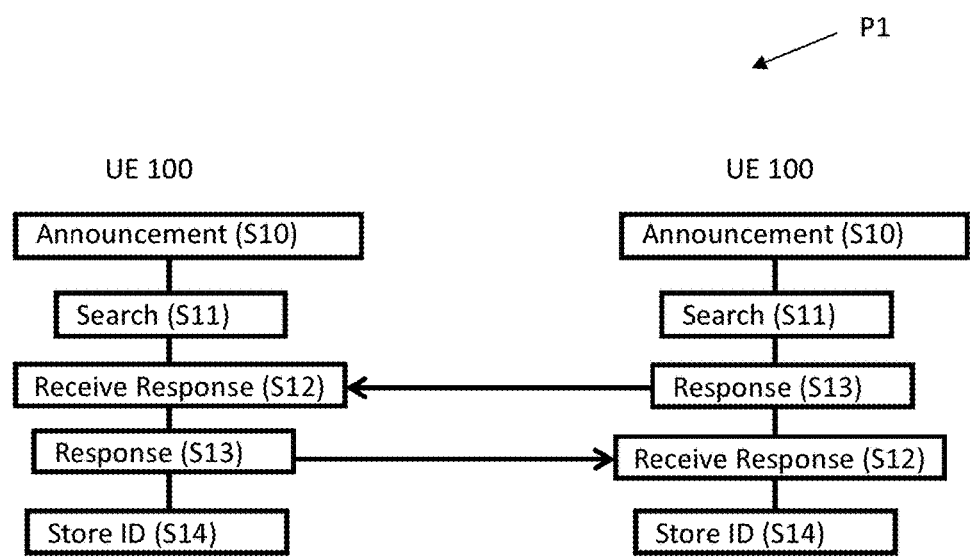

First, cast of a media content item may begin by the UEs 100 (at least one cast device 100 and at least one media playback device 100) discovering one another on the LAN 2 according to a discovery process. The discovery process may include one which is in accordance with a known device/service discovery protocol such as: a Web Service Dynamic Discovery (WSD) approved by Organization for the Advancement of Structured Information Standards (OASIS); Domain Name System (DNS)-based Service Discovery (DSN-SD) such as multicast DNS (mDNS) published as RFC 6762, Simple Service Discovery Protocol (SSDP) used in Universal Plug And Play (UPnP), Service Discovery Protocol (SDP) used in Bluetooth; and the likes. FIG. 5 is a flowchart illustrating an example of a typical discovery process P1 for the UEs 100 to discover one another over the LAN 2. As illustrated herein, typically, the discovery process P1 may include each UE 100: announcing (i.e., advertising or notifying) the presence of itself using a multicast message (S10); searching for UEs 100 of interest using a multicast message (S11); receiving a response to the search sent by each discovered other UE 100 using a unicast message, to acquire information associated with each discovered other UE 100 (S12). The discovery process may also include each UE 100 sending a response to the search of UEs of interest, the response including information associated with the UE 100 itself (S13). The reception of the response at the step S12 and the respondence at the step S13 allow for exchange of the information among the mutually discovered UEs 100. The discovery process P1 may finish by the UEs 100 mutually storing the acquired information on their respective memories (S14). The information exchanged at the steps S12 and S13 may include the UE identifier (UEID) uniquely identifying each UE 100 and the attribute information 101. Storing the information at the step S14 may include a UE 100 generating a database or look-up table that lists the received information associated with each discovered UE 100. FIG. 6 schematically illustrates an example of a database 102 generated at the step S14 according to some embodiments. As illustrated herein, the database 102 may list the UEID of a UE 100 associated with its name (label) and the category identified with reference to the attribute information, for each discovered UE 100.

Once a UE 100 as a cast device (cast device 100) has discovered another UE 100 as a media playback device (media playback device 100), the cast device 100 may be allowed to cast a local or online media content item to the media playback device 100. Generally, "cast" may involve the cast device 100 causing the media playback device 100 to receive streaming of the media content item to play back the streamed media content item by use of communication initiated by the cast device 100. The local media content item may be an image file, movie file, audio file, text file, document file, etc. stored on a memory of the cast device 100; a video stream or audio stream generated and buffered on the memory; etc. The online media content may be an image file, movie file, audio file, text file, document file, etc. stored on the server 200; a video stream or audio stream generated and buffered on the server 200; etc.

FIG. 7A is a flowchart illustrating an example of a process P2 for cast of a media content item. Generally, a UE 100 as a cast device (cast device 100) may issue a cast request message to invoke streaming of the media content item (S100). The cast request message may include identification of a media content item the cast device 100 intends to initiate casting, such as the name, title, duration, Universal Resource Identifier (URI) by which an online media content item is accessible, etc. In response to the cast request message (S200), a UE 100 as a media playback device (media playback device 100) may fetch streaming of the media content item (S210). The media playback device 100 may then play back the streamed media content item (S220). During the playback of the streamed media content item by the media playback device 100 at the step S220, the cast device 100 may control (i.e., pause, stop, fast-forward, rewind, etc.) the ongoing cast of the media content item in response to a user's request (S110).

FIG. 7B is a flowchart illustrating an example of a process P2a that describes steps of the process P2 in more detail where the cast device 100 casts a local media content item, according to some embodiments. In the process P2a, the issuance of the cast request message (S100) may include sending the request message to the media playback device 100 over a WLAN communication (S100a). The request issued at the step S100a may describe the intention to initiate streaming of the local media content item and include a request for acceptance of the streaming. The issuance of the cast request message (S100) may further include, in response to an acknowledgement message from the media playback device 100 in reply to the cast request (S100b), initiating streaming of the local media content item to the media playback device 100 over the WLAN communication (S100c). On the part of the media playback device 100, the fetch of cast (S210) may include issuing an acknowledgement message indicative of a positive reply for, namely, acceptance of streaming from the cast device 100, and sending the acknowledgement message to the cast device 100 over the WLAN communication (S210a). The fetch of cast (S210) may further include receiving streaming of the media content item that is initiated by the cast device 100 at the step S100c (S210b). On the part of the cast device 100 again, the control of cast (S110) may include controlling (i.e., pausing, stopping, fast-forwarding, rewinding, etc.) the ongoing streaming of the local media content item as requested by the user using an input of the cast device 100 (S110a).

Figure 7C:
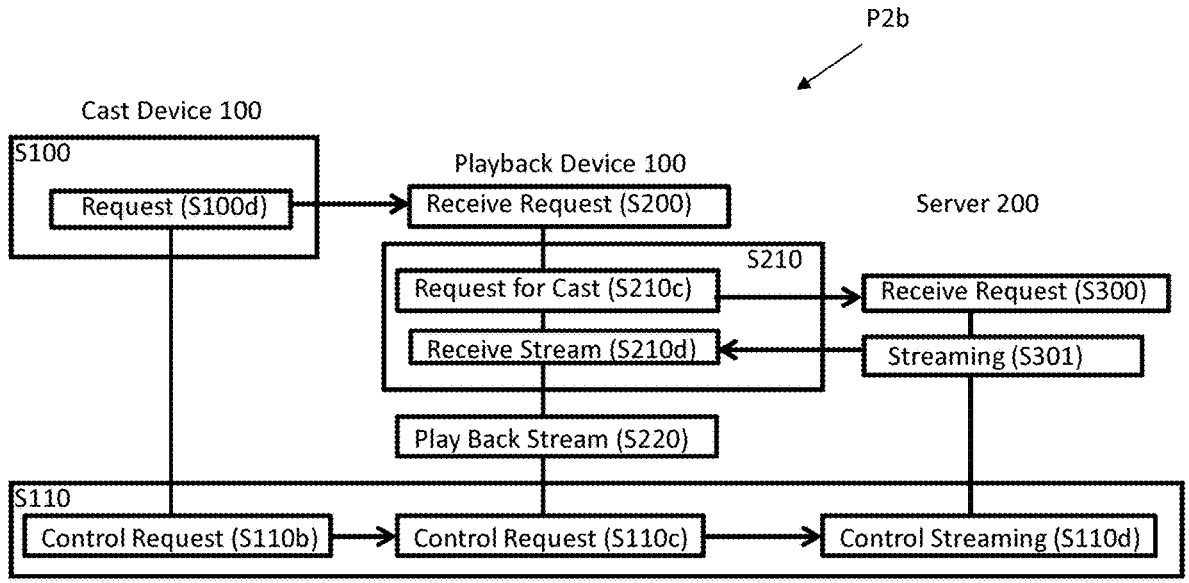
FIG. 7C is a flowchart illustrating an example of a specific process for cast of an online media content item that is stored remotely on a server, according to some embodiments.

FIG. 7C is a flowchart illustrating an example of a process P2b that describes steps of the process P2 in more detail where the cast device 100 casts an online media content item resident on the server 200, according to some embodiments. In the process P2b, the issuance of the cast request message (S100) may include sending the request message to the media playback device 100 over a WLAN communication (S100d). The request issued at the step S100d may describe a request for fetch streaming of the online media content item from the server 200, containing the identification (e.g., name, title, duration, URI, etc.) of the online media content item. On the part of the media playback device 100, the fetch of cast (S210) may include issuing a request message for initiation of streaming of the online media content item with reference to the identification of the online media content item, and sending the request message to the server 200 over an Internet communication (S210c). The fetch of cast (S210) may further include receiving streaming of the online media content item that is initiated by the server 200 in response to the request message issued at the step S210c (S210d). The process P2b may include the server 200, in response to the request message sent by the media playback device 100 at the step S210c (S300), identifying the online media content item and initiating streaming of the online media content item to the media playback device 100 over the Internet communication (S301). The control of cast (S110) may include the cast device 100 issuing a control request message that describes the detail of control (i.e., pause, stop, fast-forwarding, rewinding, etc.) and sending the control request message to the media playback device 100 over the WLAN communication (S110b), causing the media playback device 100 to control the ongoing playback as requested by the control request message (S110c). The control at the step S110c may include issuing a control request message for control of the streaming (i.e., pause, stop, fast-forwarding, rewinding, etc.) and sending the message to the server 200 over the Internet communication, causing the server 200 to respond to the control request message by controlling (i.e., pausing, stopping, fast-forwarding, rewinding, etc.) the ongoing streaming of the media content item (S110d).

Figure 7D:
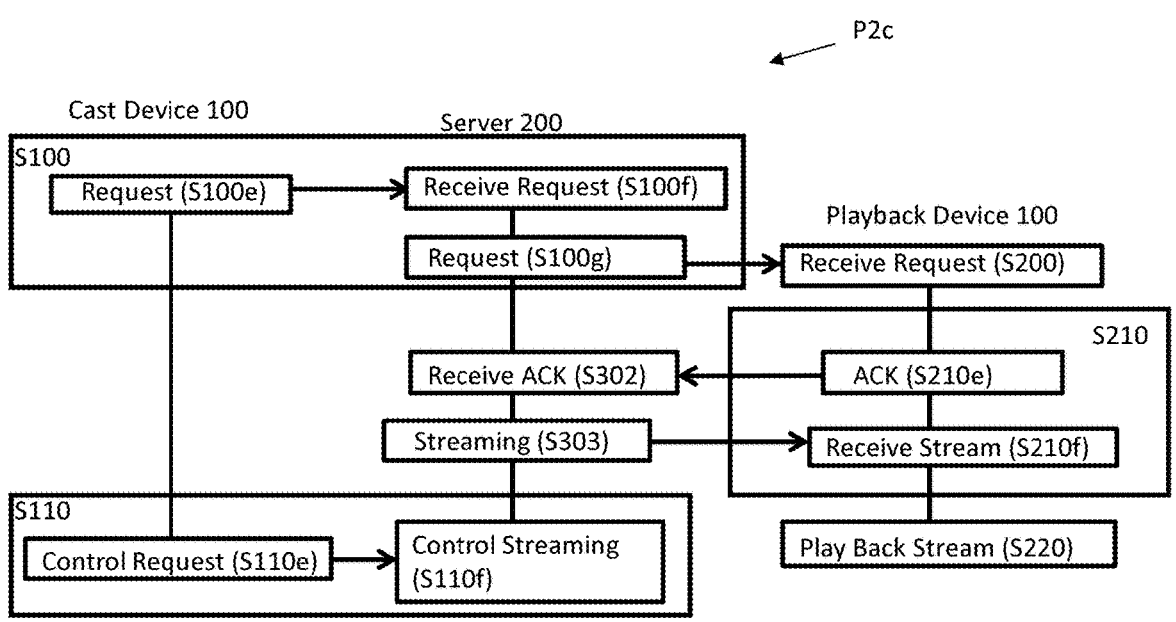
FIG. 7D is a flowchart illustrating an example of a specific process for cast of an online media content item that is stored remotely on a server, according to some embodiments.

FIG. 7D is a flowchart illustrating an example of a process P2c that describes steps of the process P2 in more detail where the cast device 100 casts an online media content item resident on the server 200, according to some embodiments. In the process P2c, the issuance of the cast request message (S100) may include sending the request message to the server 200 over an Internet communication (S100e), causing the server 200 to respond to the request message (S100f) by issuing and sending an associated request message to the media playback device 100 over the Internet communication (S100g). The original request issued at the step S100e may describe a request for initiation of streaming of the online media content item, containing the identification (e.g., name, title, duration, URI, etc.) of the online media content item, while the associated request issued by the server 200 at the step S100g may describe the intention to initiate streaming of the online media content item and include a request for acceptance of the streaming. The process P2c may include the server 200, in response to an acknowledgement message indicative of a positive reply for, namely, acceptance of streaming in reply to the request issued at the step S100g (S302), initiating streaming of the online media content item to the media playback device 100 over the Internet communication (S303). On the part of the media playback device 100, the fetch of cast (S210) may include issuing an acknowledgement message indicative of a positive reply for, namely, acceptance of streaming from the server 200, and sending the acknowledgement message to the server 200 over the Internet communication (S210e). The fetch of cast (S210) may further include receiving streaming of the media content item that is initiated by the server 200 at the step S303 (S210f). On the part of the cast device 100 again, the control of cast (S110) may include the cast device 100 issuing a control request message that describes the detail of control (i.e., pause, stop, fast-forwarding, rewinding, etc.) and sending the control request message to the server 200 over the Internet communication (S110e), accordingly causing the server 200 to respond to the control request message by controlling (i.e., pausing, stopping, fast-forwarding, rewinding, etc.) the ongoing streaming of the media content item (S110f).

Cache

In some embodiments, a UE 100 as a media playback device (media playback device 100) may be configured to temporarily store or cache a casted (streamed) media content item in a specific area of a memory of the media playback device 100. The media playback device 100 may use the cached media content item instead of fetching cast at the step S210 upon reception of a cast request at the step S200.

FIG. 8A is a flowchart illustrating an example of a process P3 for conditional use of a cached media content item, according to some embodiments. In response to reception of a cast request message for cast of a media content item issued by a cast device 100 (S200), a media playback device 100 may determine whether or not a media content item corresponding to the requested media content item is stored as a cache on a memory of the media playback device 100 (S240). The determination at the step S240 may include identifying the requested media content item with reference to the identification (e.g., name, title, duration, URI, etc.) of the media content item in the cast request message; searching for a corresponding media content item cached on the memory which matches the identification over a predetermined threshold; and determining affirmatively upon finding a corresponding cached media content item which matches the identification as a result of the search. Upon determining negatively that there is no corresponding media content item cached on the media playback device 100 (S240: No), the media playback device 100 may perform the fetch of cast at the step S210, and play back the casted media content item at the step S220. In the process P3, the media playback device 100 may issue a first notification indicative of that the media playback device 100 is in operation in a first mode to play back the casted media content item by fetching the cast as requested by the cast device 100, and send the notification to the cast device 100 over the WLAN communication, upon initiation of the playback of the casted media content item at the step S220 (S220a). On the other hand, upon determining affirmatively that there is a corresponding media content item cached on the media playback device 100 (S240: Yes), the media playback device 100 may initiate playback of the cached media content item by reading the media content item on the memory of the media playback device 100, instead of performance of the fetch of cast at the step S210 (S241). In the process P3, the media playback device 100 may issue a second notification indicative of that the media playback device 100 is in operation in a second mode to play back the locally cached media content item corresponding to the requested media content item, and send the notification to the cast device 100 over the WLAN communication, upon initiation of the playback at the step S241 (S242). The cast device 100 may enable the control cast of the media content item at the step S110 when the media playback device 100 is in operation in the first mode, namely, upon reception of the first notification from the media playback device 100. On the other hand, the cast device 100 may enable control of the playback of the cached media content item in progress by the media playback device 100 when the media playback device 100 is in operation in the second mode, namely, upon reception of the second notification from the media playback device 100 (S111). The control at the step S111 may include the cast device 100 issuing a control request for control (e.g., pause, stop, fast-forwarding, rewinding, etc.) of the playback of the cached media content item, and sending the control request to the media playback device 100 over the WLAN communication. The media playback device 100 may, in response to the control request, control (e.g., pausing, stopping, fast-forwarding, rewinding, etc.) the ongoing playback of the cached media content item as requested by the control request (S243). The cast device 100 may control cast in response to a user input through a first user interface (UI) at the step S110, while the cast device 100 may control the media playback device 100's playback of the cached media content item in response to a user input through a second UI at the step S111.

FIG. 8B schematically illustrates an example of a first graphical user interface (GUI) displayed on a display of the cast device 100 at the step S110. The first GUI may include a GUI element E1 that describes that the media playback device 100 is in operation in the first mode for notification to the user. The first GUI may also include a group of GUI elements E10 for control of cast according to the step S110 that includes multiple user-selectable GUI elements E10a, E10b, E10c, and E10d. The GUI element E10a may be a progress bar indicative of progress of cast with the duration of the casted media content item. The progress of cast may be progress of streaming by the cast device 100 at the step 100c, indicative of how far the cast device 100 has completed streaming of the media content item within its duration; progress of streaming by the server 200 at the step S301 or S303, indicative of how far the server 200 has completed streaming of the media content item within its duration; or progress of playback by the media playback device 100 at the step S220 within its duration. The progress of streaming by the cast device 100 itself may be recognized or perceived with reference to streaming packets (e.g., the sequence number, timestamp, etc. in each packet) generated and sent at the step S100c. The progress of streaming by the server 200 may be notified by the server 200 using a message over the Internet communication, in which case the server 200 may be configured to regularly, periodically, or intermittently send the message indicative of progress of the ongoing streaming to the cast device 100 over the Internet communication during the streaming at the step S301 or S303. The progress of playback by the media playback device 100 may be notified by the media playback device 100 using a message over the WLAN communication, in which case the media playback device 100 may be configured to regularly, periodically, or intermittently send the message indicative of progress of the ongoing playback to the cast device 100 over the WLAN communication during the playback at the step S220. The GUI element E10b may move or slide along the bar from the left end (start position) to the right end (end position) in accordance with progress of cast, thereby serving as a visual indication of the cast position, namely, the temporal position in the duration at which the streaming or playback of the media content item is performed. The GUI element E10b may be slidable along the progress bar E10a manually by the user using an input of the cast device 100, so that a user input of sliding or moving the GUI element E10b to the right may invoke fast-forwarding of cast from the current cast position at the step S110, while a user input of sliding or moving the GUI element E10b to the left may invoke rewinding of cast from the current cast position at the step S110. The invoking of fast-forwarding or rewinding of cast may be fast-forwarding or rewinding of the streaming from the current streaming position at the step S110a; issuance of the control request for fast-forwarding or rewinding of the streaming from the current streaming position at the step S110b, ultimately causing the server 200 to fast-forward or rewind the streaming at the step S110d; or issuance of the control request for fast-forwarding or rewinding of the streaming from the current streaming position at the step S110e, causing the server 200 to fast-forward or rewind the streaming at the step S110f. The GUI element E10c may be a stop icon configured to be selected by the user to invoke stop of cast. The invoking of stop of cast may be stop of the streaming at the step S110a; issuance of the control request for stop of the streaming at the step S110b, ultimately causing the server 200 to stop the streaming at the step S110d; or issuance of the control request for stop of the streaming at the step S110e, causing the server 200 to stop the streaming at the step S110f. The GUI element E10d may be a pause icon configured to be selected by the user to invoke pause of cast. The invoking of pause of cast may be pause of the streaming at the step S110a; issuance of the control request for pause of the streaming at the step S110b, ultimately causing the server 200 to pause the streaming at the step S110d; or issuance of the control request for pause of the streaming at the step S110e, causing the server 200 to pause the streaming at the step S110f.

FIG. 8C schematically illustrates an example of a second graphical user interface (GUI) displayed on a display of the cast device 100 at the step S111. The second GUI may include a GUI element E2 that describes that the media playback device 100 is in operation in the second mode for notification to the user. The second GUI may also include a group of GUI elements E10 for control of cast according to the step S111 that includes multiple user-selectable GUI elements E10e, E10f, E10g, and E10h. The GUI element E10e may be a progress bar indicative of progress of playback of the cached media content item by the media playback device 100 within the duration of the cached media content item at the step S241, namely, how far the media playback device 100 has completed playback of the cached media content item within its duration. The progress of the playback by the media playback device 100 may be notified by the media playback device 100 using a message over the WLAN communication, in which case the media playback device 100 may be configured to regularly, periodically, or intermittently send the message indicative of progress of the ongoing playback to the cast device 100 over the WLAN communication during the playback at the step S241. The GUI element E10f may move or slide along the bar from the left end (start position) to the right end (end position) in accordance with progress of the playback of the cached media content item, thereby serving as a visual indication of the playback position, namely, the temporal position in the duration at which the playback of the cached media content item is performed. The GUI element E10f may be slidable along the progress bar E10e manually by the user using an input of the cast device 100, so that a user input of sliding or moving the GUI element E10f to the right may invoke fast-forwarding of the playback of the cached media content item from the current playback position at the step S111, while a user input of sliding or moving the GUI element E10f to the left may invoke rewinding of the playback of the cached media content item from the current playback position at the step S111. The invoking of fast-forwarding or rewinding may be issuance of the control request for fast-forwarding or rewinding of the playback at the step S111, causing the media playback device 100 to fast-forward or rewind the ongoing playback of the cached media content item at the step S243. The GUI element E10g may be a stop icon configured to be selected by the user to invoke stop of the playback of the cached media content item. The GUI element E10h may be a pause icon configured to be selected by the user to invoke pause of the playback of the cached media content item. The invoking of stop or pause of the playback may be issuance of the control request for stop or pause of the playback at the step S111, causing the media playback device 100 to stop or pause the ongoing playback of the cached media content item at the step S243. As discussed above, the media playback device 100 may selectively activate the first GUI or second GUI depending on whether the media playback device 100 chooses to fetch a requested cast to play back a casted media content item or to play back a corresponding cached media content item instead of fetching the cast.

Cast Screen Layout

In some embodiments, the media playback device 100 may change a layout for arranging a cast screen in playing back a casted video content item on a display of the media playback device 100 depending on whether there is any ongoing playback of another video content item. The cast screen herein may be a screen on which a still image or moving images rendered by playback of a casted video content item is displayed. Playback of a video content item invokes display of a screen on which rendered images are displayed. Therefore, if playback of a video content item casted according to the process P2 occurs concurrently with any other playback of another video content item, these two playbacks may conflict with one another in displaying their respective screens. The playback of another video content item may include playback of another video content item which was casted earlier in time, playback of a video content item locally stored on the media playback device 100, and playback of a video content item fetched from another source such as television. In the embodiments, the above-mentioned conflict may be avoided.

FIG. 9A is a flowchart illustrating an example of a process P4 for dynamically changing the cast screen layout, according to some embodiments. In the process P4, prior to performance of playback of a casted media content item at the step S220, the media playback device 100 may determine if there is any conflicting playback of a media content item that would potentially conflict with playback of the casted media content item in displaying screens for the playbacks (S250). Preferably, the media playback device 100 may perform the determination at the step S250 upon the reception of cast request (S200) or the fetch of cast (S210). The determination at the step S250 may include determining if the casted media content item is a video content item, and determining if there is an ongoing playback of a video content item and thus displaying a corresponding screen on a display of the media playback device 100. Upon determining that the casted media content item is not a video content item, the media playback device 100 may determine negatively at the step S250 (S250: No) because any media content item other than a video content item does not invoke display of a screen and so does not interfere with an existing screen displayed on the display, if any. Upon determining that there is no ongoing playback of a video content item, the media playback device 100 may determine negatively at the step S250 (S250: No) either because this indicates that there is no conflicting screen displayed on the display and thus a cast screen would not cause any confliction. On the other hand, upon determining that the casted media content item is a video content item and also determining that there is an ongoing playback of a video content item, the media playback device 100 may determine affirmatively at the step S250 (S250: Yes). Upon determining that a cast screen would not conflict with an existing playback screen (S250: No), the media playback device 100 may play back a casted media content item without taking care of the screen confliction (S220a). At the step S220a, the media playback device 100 may display a resultant cast screen in a first size that dominates the display area of the display or occupies the substantially entire display area of the display, preferably in a full-screen manner, on the display, when playing back a video content item. Upon determining that a cast screen would conflict with an existing playback screen (S250: Yes), the media playback device 100 may play back a casted video content item, taking care of the screen confliction (S200b). At the step S220b, the media playback device 100 may display a resultant cast screen (cast screen D1a) in a second size smaller than the first size that overlaps part of the existing screen (existing screen D1b) in a manner that the existing screen is still partly visible, as illustrated in FIG. 9B. Alternatively, at the step S220b, the media playback device 100 may shrink, minify, or decrease the size of the existing screen, and display a resultant cast screen in a third size smaller than the first size in a manner that the cast screen (cast screen D1a) is arranged along with the shrunk existing screen (existing screen D1b), accordingly causing the cast screen and the existing screen to share the display area of the display so that the both screens are fully visible, as illustrated in FIG. 9C. The display of the screens in the overlapping layout as illustrated in FIG. 9B at the step S220b herein may be labeled as display in an overlap layout mode, while the display of the screens in the sharing layout as illustrated in FIG. 9C at the step S220b herein may be labeled as display in a sharing layout mode.

Upon initiation of the display of the cast screen and the existing screen at the step S220b, the media playback device 100 may issue a notification message indicative of that the media playback device 100 has initiated display of the screens in the overlap layout mode or sharing layout mode, and send the notification message to the cast device 100 over the WLAN communication (S245). Upon reception of the notification message (S114), the cast device 100 may enable control of the screen layout. During the playback of the casted media content item, the cast device 100 may control the screen layout for the cast screen and existing screen in response to a user input using the input of the cast device 100 (S115). The control at the step S115 may include issuing a control request message for control of the screen layout, and sending the control request message to the media playback device 100 over the WLAN communication, so that the media playback device 100 may respond to the control request (S246) by controlling or changing the screen layout as requested (S247).

At the step S115, the cast device 100 may activate a user interface (UI) through which to receive the user input for the control of the screen layout. The control at the step S115 may include control of the size of the cast screen D1a in the layout. FIG. 9D schematically illustrates an example of a GUI for control of the size of cast screen D1a in the layout, according to some embodiments where the cast device 100 is provided with a touch screen as the input device. The GUI may include a control area A1 configured to receive a user gesture using, for example, his/her finger or stylus for change of the size of the cast screen D1a. For example, the user gesture of "pinching out" along the direction A1a in FIG. 9D may invoke magnification of the cast screen D1a on the display of the media playback device 100, namely, invoke issuance of the control request message for magnification of the cast screen D1a at the step S115; while the user gesture of "pinching in" along the direction A1a may invoke miniaturization of the cast screen D1a on the display of the media playback device 100, namely, invoke issuance of the control request message for miniaturization of the cast screen D1a at the step S115. The control area A1 may be displayed along with the group of GUI elements E10 discussed above, in order to allow the user to perform the control of cast at the step S110 and the screen layout control at the step S115 through a single GUI. FIG. 9E schematically illustrates another example of a GUI for control of the size of cast screen D1a in the layout, according to some embodiments where the cast device 100 is provided with a touch screen as the input device. The GUI may include presentation of GUI elements E11a, E11b, E11c each of which corresponds to a specific size of the cast screen D1a (e.g., GUI element E11a for the largest size, GUI element E11b for the medium size, and GUI element E11c for the smallest size in the example of FIG. 9E), configured to be selectable by the user. A user selection of one of the GUI elements E11a, E11b, or E11c may invoke change of the size of the cast screen D1a to the selected size on the display of the media playback device 100, namely, invoke issuance of the control request message for change of the size of cast screen D1a to the selected size at the step S115. The GUI elements E11a, E11b, and E11c may be displayed along with the group of GUI elements E10 discussed above, in order to allow the user to perform the control of cast at the step S110 and the screen layout control at the step S115 through a single GUI. FIG. 9F schematically illustrates another example of a GUI for control of the size of cast screen D1a in the layout, according to some embodiments where the cast device 100 is provided with a mechanical input device such as a keypad including keys (e.g., keys K1 through K9) besides the display. The specific keys in the keypad may be associated with respective specific sizes of the cast screen D1a. The GUI displayed on the display may include presentation of a message M1 that provides instruction as to what keys are associated with specific sizes of the cast screen D1a. A user selection of a key may invoke change of the size of the cast screen D1a to the specific size associated with the selected key on the display of the media playback device 100, namely, invoke issuance of the control request message for change of the size of the cast screen D1a to the specific size associated with the selected key at the step S115.

At the step S115, the cast device 100 may activate a user interface (UI) through which to receive the user input for the control of the screen layout. The control at the step S115 may include control of the position of the cast screen D1a with respect to the existing screen D1b in the layout. FIG. 10A schematically illustrates an example of a GUI for control of the position of cast screen D1a in the layout, according to some embodiments where the cast device 100 is provided with a touch screen as the input device. The GUI may include a control area A2 configured to receive a user gesture using, for example, his/her finger or stylus for change of the position of the cast screen D1a. For example, the control area A2 may receive the user gesture of "swiping" or "dragging" in any desired direction to invoke move of the cast screen D1a in a direction corresponding to the received gesture on the display of the media playback device 100 as illustrated in FIG. 10B, namely, invoke issuance of the control request message for move of the cast screen D1a to such direction. The control area A2 may be displayed along with the group of GUI elements E10 discussed above, in order to allow the user to perform the control of cast at the step S110 and the screen layout control at the step S115 through a single GUI. The control area A2 may be displayed along with the above-mentioned control area A1 or the group of the GUI elements E11a, E11b, and E11c, in order to allow the user to perform the control of the size and position of the cast screen D1a through a single GUI. Furthermore, the control area A2, control area A1 or GUI elements E11a through E11c, and group of GUI elements E10 may be displayed all together in a single GUI. FIG. 10C schematically illustrates another example of a GUI for control of the position of cast screen D1a in the layout, according to some embodiments where the cast device 100 is provided with a touch screen as the input device. The GUI may include presentation of a group of GUI elements E12 each of which corresponds to a specific position in the screen layout, namely, is arranged at a specific position in an area A3 that corresponds to the screen on the media playback device 100 (e.g., GUI element E12 labeled "1" for the upper right position, GUI element E12 labeled "2" for the upper left position, GUI element E12 labeled "3" for the lower left position, GUI element E12 labeled "4" for the lower right position, and GUI element E12 labeled "5" for the middle position in the example of FIG. 10C), configured to be selectable by the user. A user selection of one of the GUI elements E12 may invoke change of the position of the cast screen D1a to the selected position on the display of the media playback device 100, namely, invoke issuance of the control request message for move of the cast screen D1a to the selected position at the step S115. The GUI elements E12 may be displayed along with the group of GUI elements E10 discussed above, in order to allow the user to perform the control of cast at the step S110 and the screen layout control at the step S115 through a single GUI. The GUI elements E12 may be displayed along with the above-mentioned control area A1 or the group of the GUI elements E11a, E11b, and E11c, in order to allow the user to perform the control of the size and position of the cast screen D1a through a single GUI. Furthermore, the GUI elements E12, control area A1 or GUI elements E11a through E11c, and group of GUI elements E10 may be displayed all together in a single GUI. FIG. 10D schematically illustrates another example of a GUI for control of the position of cast screen D1a in the layout, according to some embodiments where the cast device 100 is provided with a mechanical input device such as a keypad including keys (e.g., keys K1 through K9) besides the display. The specific keys in the keypad may be associated with respective specific positions of the cast screen D1a. The GUI displayed on the display may include a message M2 that provides instruction as to what keys are associated with specific positions of the cast screen D1a. The message M2 may include presentation of GUI elements M2a each of which corresponds to a specific position in the screen layout, namely, is arranged at a specific position in the area of the message M2 that corresponds to the screen on the media playback device 100, and each of which is assigned to a specific key in the keypad and labeled with the assigned key (e.g., GUI element M2*a* assigned to the key "K1" for the upper left position, GUI element M2*a* assigned to the key "K3" for the upper right position, GUI element M2*a* assigned to the key "K5" for the middle position, GUI element M2*a* assigned to the key "K7" for the lower left position, and GUI element M2*a* assigned to the key "K9" for the lower right position in the example of FIG. 10D). A user selection of a key may invoke change of the position of the cast screen D1*a* to the specific position associated with the selected key on the display of the media playback device 100, namely, invoke issuance of the control request message for move of the cast screen D1*a* to the specific position associated with the selected key at the step S115. For example, in response to a user selection of the key "K1", the cast device 100 may issue the control request message for move of the cast screen to the upper left position that is associated with the GUI element M2*a* assigned to the key "K1".

At the step S115, the cast device 100 may activate a user interface (UI) through which to receive the user input for the control of the screen layout. The control at the step S115 may include control of the layout of the cast screen D1*a* and existing screen D1*b* in accordance with preset layout templates. FIG. 10E schematically illustrates an example of a GUI for control of the layout by means of layout templates, according to some embodiments where the cast device 100 is provided with a touch screen as the input device. The GUI may include presentation of layout templates E13 displayed in an area A4, each of which corresponds to a specific template that defines or visually represents a specific layout of the cast screen D1*a* and existing screen D1*b*. For example, the layout template E13 on the top in the area A4 corresponds to the layout where the cast screen D1*a* is arranged at the upper left while the existing screen D1*b* is arranged at the lower right, with the screens being substantially equal in size; the layout template E13 in the middle in the area A4 corresponds to the layout where the cast screen D1*a* larger than the existing screen D1*b* is arranged at the upper left while the existing screen D1*b* smaller than the cast screen D1*a* is arranged at the lower right; and the layout template E13 on the bottom in the area A4 corresponds to the layout where the cast screen D1*a* smaller than the existing screen D1*b* is arranged at the lower left while the existing screen D1*b* larger than the cast screen D1*a* is arranged at the upper right. The layout templates E13 may be configured to be selectable by the user. A selection of one of the layout templates E13 may invoke control of the screen layout to the layout corresponding to the selected template E13 on the media playback device 100 as illustrated in FIG. 10E, namely, invoke issuance of the control request message for change of the screen layout to the selected layout by moving, magnifying, and/or minifying the cast screen D1*a* and existing screen D1*b* at the step S115. The layout templates E13 may be displayed along with the group of GUI elements E10 discussed above, in order to allow the user to perform the control of cast at the step S110 and the screen layout control at the step S115 through a single GUI.

Concurrent Cast

In some embodiments, a UE 100 as a media playback device (media playback device 100) may play back two or more casted video content items concurrently at the step S220, in a screen layout where the cast screens for the casted video content items are equally arranged together. In an example, the media playback device 100 may perform such concurrent playback, for example, when the media playback device 100 receives a cast request for a video content item (first video content item) from a cast device 100 at the step S200 while playback of another video content item (second video content item) casted earlier in time by the same or another cast device 100 is still in progress according to the step S220. In another example, the media playback device 100 may perform such concurrent playback, for example, when the media playback device 100 receives cast request for the first and second video content items substantially concurrently from different cast devices 100 at the step S200.

FIG. 11A is a flowchart illustrating an example of a process P5 for concurrent playback of two or more casted video content items, according to some embodiments. In the process P5, in receiving a cast request for a video content item from a cast device 100, the media playback device 100 may identify the cast details related to the requested cast (S200*a*). The cast details may include the name, identification, and other information unique to the cast requester (i.e., the cast device 100 that issued the cast request), the name (title), duration, and other information unique to the requested video content item. In other words, the cast device 100 may send the cast request that contains such information unique to the cast device 100 and requested video content item, with reference to which the media playback device 100 may perform the identification at the step S200*a*. After the fetch of the casted video content item (S210), the media playback device 100 may count the total number of casts requests for which have been received and playbacks of which are currently in progress by the media playback device 100, prior to initiation of playback of the casted video content item at the step S220 (S251). The media playback device 100 may perform the counting at the step S251 upon the fetch of the casted video content item. For example, when the media playback device 100 is already playing back two video content items at the time of the counting at the step S251, the media playback device 100 may ultimately count "three" casts in total for said two ongoing casts and the one cast newly fetched at the step S210 (S251). The media playback device 100 may then identify a screen layout for arranging cast screens of the counted casts depending on the counted number of casts (S252). A plurality of screen layouts where cast screens are so arranged as to make every screen visible may be preliminarily defined depending on the number of casts, so that the media playback device 100 may choose an appropriate screen layout from the preset screen layouts depending on the counted number of casts at the step S252. FIG. 11B schematically illustrates an example of a screen layout for one cast, in which a single cast screen (cast screen D2*a*) for the one cast is arranged in the middle, preferably in a full-screen manner. FIG. 11C schematically illustrates an example of a screen layout for two casts, in which two cast screens for the two casts are so arranged as to make every cast screen visible, with one of the cast screens (cast screen D2*a*) being arranged at the upper left and the other one (cast screen D2*b*) being arranged at the lower right. FIG. 11D schematically illustrates an example of a screen layout for three casts, in which three cast screens for the three casts are so arranged as to make every cast screen visible, with first cast screen (cast screen D2*a*) being arranged at the upper left, second cast screen (cast screen D2*b*) being arranged at the upper right, and third cast screen (cast screen D2*c*) being arranged at the lower left. In the process P5, the playback at the step S220 may include initiating playback of the casted video content item along with the ongoing playback of other casted video content item, in the screen layout identified at the step S252 (S220c). Upon initiation of the playback at the step S220, the media playback device 100 may determine whether the number of casts counted at the step S251 is more than one, namely, determine if there are two or more ongoing playbacks (S253). If there is two or more ongoing playbacks (S253: Yes), the media playback device 100 may issue a notification message indicative of the cast details related to casts playbacks of which are currently in progress, and send the notification message over the WLAN communication to cast devices 100 from which the casts originate (S254). At the step S253, the media playback device 100 may issue the notification message indicative of the cast details related to all of the casts associated with the ongoing playbacks, and broadcast the notification message over the WLAN communication. Or, at the step S253, the media playback device 100 may issue notification messages each of which is addressed to a specific originating cast device 100 and is indicative of the cast details related to one or more casts which originate from one or more cast devices 100 other than the addressed cast device 100, and unicast the notification messages to the cast devices 100 one by one over the WLAN communication. In response to the notification message (S120), each cast device 100 may provide presentation of the cast details on a user interface, notifying the user of the details of one or more casts being in progress along with the cast he or she has initiated (S121). On the other hand, If there is just one cast in progress (S253: No), the process P5 may end without performance of the notification at the step S254.

FIGS. 11E, 11F, and 11G schematically illustrate examples of screen layouts for arranging one to three cast screens and examples of graphical user interfaces (GUIs) on which the presentation of the cast details are provided at the step S121. First, FIG. 11E illustrates an exemplary first situation where only one cast device 100 (cast device 100a) has initiated a cast (first cast) of a video content item ("Movie01"). In the first situation, the media playback device 100 counts "one" as the number of casts (S251) upon fetch of the first cast (S210) because there is not other ongoing playback of another video content item, and thus identifies a first screen layout for one cast screen (S252) to play back casted "Movie01" in a single cast screen D2a (S220c). In the first situation, the media playback device 100 may fail to provide the notification at the step S254 because there are not two or more ongoing playbacks. The cast device 100a may provide a GUI including presentation of a message M3 indicative of the video content item ("Movie01") casted by the cast device 100a itself. FIG. 11F illustrates an exemplary second situation transitioning from the first situation, where another cast device 100 (cast device 100b) has initiated a cast (second cast) of a video content item ("Movie02") while playback of the content item "Movie01" casted by the cast device 100a is still in progress. In the second situation, the media playback device 100 counts "two" as the number of casts (S251) upon fetch of the second cast (S210) because there is an ongoing playback of the item "Movie01" associated with the first cast in addition to the second cast, and thus identifies a second screen layout for two cast screens (S252). The media playback device 100 may therefore switch from the first screen layout to the second screen layout to play back the casted item "Movie02" in a cast screen D2b along with the item "Movie01" in the cast screen D2a. In the second situation, the media playback device 100 may provide the notification indicative of the cast details of the first and second casts (S254). In response to the notification (S120), the cast device 100a may provide presentation of a message M4 indicative of the details of the second cast (i.e., the ongoing cast other than the first cast initiated by the cast device 100a itself) besides the message M3 (S121). In response to the notification (S120), the cast device 100b may provide presentation of a message M4 indicative of the details of the first cast (i.e., the ongoing cast other than the second cast initiated by the cast device 100b itself) as well as presentation of a message M3 indicative of the second cast initiated by the cast device 100b itself (S121). FIG. 11G illustrates an exemplary third situation transitioning from the second situation, where another cast device 100 (cast device 100c) has further initiated a cast (third cast) of a video content item ("Movie03") while playbacks of the content items "Movie01" and "Movie02" casted by the cast devices 100a and 100b respectively are still in progress. In the third situation, the media playback device 100 counts "three" as the number of casts (S251) upon fetch of the third cast (S210) because there are ongoing playbacks of the items "Movie01" and "Movie02" associated with the first and second casts respectively in addition to the third cast, and thus identifies a third screen layout for three cast screens (S252). The media playback device 100 may therefore switch the second screen layout to the third screen layout to play back the casted item "Movie03" in a cast screen D2c along with the items "Movie01" and "Movie02" in the cast screen D2a and D2b respectively. In the third situation, the media playback device 100 may provide the notification indicative of the cast details of the first, second, and third casts (S254). In response to the notification (S120), the cast device 100a may provide presentation of a message M4 indicative of the details of the second and third casts (i.e., the ongoing casts other than the first cast initiated by the cast device 100a itself) besides the message M3 (S121). In response to the notification (S120), the cast device 100b may provide presentation of a message M4 indicative of the details of the first and third casts (i.e., the ongoing cast other than the second cast initiated by the cast device 100b itself) besides the message M3 (S121). In response to the notification (S120), the cast device 100c may provide presentation of a message M4 indicative of the details of the first and second casts (i.e., the ongoing cast other than the third cast initiated by the cast device 100c itself) as well as presentation of a message M3 indicative of the details of the third cast initiated by the cast device 100c itself.

Audio+Video Combination Playback

In some embodiments, a UE 100 as a media playback device (media playback device 100) may concurrently play back two media content items that are individually casted by the same cast device 100 or different cast devices 100 in combination to generate and play back a new collaborative production, when the two media content items are suited for the collaboration.

FIG. 12A is a flowchart illustrating an example of a process P6 for generating and playing back a new collaborative production of a media content item based on original casted media content items, according to some embodiments. In the process P6, upon reception of a cast request for a media content item (S200), the media playback device 100 may determine whether or not there is an ongoing playback of another casted media content item (S255). If there is no such ongoing playback (S255: No), it indicates that there is no other casted media content item with which the requested media content item can collaborate. Therefore, upon determining negatively at the step S255 (S255: No), the media playback device 100 may fetch a requested media content item (S210) and play back the fetched media content item as usual (S220). On the other hand, upon determining affirmatively that there is an ongoing playback of a casted media content item (S255: Yes), the media playback device 100 may determine whether or not the requested media content item and the already-casted media content item playback of which is in progress are suited for collaboration to generate a new production (S256). The determination at the step S256 may include determining if the requested media content item is one of media content items which lead to a new collaborative production when combined (i.e., played backed) together and the already-casted media content item is the other one of such media content items. Upon affirmatively at the step S256 (S256: Yes), the media playback device 100 may fetch a requested media content item (S210) and initiate playback of the fetched media content item along with the ongoing playback of the already-casted media content item, thereby generating and playing back a new collaborative production of a media content item (S220d). At the step S220d, the media playback device 100 may temporally synchronize the playbacks of the newly fetched media content item and already-casted media content item, namely, perform the two playbacks together at the same playback positions from their respective start positions in their respective durations, so as to make the two playbacks proceed forward equally. For the synchronization, the media playback device 100 may initiate the two playbacks together at the respective start positions by, for example, stopping the ongoing playback of the already-casted media content item once and re-starting the playback of the already-casted media content item at its start position together with initiation of the playback of the newly fetched media content item at its start position, or by rewinding the ongoing playback of the already-casted media content item back to its start position upon initiation of the playback of the newly fetched media content item at its start position. Reversely, for the synchronization, the media playback device 100 may move or fast-forward the playback position of the newly-fetched media content item to the current playback position of the ongoing playback of the already-casted media content item, and initiate the playback of the fetched media content item together with the playback of the already-casted media content item.

In a first example, an audio content item representing vocal sound may be suited for collaboration with another audio content item representing instrumental sound to generate a collaborative production of a song. In the first example, when the requested media content item is one of audio content items representing vocal sound and instrumental sound respectively and also the already-casted media content item is the other one of the audio content items (S256: Yes), the media playback device 100 may play back the audio content items together to generate and play back a new production of a song (S220d).

In a second example, an audio content item representing first instrumental sound associated with a first instrument such as a guitar may be suited for collaboration with another audio content item representing second instrumental sound associated with a second instrument such as drums, to generate a collaborative production of music or orchestra. In the second example, when the requested media content item is one of audio content items representing first and second instrumental sound respectively and also the already-casted media content item is the other one of the audio content items (S256: Yes), the media playback device 100 may play back the audio content items together to generate and play back a new production of music or orchestral (S220d).

In a third example, a video content item representing moving pictures without sound may be suited with collaboration with an audio content item to generate a new movie production. In the third example, when the requested media content item is one of a video content item representing moving pictures without sound and an audio content item and also the already-casted media content item is the other one of such video and audio content items (S256: Yes), the media playback device 100 may play back such video and audio content items together to generate and play back a new movie production (S220d).

In a fourth example, a video content item representing a photo slideshow consisting of multiple photos may be suited for collaboration with an audio content item to generate a collaborative production of a photo slideshow with background music. In the fourth example, when the requested media content item is one of a video content item representing a photo slideshow and an audio content item and also the already-casted media content item is the other one of such video and audio content items (S256: Yes), the media playback device 100 may play back such video and audio content items together to generate and play back a new production of a photo slideshow with background music (S220d).

Back at the step S256, upon determining negatively that the requested media content item and the already-casted media content item playback of which is in progress are not suited for collaboration to generate a new production (S256: No), the media playback device 100 may place the requested media content item in a queue to wait for the ongoing playback of the already-casted media content item to be finished or completed (S257), in order to prevent potential confliction between playback of the requested media content item and the ongoing playback of the already-casted media content item. The fetch of the requested media content item may be queued as long as the ongoing playback of the already-casted media content item is not complete (S258: No). Upon completion of the ongoing playback of the already-casted media content item (S258: Yes), the media playback device 100 may fetch the requested media content item (S210) to play back the fetched media content item (S220).

Switch of Casts

In some embodiments, a UE 100 as a cast device (cast device 100) may play back a media content item (first media content item) locally on the cast device 100 itself during casting of another media content item (second media content item) to a UE 100 as a media playback device (media playback device 100). During the simultaneous local playback and cast, the cast device 100 may switch the local playback and cast back and forth, namely, switch the first media content item from the local playback to cast to the media playback device 100 and switch the second media content item from the cast to the local playback on the cast device 100. This allows the user to enjoy two different media content items played back separately on the cast device 100 and media playback device 100, and also allows the user to change which item of the two is played back on the media playback device 100 at the user's discretion.

FIG. 13A is a flowchart illustrating an example of a process P7 for simultaneous local playback and cast of media content items and switch of the media content items, according to some embodiments. In the process P7, the cast device 100 may initiate a local playback of a media content item while casting another media content item on one hand, while the cast device 100 may initiate a cast of a media content item while playing back locally another media content item on the other hand.

On the one hand, the process P7 may start when the cast device 100 is casting a media content item (e.g., first media content item) (S264), namely, when the first media content item is being played back by the media content item 100 (S220). The cast device 100 may control the cast (S110) while the playback of the casted first media content item is in progress. During the cast, the cast device 100 may present one or more available media content items other than the casted first media content item, allowing the user to select one of the presented media content items as a media content item to be played back locally (S265). At the step S265, the cast device 100 may receive a user selection of a media content item, through a user interface (UI) for control of the cast according to the step S110. FIG. 13B schematically illustrates a GUI for control of the cast according to the step S110, through which to receive a user selection at the step S265. The GUI may be activated or displayed upon initiation of the playback of the first media content item by the media playback device 100. The GUI may include the group of GUI elements E10 selectable by the user to control the ongoing cast of the first media content item according to the step S110. The GUI may further include presentation of available media content items E14, allowing the user to select one of the presented media content items for local playback. The presentation of available media content items may include displaying one or more icons (e.g., thumbnails, etc.) E14a each of which represents a specific one of the available media content items, configured to be selectable by the user to initiate local playback of the corresponding specific media content item. Upon reception of a user input including selection of a media content item of the presented media content items (S265: Yes), the cast device 100 may initiate playing back locally the selected media content item (S266). The selected media content item (e.g., second media content item) may be a media content item stored on the memory of the cast device 100, in which case the playback at the step S266 may include reading the second media content item out of the memory to play back the second media content item. The second media content item may be an online media content item stored on the server 200, in which case the playback at the step S266 may include causing the server 200 to stream the second media content item so that the cast device 100 may play back the streamed second media content item. FIG. 13C is a flowchart illustrating an example of a flow at the step S266 to play back an online media content item on the server 200. The cast device 100 may issue a request for streaming of the second media content item to send the request to the server 200 over the Internet communication (S266a). The request at the step S266a may include the identification of the second media content item, such as the name, title, duration, etc. of the second media content item. In response to the request (S266b), the media playback device 100 may identify the second media content item on the storage of the server 200 (S266c), and then initiate streaming of the second media content item to the cast device 100 over the Internet communication (S266d). In response to the streaming initiated by the server 200 (S266e), the cast device 100 may play back the streamed second media content item locally (S266f). As a result of initiation of the local playback at the step S266, the second media content item may be played back locally on the cast device 100 while the first media content item is being played back remotely on the media playback device 100 in parallel.

On the other hand, the process P7 may start when the cast device 100 is locally playing back a media content item (e.g., second media content item) (S260). The second media content item may be a media content item stored on the memory of the cast device 100, in which case the playback at the step S260 may include reading the second media content item out of the memory to play back the second media content item. The second media content item may be an online media content item stored on the server 200, in which case the playback at the step S260 may include causing the server 200 to stream the second media content item so that the cast device 100 may play back the streamed second media content item, as discussed above with reference to FIG. 13C. During the local playback of the second media content item, the cast device 100 may control the playback (S261). The control at the step S261 may include controlling (e.g., pausing, stopping, fast-forwarding, rewinding, etc.) playback of the second media content item directly when the second media content item is a locally-stored one. The control at the step S261 may include causing the server 200 to control (e.g., pause, stop, fast-forward, rewind, etc.) the ongoing streaming of the second media content item by issuing and sending a request for such control to the server 200 over the Internet communication, in response to which the server 200 may control the streaming of the second media content item as requested. During the local playback, the cast device 100 may present one or more available media content items other than the second media content item playback of which is in progress, allowing the user to select one of the presented media content items as a media content item to be casted to the media playback device 100 (S262). At the step S262, the cast device 100 may receive a user selection of a media content item, through a user interface (UI) for control of the local playback according to the step S261. FIG. 13D schematically illustrates a GUI for control of the local playback according to the step S261, through which to receive a user selection at the step S262. The GUI may be activated or displayed upon initiation of the local playback of the second media content item at the step S260. The GUI may include a group of GUI elements E15 for control of local playback according to the step S261 that includes multiple user-selectable GUI elements E15a, E15b, E15c, and E15d. The GUI element E15a may be a progress bar indicative of progress of the playback within the duration of the played-back second media content item. The progress of playback may be progress of streaming by the server 200 at the step S266d, indicative of how far the server 200 has completed streaming of the media content item within its duration; or progress of playback by the cast device 100 at the step S266f within its duration. The progress of streaming by the server 200 may be recognized or perceived with reference to streaming packets (e.g., the sequence number, timestamp, etc. in each packet) received at the step S266e. The progress of playback at the step S266f may be recognized or perceived with reference to the packet (e.g., the sequence number, timestamp, etc. in the packet) on which the playback is being performed. The GUI element E15b may move or slide along the progressive bar E15a from the left end (start point) to the right end (end point) in accordance with progress of playback, thereby serving as a visual indication of the playback position, namely, the temporal position in the duration at which the streaming or playback of the second media content item is performed. The GUI element E15b may be slidable along the progress bar E15a manually by the user using an input device of the cast device 100, so that a user input of sliding or moving the GUI element E15b to the right may invoke fast-forwarding of playback from the current playback position at the step S261, while a user input of sliding or moving the GUI element E15b to the left may invoke rewinding of playback from the current playback position at the step S261. The GUI element E15c may be a stop icon configured to be selected by the user to invoke stop of playback at the step S261. The GUI element E15d may be a pause icon configured to be selected by the user to invoke pause of playback at the step S261. The GUI may also include presentation of available media content items E14, allowing the user to select one of the presented media content items for cast. The presentation of available media content items may include displaying one or more icons (e.g., thumbnails, etc.) E14a each of which represents a specific one of the available media content items, configured to be selectable by the user to initiate cast of the corresponding specific media content item. The GUI may further include a playback screen P1 in which resultant video is rendered and displayed as a result of the local playback of the second media content item, in case the second media content item is a video content item. Upon reception of a user input including selection of one of the presented media content items (S262: Yes), the cast device 100 may initiate cast of the selected media content item (e.g., first media content item) by way of the cast request according to the step S100 (S263), causing the media playback device 100 to play back the casted first media content item (S200, S210, S220). As a result of initiation of the cast at the step S100, the casted first media content item may be played back remotely by the media playback device 100 while the second media content item is being played back locally on the cast device 100 in parallel.

During the local playback of the first media content item and the cast of the second media content item being concurrently in progress, the cast device 100 may selectively control the ongoing local playback according to the step 261 or cast according to the step S110 through a UI. FIG. 13E schematically illustrates a first example of a GUI for the selective control of the ongoing local playback or cast, according to some embodiments. In the first example, the GUI may include the group of GUI elements E10 for control of the cast and GUI elements E15 for control of the local playback, which are arranged together to be visible simultaneously, thereby allowing the user to selectively perform the control using the GUI elements E10 or E15 through a single GUI. Alternatively, two GUIs for control using the GUI elements E10 and E15 respectively may be selectively activated, namely, switched back and forth as per request by the user. FIGS. 13F and 13G schematically illustrate first and second GUIs for control of the cast using the GUI elements E10 and for control of the local playback using the GUI elements E15, respectively, in which the first and second GUIs may be switched back and forth. The first GUI may include a GUI element E16a configured to be selectable by the user to switch from the first GUI to the second GUI besides the GUI elements E10, while the second GUI may include a GUI element E16b configured to be selectable by the user to switch from the second GUI to the first GUI besides the GUI elements E15. In the process P7, the cast device 100 may activate the first or second GUI by default upon initiation of the local playback (S266) or the cast (S263). In the GUIs illustrated in FIGS. 13E, 13F, and 13G, the playback screen P1 may be arranged together with other GUI elements (E10, E15, E16a, E16b).

While the cast and local playback are concurrently in progress, the cast device 100 may receive a user input to switch the casted first media content item and locally played-back second media content item back and forth through a UI (S267). At the step S267, the cast device 100 may receive a predetermined user gesture on the playback screen P1, such as a "flick" in a predetermined direction (e.g., as illustrated in an arrow in FIG. 13J), in the GUI discussed above with reference to FIG. 13E, 13F, or 13G. to invoke the switching of the media content items (S267: Yes). Alternatively, the GUI discussed above with reference to FIG. 13E, 13F, or 13G. may include a GUI element E16c configured to be selectable by the user to invoke the switching of the media content items, as illustrated in FIG. 13K (S267: Yes). Upon the user input (S267: Yes), the cast device 100 may switch the first media content item from cast to local playback and also switch the second media content item from local playback to cast (S268). The switching at the step S268 may include terminating the local playback of the second media content item (S268a) as well as terminating the cast of the first media content item (S268b) so that the media playback device 100 may stop the playback of the first media content item, and newly initiating local playback of the first media content item (S268c) as well as newly initiating cast of the second media content item (S268d) so that the media playback device 100 may newly initiate playback of the second media content item (S200, S210, S220). When the first and second media content item are a video content item, the switching at the step S268 may transition display of video C1 associated with the first media content item to display of video C2 associated with the second media content item on the media playback device 100 as well as transition display of video C2 associated with the second media content item to display of video C1 associated with the first media content item on the cast device 100, as illustrated in FIGS. 13H and 13I.

Management of Available Playback Devices

In some embodiments, the cast device 100 may be allowed to cast a media content item only to an available media playback device 100 that is not playing back another casted media content item, namely, may restrict against casting of a media content item to any media playback device that is already playing back another casted media content item, among discovered media playback devices 100, so as to prevent confliction between the two casts. For such restriction, the availability of each media playback device 100 may be managed by each cast device 100 in the LAN 2. In the embodiments, the attribute information 101 in each UE 100 may include status information indicative of the current status of availability of the UE 100. The attribute information 101 may be included in the information notified in the respondence (S13) by each UE 100 in the discovery process P1, so that each UE 100 may be aware of the current availabilities of other discovered UEs 100. The status of availability of each discovered UE 100 may be managed on the database 102 associated with other information such as the name and ID of the UE 100, as illustrated in FIG. 14A.

FIG. 14A schematically illustrates an example of the database or look-up table 102 on the cast device 100 for management of the availability of each media playback device 100, according to some embodiments. The database 102 may include information indicative of the status of a media playback device 100 associated with the ID and name of the media playback device, for each discovered media playback device 100. The status "available" indicates a media playback device 100 which is not currently playing back any media content item and so is ready to receive a cast, while the status "occupied" indicates a media playback device 100 which is currently playing back a media content item and so is not available as the destination of a new cast. For management of the availability of each media playback device 100, the status of availability in the attribute information 101 and/or the database 102 on the cast device 100 may be updated timely according to the after-mentioned process.

FIG. 14B is a flowchart illustrating an example of a process P8 for the restricted cast, according to some embodiment where each cast device 100 is configured to notify changes of the statuses of media playback devices 100. In the process P8, the cast request at the step S100 may include identifying one or more available media playback devices 100 with reference to the database 102 (S100h), activating a UI through which to receive a user selection of one of the identified available media playback devices 100 (S100i), and receiving the user selection through the UI (S100j), to send a cast request for a media content item to the selected available media playback device 100, thereby causing the selected media playback device 100 to play back a casted media content item (S200, S210, S220). Upon transmission of the cast request message (S100), the cast device 100 may update the database 102 in the cast device 100 itself by changing the status of the selected media playback device 100 from "available" to "occupied" in the database 102 (S270). The cast device 100 may then issue a notification message indicative of the status change of the selected media playback device 100, and send the notification message to other cast devices 100 in the LAN 2 over the WLAN communication (S271). At the step S271, the cast device 100 may broadcast the notification message over the WLAN communication, so that every cast device 100 in the LAN 2 may equally receive the notification message. Alternatively, at the step S271, the cast device 100 may unicast the notification messages to discovered cast devices 100 in the LAN 2 one by one. In response to reception of the notification message (S272), other discovered cast devices 100 may update the database 102 in the respective cast devices 100 by changing the status of the selected media playback device 100 from "available" to "occupied" (S273). The notification message may include the identification of the media playback device 100 the status of which has been changed, so that the cast devices 100 may change the status of the media playback device 100 identified by the identification at the step S273.

Upon the fetch and playback of the casted media content item (S200, S210, S220), the media playback device 100 may update the status of availability into "occupied" from "available" on the attribute information 101 (S274a). After initiation of playback of the casted media content item, upon finish of the playback of the casted media content item (S274b: Yes), the media playback device 100 may update the status of availability into "available" from "occupied" on the attribute information 101 (S275a). The media playback device 100 may then issue a notification message indicative of the finish (e.g., completion, termination, etc.) of the playback, and send the notification message to the cast device 100 (i.e., cast device 100 which issued the cast request at the step S100) over the WLAN communication (S275b). In response to reception of the notification message (S276), the cast device 100 may update the database 102 in the cast device 100 itself by changing the status of the selected media playback device 100 from "occupied" to "available" (S277). The cast device 100 may then issue a notification message indicative of the status change of the selected media playback device 100, and send the notification message to the other cast devices 100 in the LAN 2 over the WLAN communication (S278). At the step S278, the cast device 100 may broadcast the notification message in the LAN 2 or unicast the notification messages to discovered cast devices 100 in the LAN 2 one by one. In response to reception of the notification message (S279), other discovered cast devices 100 may update the database 102 in the respective cast devices 100 by changing the status of the selected media playback device 100 from "occupied" to "available" again (S280). The notification message may include the identification of the media playback device 100 the status of which has been changed, so that the cast devices 100 may change the status of the media playback device 100 identified by the identification at the step S280. According to the process P8, every time an available media playback device 100 starts playback of a casted media content item based on the cast at the step S100, the status change of the media playback device 100 from "available" to "occupied" will be notified soon to each cast device 100 in the LAN 2. Also, every time the media playback device 100 finishes the playback, the status change of the media playback device 100 from "occupied" to "available" will be also notified soon to each cast device 100 in the LAN 2. Accordingly, every cast device 100 in the LAN 2 may be aware of available and occupied media playback devices 100 timely enough to identify available media playback devices 100 right when the cast device 100 is about to cast.

FIG. 14C is a flowchart illustrating an example of a process P9 for the restricted cast, according to some embodiment where each media playback device 100 is configured to notify changes of the statuses of the media playback device 100. In the process P9, upon the fetch and playback of the casted media content item (S200, S210, S220) as requested according to the step S100 (S100h, S100i, S100j), the media playback device 100 may update the status of availability into "occupied" from "available" on the attribute information 101 (S281a). The media playback device 100 may then issue a notification message indicative of the status change to send the notification message to every cast device 100 in the LAN 2 over the WLAN communication (S281b). At the step S281b, the media playback device 100 may broadcast the notification message over the WLAN communication, so that every cast device 100 in the LAN 2 may equally receive the notification message. Alternatively, at the step S281b, the media playback device 100 may unicast the notification messages to cast devices 100 in the LAN 2 one by one. In response to reception of the notification message (S282), the cast device 100 which has requested the cast (caster 100) may update the database 102 in the cast device 100 by changing the status of the media playback device 100 from "available" to "occupied" (S283). Each of other cast devices 100 (other than caster 100) in the LAN 2 may also respond to the notification message (S284) by updating the database 102 in the cast devices 100 by changing the status of the media playback device 100 from "available" to "occupied" (S285). The notification message issued at the step S281b may include the identification of the notifying media playback device 100, so that the cast devices 100 may change the status of the media playback device 100 identified by the identification at the steps S283 and S285.

After initiation of the playback of a casted media content item, upon finish of the playback of a casted media content item (S286: Yes), the media playback device 100 may update the status of availability into "available" from "occupied" on the attribute information 101 (S287a). The media playback device 100 may then issue a notification message indicative of the status change to send the notification message to every cast device 100 in the LAN 2 over the WLAN communication (S287*b*). At the step S287*b*, the media playback device 100 may broadcast the notification message over the WLAN communication, so that every cast device 100 in the LAN 2 may equally receive the notification message. Alternatively, at the step S287*b*, the media playback device 100 may unicast the notification messages to cast devices 100 in the LAN 2 one by one. In response to reception of the notification message (S288), the cast device 100 which has requested the cast (caster 100) may update the database 102 in the cast device 100 by changing the status of the media playback device 100 from "occupied" to "available" (S289). Each of other cast devices 100 (other than caster 100) in the LAN 2 may also respond to the notification message (S290) by updating the database 102 in the cast devices 100 by changing the status of the media playback device 100 from "occupied" to "available" (S291). The notification message at the step S287*b* may include the identification of the notifying media playback device 100, so that the cast devices 100 may change the status of the media playback device 100 identified by the identification at the steps S289 and S291.

FIG. 14D schematically illustrates an example of a GUI activated or displayed at the step S100*i*. In the example, the GUI may include one or more GUI elements E17 each of which represents a discovered media playback device 100, besides the GUI elements E14 discussed above representing available media content items. The GUI elements E17 which represent available media playback devices 100 (e.g., GUI elements E17*b* representing a media playback device 100*b* illustrated in FIG. 14D) are active to be selectable by the user whereas the other GUI elements E17 which represents occupied media playback devices 100 (e.g., GUI elements E17*a* and E17*c* representing media playback devices 100*a* and 100*c* illustrated in FIG. 14D) are inactive to be unselectable, thereby intentionally allowing the user to select only available media playback devices 100 among discovered media playback devices 100. Through the GUI, selection of a GUI element E14*a* and GUI element E17*b* may invoke a cast request for a media content item represented by the GUI element E14*a* to a media playback device 100 identified by the GUI element E17*b* (S100).

FIG. 14E schematically illustrates another example of a GUI activated or displayed at the step S100*i*. In the example, the GUI may include one or more active and selectable GUI elements E17 each of which represent an available media playback device 100 (e.g., GUI element E17*b* representing a media playback device 100*b* only in FIG. 14E), besides the GUI elements E14 discussed above representing available media content items. The GUI may fail to present GUI elements which represent occupied media playback devices 100. Through the GUI, selection of a GUI element E14*a* and GUI element E17*b* may invoke a cast request for a media content item represented by the GUI element E14*a* to a media playback device 100 identified by the GUI element E17*b* (S100).

The following describes an exemplary scenario where there are two cast devices 100*m* and 100*n* and three media playback devices 100 (one available device 100*b* and two occupied devices 100*a*, 100*c* as illustrated in FIG. 14A) in the LAN 2, and the cast device 100*m* is about to cast a media content item. The cast device 100*m* is allowed to perform the cast only to the media playback device 100*b* (S100). According to the process P8, the cast device 100*m* changes the status of the media playback device 100*b* (S270), and notifies the cast device 100*n* of the status change (S271). The cast device 100*n* is notified (S272), and changes the status of the media playback device 100*b* (S273). Thereafter, the cast device 100*m* is notified (S276), and changes the status of the media playback device 100*b* (S277). The cast device 100*m* notifies the cast device 100*n* of the status change (S278), so that the cast device 100*n* is notified (S279) and changes the status of the media playback device 100*b* (S280). According to the process P9, the cast devices 100*m* and 100*n* are notified about the status change (S282, S284, S288, S290), and change the status of the media playback device 100*b* on the respective databases 102 (S283, S285, S289, S291).

Management of Priorities of Playback Devices

In some embodiments, the priorities of media playback devices 100 may be managed by each cast device 100 in the LAN 2 in addition to the availability of the media playback devices 100. In the embodiments, each media playback device 100 may be assigned a specific priority that indicates the priority to be selected as a destination of a cast of a media content item. The media playback device 100 in the "available" status having the highest priority may be always identified as a destination of each cast. Accordingly, when a cast device 100 performs multiple casts of media content items, the media playback devices 100 may be identified as destinations of the casts one by one in descending order of priority. In the embodiments, the attribute information 101 in each UE 100 may include priority information indicative of the current priority of the UE 100 among others. The attribute information 101 may be included in the information notified in the respondence (S13) by each UE 100 in the discovery process P1, so that each UE 100 may be aware of the current priorities of other discovered UEs 100. The priority of each discovered UE 100 may be managed on the database 102 associated with other information such as the name and ID of the UE 100, as illustrated in FIG. 15A.

FIG. 15A schematically illustrates an example of the database or look-up table 102 for management of the availability and priority of each media playback device 100, according to some embodiments. The priority may be assigned to each media playback device 100, associated with the name, ID, and availability. In the example illustrated in FIG. 15A, the database 102 shows that the media playback device 100*c* identified by the ID "iii.jjj.kkk.lll" has the first (top or highest) priority and is currently in the status "occupied", the media playback device 100*a* identified by the ID "aaa.bbb.ccc.ddd" has the second priority and is currently in the status "occupied", and the media playback device 100*b* identified by the ID "eee.fff.ggg.hhh" has the third (lowest) priority and is currently in the status "available". For management of the priority of each media playback device 100 on the database 102, the information notified in the respondence by each media playback device 100 at the step S13 in the discovery process P1 may include the priority of the media playback device 100.

FIGS. 15B and 15C are flowcharts illustrating examples of processes P10 and P11 respectively for cast with reference to the availabilities and priorities of media playback devices 100, according to some embodiments. In the processes P10 and P11, the cast request at the step S100 may include activating a UI through which to receive a user input to initiate a cast of a media content item (S100*k*), receiving a user input to initiate a cast of the media content item through the UI (S100*l*), and identifying a media playback device 100 in the "available" status having the highest priority among others, with reference to the database 102 (S100*m*), thereby causing the identified media playback device 100*b* to play back a casted media content item (S200, S210, S220).

In the process P10, the cast device 100 may perform the update of the database 102 and the notification just as it does in the process P8. That is, upon initiation of the cast, the cast device 100 may change the status of the identified media playback device 100 on the database 102 (S270), and notify the other cast devices 100 of the status change (S271), so that said other cast devices 100 may change the status on their respective databases 102 (S272, S273). Upon reception of a notification as to finish of playback of a casted media content item from the identified media playback device 100 (S276), the cast device 100 may change the status of the identified media playback device 100 on the database 102 (S277), and notify the other cast devices 100 of the status change again (S278), so that said other cast devices 100 may change the status on their respective databases 102 (S279, S280).

In the process P11, the cast device 100 may perform the update of the database 102 and the notification just as it does in the process P9. That is, upon reception of a notification as to initiation of playback of a casted media content item from the identified media playback device 100 (S282, S284), the cast devices 100 may change the status of the identified media playback device 100 on their respective databases 102 (S283, S285). Upon reception of a notification as to finish of playback of the casted media content item from the identified media playback device 100 (S288, S290), the cast devices 100 may change the status of the identified media playback device 100 on their respective databases 102 (S289, S291).

FIGS. 15D and 15E schematically illustrate examples of a GUI activated or displayed at the step S100*k*, according to some embodiments. In the example, the GUI may include a GUI element E18*a* that represents cast of a media content item, configured to be selectable by the user to initiate the cast, besides the GUI elements E14 discussed above representing available media content items. Selection of a GUI element E14*a* and the GUI element E18*a* may invoke a cast request for a media content item represented by the GUI element E14 to the media playback device 100 in the "available" status having the highest priority with reference to the database 102 (S100). As illustrated in FIG. 15E, the GUI element E18*a* may be one indicative of the number of available media playback devices 100 in the "available" status (e.g., the one indicative of "two" available media playback devices 100 in the example illustrated in FIG. 15E), in which case the activation of the GUI at the step S100*k* may include counting the number of available media playback devices 100 with reference to the database 102 to reflect the counted number to the GUI element E18*a*.

The following describes an exemplary scenario where there are two cast devices 100*m* and 100*n* and three media playback devices 100 (two available devices 100*a*, 100*b* and one occupied device 100*c* as illustrated in FIG. 15A) in the LAN 2, and the cast device 100*m* is about to cast a media content item. The cast device 100*m* is allowed to perform the cast only to the media playback devices 100*a*, 100*b* (S100). According to the processes P10 and P11, the cast device 100 may identify the media playback device 100*a* as a destination of a cast (S100*m*), because the media playback device 100*a* has the highest priority among the media playback devices 100 (100*a*, 100*b*) in the "available" status, ignoring the occupied media playback device 100 (100*c*). Thereafter, the status of the media playback device 100*a* may be changed (S270, S273, S283, S285). If the cast device 100*m* or 100*n* performs a new cast request for another media content item (S100) before the statuses of the media playback devices 100*a*, 100*c* are changed back to "available" (S277, S280, S289, S291), then the media playback device 100*b* may be identified as a destination of the new cast, because the media playback device 100*b* would have the highest priority in the "available" status.

Intuitive Cast Request

In some embodiments, the cast device 100 may facilitate issuance of cast requests (S100) to multiple media playback devices 100 intuitively through a GUI that presents first icons representing discovered media playback devices 100 and second icons representing castable media content items to be casted. More specifically, a method is provided to allow the user to intuitively link a media playback device 100 with a castable media content item to the media playback device 100 using the first and second icons on the GUI for initiation of the casts.

In the embodiments, each media playback device 100 may be categorized into a specific product category, such as a wireless speaker, digital picture frame, television set like a smart TV, etc., in which case each product category may be associated with one or more playable formats or types of media content item the product category can accept. For example, a wireless speaker or smart speaker may be provided with a loudspeaker for audio output, and thus may accept audio media content items as the playable content type but cannot accept video media content items since it is not provided with means for video output. A digital picture frame may be provided with a display for video output, and thus may accept video media content items as the playable content type but cannot accept audio content items since it is not provided with means for audio output. A smart TV may be provided with both of a loudspeaker for audio output and a display for video output, and thus may accept video and audio media content items as the playable content types. In the embodiments, the attribute information 101 in each UE 100 may include product information indicative of the product category of the UE 100 and the associated playable content types. The attribute information 101 may be included in the information notified in the respondence (S13) by each UE 100 in the discovery process P1, so that each UE 100 may be aware of the product categories and associated playable content types of other discovered UEs 100. The product category and associated playable content types of each discovered UE 100 may be managed on the database 102 associated with other information such as the name and ID of the UE 100, as illustrated in FIG. 16A. In the example illustrated in FIG. 16A, the media playback devices 100*a* identified by the ID "aaa.bbb.ccc.ddd" is identified as a wireless speaker that is capable of playing back audio content items only (Video: No, Audio: Yes); the media playback device 100*b* identified by the ID "eee.ff.ggg.hhh" is identified as a smart TV that is capable of playing back both video and audio content items (Video: Yes, Audio: Yes); and the media playback device 100 identified by the ID "iii.jjj kkk.lll" is identified as a digital picture frame that is capable of playing back video content items only (Video: Yes, Audio: No).

The cast device 100 may also manage graphical icons for representing media playback devices 100 on the GUI. In some aspects, different or distinct icons are defined to the media playback devices 100 depending on the product category to which they belong. FIG. 16B schematically illustrates an example of a database or look-up table 103 on the cast device 100 to manage the icons for representing the media playback devices 100 associated with the product categories, according to some embodiments. In the example, an icon graphically depicting a speaker may be associated with the product category "wireless speaker"; an icon graphically depicting a display may be associated with the product category "smart TV"; and an icon graphically depicting a picture frame may be associated with the product category "digital picture frame".

FIG. 16C is a flowchart illustrating an example of a process P12 for the intuitive issuance of the cast requests (S100) using the first and second icons on a GUI, according to some embodiments. In the process P12, the cast device 100 may activate or display on the display of the cast device 100 a GUI including presentation of one or more first icons each of which represents a discovered specific media playback device 100, through which to receive a user input to determine a destination of a cast of a media content item using the icons (S2000), prior to issuance of the cast request at the step S100. The display of the GUI at the step S2000 may include identifying the product category of each discovered media playback device 100 with reference to the database 102 (S2000a); identifying an icon associated with the identified product category with reference to the database 103 (S2000b); and displaying the identified icon associated with the each discovered media playback device 100 (S2000c), as illustrated in FIG. 16D. The GUI may also include presentation of one or more second icons each of which represents an available media content item, for receiving a user input to "link" one of the first icons with one of the second icons (S2000d). The cast request at the step S100 may include receiving a user input to link a first icon with a second icon (S2001), and respond to the linkage by determining a media playback device 100 represented by the first icon to be a destination of a cast of a media content item represented by the second icon (S2002). The cast device 100 may issue the cast request message for the media content item addressed to the media playback device 100 determined as the destination at the step S2002, thereby causing the addressed media playback device 100 to fetch and play back the casted media content item (S200, S210, S220). At the step S100, the cast device 100 may also determine whether or not the determined media playback device 100 accepts the type or format of the linked media content item as a playable content type with reference to the database 103 (S2003). Upon determining positively that the determined media playback device 100 is capable of playing back the linked media content item (S2003: Yes), the cast device 100 may issue the cast request addressed to the determined media playback device 100 (S2004), thereby causing the determined media playback device 100 to play back the casted media content item (S200, S210, S220). If the linked media content item is determined unacceptable by the determined media playback device 100 (S2003: No), the cast device 100 may fail to fetch or play back the media content item.

FIG. 16E schematically illustrates an example of the GUI displayed at the step S2000, according to some embodiments. FIG. 16E describes the example where four media playback devices 100 (i.e., smart TVs 100a and 100b, wireless speaker 100c, and digital picture frame 100d) are discovered by the cast device 100 in the LAN 2 and there are multiple media content items castable by the cast device 100. The GUI may include a first area A4 in which first icons E20 representing the discovered media playback devices 100a, 100b, 100c, 100d are displayed, and a second area A5 in which second icons E21 representing the castable media content items are displayed. Each one of the icons E20 and E21 may be selectable by the user using the input of the cast device 100. The cast device 100 may receive a first user selection of one of the first icons E20 and a second user selection of one of the second icons E21 subsequent to the first selection, or vice versa (i.e., one of the user selections may come first and the other one may come subsequently), to "link" the media content item represented by the selected second icon E21 with the media playback device 100 represented by the selected first icon E20 (S2001). An example of the first and second user selections may be selections of the first and second icons individually in sequence within a predetermined time period (e.g. two seconds). Another example of the first and second user selections may be accomplished by a "drag-and-drop" which drags a second icon E21 to a first icon E20 or vice versa, as illustrated in FIG. 16F. The first and second user selections may invoke determining the media playback device 100 identified by the first selection (e.g., wireless speaker 100c in FIG. 16F) to be a destination of a cast of the media content item identified by the second selection (S2002). Upon the determination of a destination of a cast, namely, upon linkage of the selected media content item with the selected media playback device 100 (S2002), the GUI may transition to provide a visual indication E22 indicative of the linkage as the cast device 100 initiates the cast request for a cast of the selected media content item to the selected media playback device 100 (S2004). The visual indication E22 may be indicative of the linkage relationship by, for example, circling the selected media content item and media playback device 100 together, drawing a line such as an arrow between the selected media content item and media playback device 100, etc., as illustrated in FIGS. 16G and 16H. In response to an acceptable linkage (S2003: Yes), the cast device 100 may initiate the cast request of the selected media content item to the selected media playback device 100 (S2004) with the GUI transitioning to provide the visual indication E22. In response to an unacceptable linkage (S2003: No), the cast device 100 may fail to initiate the cast request against cast of the selected media content item to the selected media playback device 100 without the GUI transitioning to provide the visual indication E22. As long as the casted media content item is played back by the selected media playback device 100 (S220), the visual indication E22 may be maintained in the GUI.

In some embodiments, in the display of the GUI at the step S2000, the cast device 100 may allow the user to link a media content item with a discovered media playback device 100 more intuitively using a layout image that represents or reflects an actual layout or arrangement of the media playback devices 100. The layout image may be generated by overlaying the first icons representing the discovered media playback devices 100 on a background image that represents an actual space (e.g., user's room, office, etc.) in which the devices 100 reside. In the embodiments, the cast device 100 may allow the user to link a media content item with a media playback device 100 on the layout image on the GUI (S2001).

FIGS. 16I and 16J are flowcharts illustrating exemplary steps performed in the display of the GUI at the step S2000 for the intuitive cast request using the layout image, according to some embodiments. The display of the GUI (S2000) may include identifying a background image that represents the actual space in which the discovered media playback devices 100 reside (S2000f); displaying the identified background image (S2000g); displaying the first icons in proximity to the background image (S2000h); receiving a user input to move the icons to desired positions in the background image to overlay the first icons on the background image (S2000i); and generating a layout image that represents or reflects an actual layout of the media playback devices 100 by overlaying the first icons on the background image, namely, combining the background image with the overlaying first icons into the layout image, and storing the layout image on the cast device 100 (S2000j). In response to the layout image being generated, the GUI may transition to display the layout image along with display of the second icons representing media content items. At the step S2000f, the cast device 100 may identify an image (e.g., map, blueprint, interior sketch, etc.) preliminarily stored by the user on a memory of the cast device 100, as the background image. Alternatively, at the step S2000f, the cast device 100 may automatically activate a built-in camera of the cast device 100 to capture an image of the actual space in which the media playback devices 100 reside (S2000l), as illustrated in FIG. 16J. The cast device 100 may capture the image in response to a user input to perform the image capture, namely release the shutter of the camera (S2000m), and then store the image as the background image on the memory of the cast device 100 (S2000n), so that the cast device 100 may identify the captured image as the background image at the step S2000f.

FIGS. 16K, 16L, and 16M schematically illustrate an example of the GUI at the step S2000 using the layout image, according to some embodiments. The GUI may include display of a background image BG1 (S2000g), and display of the first icons E20 representing the discovered media playback devices 100 (S2000h) separately from but in proximity to the background image BG1. The GUI may receive a user input to move a first icon E20 to a desired position in the background image BG1, over the background image BG1 (S2000i), so that the user is allowed to locate each first icon E20 on the background image BG1 according to the actual location of the media playback device 100 in the actual space in which the device 100 resides. The movement of a first icon E20 to the desired position may be accomplished by, for example, a "drag-and-drop" which drags the first icon E20 to the desired position. In response to completion of arrangement of all or part of the first icons E20 on the background image BG1, the background image BG1 and the overlaying first icons E20 may be combined together into the layout image L1 which is then stored on the cast device 100 (S2000j). In the example illustrated in FIG. 16M, the layout image L1 is generated in which the smart TV 100a is moved to be located at the upper right corner of the "bed room", the smart TV 100b is moved to be located at the upper left corner of the "bed room", the wireless speaker 100c is moved to be located in the "bath room", and the digital picture frame 100d is moved to be located in the "kitchen". In response to the layout image L1 being generated (S2000j), the GUI may transition to display the second icons E21 representing the media content items along with display of the layout image L1, as illustrated in FIG. 16N. The second icons E21 may be displayed separately from but in proximity to the layout image L1. The GUI may receive the above-mentioned first user selection of a first icon on the layout image L1 and the above-mentioned second user selection of a second icon to link a selected media content item with a selected media playback device 100 (S2001). In the example shown in FIGS. 16N, 16O, and 16P, the media content item represented by an icon E21a is linked with the media playback device 100a by way of the first user selection of the icon E21a and the second user selection of the icon E20 representing the media playback device 100a. The visual indication of the linkage E22 may be applied on the layout image L1, but it may be preferable to omit the visual indication E22 in case the visual indication E22 could be visually confusing to the user by overlapping the background image BG1. Absent the visual indication E22, the state of an established linkage may be visually recognizable by linked icons E20 and E21a being displayed closely to one another, preferably in a manner where the icons E20 and E21a substantially overlaps one another, as a result of the movement of the icon at the step S2000i, as illustrated in FIG. 16P. After issuance of the cast request for the selected media content item addressed to the selected media playback device 100, the GUI may be maintained as long as playback of the casted media content item by the selected media playback device 100 is in progress (S200, S210, S220).

In the embodiments, the cast device 100 may receive the user input to link a specific media content item with a media playback device 100 for each media playback device 100 shown in the area A4 or in the layout image L1 (S2001), thereby allowing establishment of multiple linkages between the discovered media playback devices 100 and different media content items concurrently. Accordingly, the cast device 100 may issue multiple cast requests to the discovered media playback devices 100 concurrently or in parallel to one another (S100), thereby causing each of the media playback devices 100 to play back a specific media content item casted to the media playback device 100 itself (S200, S210, S220).

In some embodiments, the cast device 100 may control the ongoing one or more casts (S110) through the GUI displayed at the step S2000. While the GUI displayed at the step S2000 is active during one or more playbacks of casted media content items being in progress by one or more discovered media playback devices 100, the control (S110) may include the cast device 100 receiving a user input to identify a target cast, which is a cast to be controlled at the step S110, by way of a user selection of a portion associated with a linkage corresponding to the target cast among the one or more linkages on the GUI (S110g), as illustrated in FIG. 16Q. The cast device 100 may allow the user to identify a cast the user wants to control, as the target cast, at the step S110g. The user selection acceptable at the step S110g may be a selection of a visual indication E22 indicative of a linkage for the target cast, a selection of a first or second icon E20 or E21 displayed in the linkage relationship for the target cast, etc. The control (S110) may include popping up or displaying the set of GUI elements E10 for control of the target cast in connection with the target cast, in response to the identification of the target cast (S110h), and controlling the target cast as requested through the GUI elements E10 (S110i). At the step S110h, the GUI elements E10 may be popped up closely to the first or second icon E20 or E21 associated with the target cast. At the step S110h, the first or second icon E20 or E21 associated with the target cast may be changed in the appearance distinctively from other icons, e.g., highlighted, along with display of the GUI elements E10. FIGS. 16R and 16S schematically illustrate an example where the linkage of the smart TV 100a and a media content item represented by the icon E21b, namely, a first cast of the media content item represented by the icon E21b directed to the smart TV 100a, is selected and identified as the target cast (S110g). In response, the GUI elements E10 may be popped up in proximity to the visual indication E22 associated with the first cast, in connection with the icon E21b (S110h). FIGS. 16T, 16U, and 16V schematically illustrate another example where the first cast is selected as the target cast through the layout image L1. A selection of the icon E21*b* or E20 associated with the first cast as the target cast may invoke pop up of the GUI elements E10 in proximity to the selected icon E21*b* or E20, as illustrated in FIGS. 16T and 16U. Alternatively, the selection of the icon E21*b* or E20 may invoke pop up of the GUI elements E10 independently or apart from the selected icon, for example, substantially in the middle of the GUI, along with highlighting of the selected icon E21*b* or E20, thereby letting the user recognize that the GUI elements E10 is operable for control of the first cast selected as the target cast, as illustrated in FIGS. 16T and 16V.

Cast Upon Approval by Supervisory Cast Device

In some embodiments, each cast device 100 may be set as one of a supervisory cast device and a non-supervisory cast device. The supervisory cast device 100 may be authorized to or have the sole discretion to supervise casts in the LAN 2, namely, approve or disapprove casts requested by other cast devices 100 in the LAN 2. The non-supervisory cast device 100 may have no such authority to supervise casts in the LAN 2. Casts requested by a non-supervisory cast device 100 may be processed by the media playback device 100 only when the supervisory cast device 100 has approved them. Each cast device 100 may allow the user to receive a user input to set the cast device 100 as one of the supervisory device and non-supervisory device, to store the setting on the cast device 100. The setting of whether the device 100 is supervisory or non-supervisory may be stored as the attribute information 101 on each UE 100. In the embodiments, the attribute information 101 in each UE 100 may include authority information indicative of whether the UE 100 is supervisory or non-supervisory. The attribute information 101 may be included in the information notified in the respondence (S13) by each UE 100 in the discovery process P1, so that each UE 100 may be aware of the settings of other discovered UEs 100. The setting of each discovered UE 100 may be managed on the database 102 associated with other information such as the name and ID of the UE 100, as illustrated in FIG. 17A. In the example illustrated in FIG. 17A, the cast device 100B identified by the ID "EEE.FF.GGG.HHH" is set to be a supervisory device while the cast devices 100A and 100C identified by the IDs "AAA.BBB.CCC.DDD" and "III.JJJ.KKK.LLL" respectively are set to be a non-supervisory device.

FIG. 17B is a flowchart illustrating an example of a process P13 for initiation of casts upon approval by a supervisory device, according to some embodiments. In response to the cast request issued by a cast device 100 at the step S100 (S200), the media playback device 100 may determine whether the cast request issuer 100, namely, the cast device 100 from which the media playback device 100 has received the cast request is a supervisory device or non-supervisory device with reference to the database 102 (S2010), prior to fetch and playback of the casted media content item (S210, S220). The determination at the step S2010 may be affirmative if the ID of the cast request issuer 100 matches the user ID of the supervisory media playback device 100. Upon determining that the cast request issuer 100 is supervisory itself (S2010: Yes), the media playback device 100 may perform the fetch and playback of the casted media content item (S210, S220). Upon determining that the cast request issuer 100 is not supervisory (S2010: No), the media playback device 100 may issue an inquiry as to approval for playback of the casted media content item, and send the inquiry to a supervisory cast device 100 over the WLAN communication (S2011). The transmission of the inquiry at the step S2011 may include identifying the supervisory cast device 100 with reference to the database 102, and sending the inquiry to the identified supervisory cast device 100. After the transmission of the inquiry, the media playback device 100 may wait for a response thereto to come from the supervisory cast device 100. If the media playback device 100 receives a positive response indicative of approval for playback of the casted media content item (S2015), the media playback device 100 may perform the fetch and playback of the casted media playback device 100 (S210, S220). On the other hand, if the media playback device 100 receives a negative response indicative of disapproval against playback of the casted media content item (S2017), the media playback device 100 may fail to perform the fetch and playback of the casted media content item, and instead, issue and send a notification indicative of the disapproval to the cast request issuer 100 over the WLAN communication (S2018). In response to the notification issued at the step S2018 (S2019), the cast request issuer (cast device) 100 may activate a UI that notifies the disapproval (S2020). In the process P13, when in operation as the supervisory cast device 100, the cast device 100 may respond to the inquiry issued by the media playback device 100 at the step S2011 by approving or disapproving the inquiry (S2012, S2013). In an aspect, the supervisory cast device 100 may prompt the user to select one of approval or disapproval on a UI, and approve or disapprove the cast initiated by the cast request issuer 100 depending on the user selection at the step S2013. Upon approval for the cast (S2013: Yes), the supervisory cast device 100 may issue send a positive response message to the media playback device 100 over the WLAN communication (S2014). Upon disapproval against the cast (S2013: No), the supervisory cast device 100 may issue and send a negative response message to the media playback device 100 over the WLAN communication (S2016).

FIG. 17C is a flowchart illustrating an example of a process P14 for initiation of casts upon approval by a supervisory device, according to some embodiments. In the embodiments, the cast device 100 may first determine whether or not the cast device 100 itself is supervisory prior to issuance of a cast request with reference of the setting of the cast device 100 (S100*n*). Upon determining that the cast device 100 is supervisory (S100*n*: Yes), the cast device 100 may issue the cast request (S100*s*). Upon determining that the cast device 100 is not supervisory (S100*n*: No), the non-supervisory cast device 100 may issue an inquiry as to approval for issuance of the cast request, and send the inquiry to a supervisory cast device 100 over the WLAN communication (S100*o*). The transmission of the inquiry at the step S100*o* may include identifying the supervisory cast device 100 with reference to the database 102, and sending the inquiry to the identified supervisory cast device 100. After the transmission of the inquiry, the non-supervisory cast device 100 may wait for a response thereto to come from the supervisory cast device 100. If the non-supervisory cast device 100 receives a positive response indicative of approval for initiation of the cast (S100*p*), the cast device 100 may perform the issuance of the cast request (S100*s*). On the other hand, if the non-supervisory cast device 100 receives a negative response indicative of disapproval against initiation of the cast (S100*q*), the cast device 100 may fail to perform the issuance of the cast request. In the process P14, when in operation as the supervisory cast device 100, the cast device 100 may respond to the inquiry issued by the non-supervisory cast device 100 at the step S100*o* by approving or disapproving the inquiry (S2017, S2018). In an aspect, the supervisory cast device 100 may prompt the user to select one of approval or disapproval on a UI, and approve or disapprove the initiation of the cast by the cast request issuer 100 depending on the user selection at the step S2018. Upon approval for the cast (S2018: Yes), the supervisory cast device 100 may issue send a positive response message to the non-supervisory cast device 100 over the WLAN communication (S2019). Upon disapproval against the cast (S2018: No), the supervisory cast device 100 may issue and send a negative response message to the non-supervisory cast device 100 over the WLAN communication (S2020).

The control of cast based on approval by a supervisory cast device 100 according to the process P13 or P14 may be advantageous in the field of, for example, educational application in classrooms. In the educational application, a cast device 100 held by a teacher may be set as the supervisory device while other cast devices 100 held by his/her students are set as a non-supervisory device, in order for the teacher to control casts of media content items by the students. For example, the students may be ordered by the teacher to do their homework which involves creation of a video content item. The students are allowed to cast their homework video items to a media playback device 100 for presentation to the teacher and the other students, under supervision of the teacher.

The process P13 or P14 may be modified in a manner that a cast of a media content item may be initiated on the basis of approval by all of the cast devices 100 other than a cast requester, not only by the supervisory device among them. In the modified process P13, the media playback device 100 may send the inquiry at the step S2011 to all of the discovered cast devices 100 other than the cast requester (S2011), in which case all of the cast devices 100 may be configured to respond to the inquiry by sending a positive response message or negative response message depending on approval or disapproval (S2012, S2013, S2014, S2016). The media playback device 100 may perform the fetch and playback of a casted media content item (S210, S220) upon reception of positive responses from all of the discovered cast devices 100 other than the cast requester (S2015). In the modified process P14, the cast device 100 may send the inquiry at the step S100o to all of the other discovered cast devices 100 (S100o), in which case all of the cast devices 100 may be configured to respond to the inquiry by sending a positive response message or negative response message depending on approval or disapproval (S2017, S2018, S2019, S2020). The cast device 100 may issue the cast request at the step S100s (S100s) upon reception of positive responses from all of the other discovered cast devices 100 (S100p).

PA System Using Cast

In some embodiments, each UE 100 in the LAN 2 may be set as one of a device operative as a microphone system to input sound for cast of the sound ("audio-in device") and a device operative as a loudspeaker system to output sound inputted through the cast ("audio-out device"). One or more UEs 100 set as an audio-in device and one or more UEs 100 set as an audio-out device may constitute a public address (PA) system, public notification system, or wireless microphone system where sound such as voice inputted by the audio-in devices is casted and outputted by the audio-out devices over the LAN 2. In the embodiments, the attribute information 101 in each UE 100 may include category information indicative of whether the UE 100 is set as the audio-in device or audio-out device. The attribute information 101 may be included in the information notified in the respondence (S13) by each UE 100 in the discovery process P1, so that each UE 100 may be aware of the categories of other discovered UEs 100. The category of each discovered UE 100 may be managed on the database 102 associated with other information such as the name and ID of the UE 100, as illustrated in FIG. 18A. In the example illustrated in FIG. 18A, the UE 100a identified by the ID "aaa.bbb.ccc.ddd" is set to be an audio-in device, whereas UEs 100b and 100c identified by the IDs "eee.fff.ggg.hhh" and "iii.jjj.kkk.lll" respectively are set to be an audio-out device.

FIG. 18B is a flowchart illustrating an example of a process P16 for manual setting of the UE 100 as an audio-in device or audio-out device for a PA system, according to some embodiments. In the embodiments, the UE 100 may allow the user to manually set up the UE 100 as one of an audio-in device and audio-out device through a UI (S120). At the step S120, the UE 100 may provide a UI thorough which to receive a user selection of one of the audio-in and audio-out devices (S120a). In response to the user selection (S120b), the UE 100 may store the setting on the attribute information 101 (S120c). FIG. 18C schematically illustrates an example of a GUI for the setting provided at the step S120a. The GUI may include a GUI element E25 for setting the UE 100 as the audio-in device and a GUI element E26 for setting of the UE 100 as the audio-out device. Selection of the GUI element E25 may invoke setting of the UE 100 as the audio-in device on the attribute information 101 (S120c), while selection of the GUI element E26 may invoke setting of the UE 100 as the audio-out device on the attribute information 101 (S120c).

FIG. 18D is a flowchart illustrating an example of a process P17 for automatic setting of the UE 100 depending on whether a peripheral device for audio input or output is connected to the UE 100, according to some embodiments. In the embodiments, the UE 100 may be provided with at least one interface through which to connect with the peripheral device. An example of the interface may be a jack, socket, port, or receptacle into which a corresponding plug of the peripheral device may be plugged for the connection. More specifically, the interface may be an audio jack or phone jack for input and/or output of sound that receives an audio plug of the peripheral device, a universal serial bus (USB) port that receives a USB plug of the peripheral device, a "Lightning" connector receptacle that receives a Lightning connector plug of the peripheral device pursuant to the Lightning connector specifications developed by Apple Inc., or the like. Another example of the interface may be short-range wireless communication circuitry for establishment of a short-range wireless communication pursuant to wireless communication specifications such as IEEE 802.15 specifications with the peripheral device for the connection. An example of the audio output peripheral may be a loudspeaker, headphone, or earphone. An example of the audio input peripheral may be a microphone or audio player. In the embodiments, the UE 100 may determine whether a peripheral device for audio input or output is connected to the UE 100 (S120d). Upon determining that an audio input peripheral is connected to the UE 100 (S120d: Audio IN), the UE 100 may set the UE 100 to be an audio-in device by storing the stetting as the audio-in device on the attribute information 101 (S120e). Upon determining that an audio output peripheral is connected to the UE 100 (S120d: Audio Out), the UE 100 may set the UE 100 to be an audio-out device by storing the setting as the audio-out device on the attribute information 101 (S120*f*). In some aspects where the interface is an audio jack dedicated for audio input, for example, in order to receive input of sound from a peripheral microphone, the determination at the step S120*d* may include simply determining if an audio plug is inserted in the audio jack by sensing contacts with sectioned conductors provided on the audio plug. Upon determining that the audio plug is inserted in the audio jack (S120*d*: Audio In), the UE 100 may be set as the audio-in device (S120*e*). If an audio plug is not plugged into the audio jack, the UE 100 may be set as the audio-out device (S120*f*). In some aspects where the interface is an audio jack dedicated for audio output, for example, in order to provide output of sound through a peripheral loudspeaker, the determination at the step S120*d* may include simply determining if an audio plug is inserted in the audio jack by sensing contacts with sectioned conductors provided on the audio plug. Upon determining that the audio plug is inserted in the audio jack (S120*d*: Audio Out), the UE 100 may be set as the audio-out device (S120*f*). If an audio plug is not plugged into the audio jack, the UE 100 may be set as the audio-in device (S120*e*). In some aspects where the interface is an audio jack, the determination at the step S120*d* may include determining which of the audio input peripheral and audio output peripheral is connected to the UE 100 by sensing contacts with sectioned conductors provided on the audio plug. Upon determining that the audio input peripheral is connected to the UE 100 via the plug (S120*d*: Audio IN), the UE 100 may be set as the audio-in device (S120*e*) whereas, upon determining that the audio output peripheral is connected to the UE 100 via the plug (S120*d*: Audio OUT), the UE 100 may be set as the audio-out device (S120*f*). If nothing is plugged into the audio jack, the UE 100 may enable the manual setting according to the process P16. In some aspects, the peripheral device may be provided with a memory storing identification information indicative of the identity or type of the peripheral device (i.e., audio input device or audio output device). In the aspects, the UE 100 may read the identification information on the memory of the peripheral device via the interface upon connection with the peripheral device, to automatically set the UE 100 as the audio-in device when the identification information is indicative of the audio input device whereas automatically set the UE 100 as the audio-out device when the identification information is indicative of the audio output device, as illustrated in FIG. 18E.

FIG. 18F is a flowchart illustrating an example of a process P18 for the UE 100 operating as the audio-in device or audio-out device for a PA system, according to some embodiments. In the embodiments, the UE 100 may automatically selectively operate as one of the audio-in device and audio-out device with reference to the attribute information 101 (S130*a*). When operating as the audio-in device (S130*a*: Audio IN), the UE (audio-in device) 100 may enable audio input (S130*b*) and disable audio output (S130*c*). The enablement of the audio input may include activating a built-in microphone provided in the UE 100 and/or a peripheral audio input device connected to the UE 100 via the interface, or enabling processing (e.g., encoding) of sound inputted through the built-in microphone and/or the peripheral audio input device into audio data. The disablement of the audio output may include deactivating a built-in speaker provided in the UE 100 and/or a peripheral audio output device connected to the UE 100 via the interface, or prohibiting processing (e.g., decoding) of audio data received over the LAN 2 into sound. The audio-in device 100 may then identify one or more audio-out devices 100 (i.e., one or more other UEs 100 operative as the audio-out devices) as the destination of cast (130*d*). The audio-in device 100 may cast sound inputted via the built-in microphone or peripheral audio input device to the identified one or more audio-out devices 100 according to the steps S100*a*, S100*b*, and S100*c* (S130*e*). Specifically, the audio-in device 100 may encode the inputted sound in real time to stream the encoded audio data to the audio-out devices 100 (S130*e*). On the other hand, when operating as the audio-out device (S130*a*; Audio OUT), the UE (audio-out device) 100 may enable audio output (S130*f*) and disable audio input (S130*g*). The enablement of the audio output may include activating a built-in speaker provided in the UE 100 and/or a peripheral audio output device connected to the UE 100 via the interface, or enabling processing (e.g., decoding) audio data received over the LAN 2 into sound. The disablement of the audio input may include deactivating a built-in microphone provided in the UE 100 and/or a peripheral audio input device connected to the UE 100 via the interface, or prohibiting processing (e.g., encoding) of sound inputted through the built-in microphone and/or peripheral audio input device into audio data. The audio-out device 100 may then identify one or more audio-in devices 100 (i.e., one or more other UEs 100 operative as the audio-out devices) as the source of cast (S130*h*). The audio-out device 100 may receive and play back sound casted (i.e., streamed) by the identified one or more audio-in devices 100 according to the steps S200, S210*a*, S210*b*, S220 (S130*i*). During the cast, the audio-in device 100 and audio-out device 100 may control the ongoing cast of sound and playback of the casted sound (S110). Specifically, the audio-in device 100 may issue a request for control of playback of the casted sound and send the request to the audio-out device 100 over the WLAN communication (S110*j*), so that the audio-out device 100 may respond to the request by controlling its playback of the casted sound (S110*k*).

At the step S130*d*, the audio-in device 100 may identify at least one of the UEs 100 in the LAN 2 each of which has the category of "Audio OUT" on the database 102. At the step S130*d*, the audio-in device 100 may provide a UI thorough which to receive a user selection of at least one UE 100 which has the category of "Audio OUT". FIG. 18G schematically illustrates an example of a GUI for the user selection of an audio-out device 100 at the step S130*d*. The GUI may present GUI elements E27*a* each of which represents a corresponding UE 100 which has the category "Audio OUT" on the database 102, prompting the user to select at least one of the GUI elements E27*a*. Selection of a GUI element E27*a* may invoke identifying an audio-out device 100 represented by the selected GUI element E27*a* as the destination of cast (S130*d*). In the example shown in FIG. 18G, two GUI elements E27*a* associated with the audio-out devices 100*e* and 100*g* are selected to identify the devices 100*e* and 100*g* as the cast destinations. At the step S130*e*, the audio-in device 100 may process (e.g., encode) sound inputted through the built-in microphone and/or peripheral audio input device into audio data, and cast (i.e., stream) the audio data to the identified audio-out devices 100 (S100*c*).

At the step S130*h*, the audio-out device 100 may identify at least one of the UEs 100 in the LAN 2 each of which has the category of "Audio IN" on the database 102. At the step S130*h*, the audio-out device 100 may provide a UI thorough which to receive a user selection of at least one UE 100 which has the category of "Audio IN". FIG. 18H schematically illustrates an example of a GUI for the user selection of an audio-in device 100 at the step S130*h*. The GUI may present GUI elements E27*b* each of which represents a corresponding UE 100 which has the category "Audio IN" on the database 102, prompting the user to select at least one of the GUI elements E27*b*. Selection of a GUI element E27*b* may invoke identifying an audio-in device 100 represented by the selected GUI element E27*b* as the destination of cast (S130*h*). In the example shown in FIG. 18H, two GUI elements E27*b* associated with the audio-in devices 100*a* and 100*d* are selected to identify the devices 100*a* and 100*d* as the cast destinations. At the step S130*i*, the audio-out device 100 may process (e.g., decode) audio data casted by (i.e., streamed by) the identified audio-in devices 100 into sound for output through the built-in speaker and/or peripheral audio output device (S220).

At the step S110*j*, the audio-in device 100 may provide a UI through which to receive a user operation to control the playback volume for the playbacks of the casted sound by the audio-out devices 100. FIGS. 18I, 18J, and 18K schematically illustrate examples of a GUI for the user operation at the step S110*j*. The GUI may include a GUI element E28 that is a volume bar for indication of the volume (i.e., intensity or loudness) of sound between the minimum volume at the first end (e.g., the left end when displayed horizontally or the lower end when displayed vertically) and the maximum volume at the second end (e.g., the right end when displayed horizontally or the upper end when displayed vertically). The volume bar E28 may include a GUI element E28*a* that is movable or slidable by the user to decrease or increase the volume. The audio-in device 100 may receive a user operation of moving or sliding the GUI element E28*a* along the volume bar E28 toward the first or second end (S110*j*). Movement of the GUI element E28*a* toward the first or second end may invoke issuance of the control request for decrease or increase of the volume respectively (S110*j*), in response to which the audio-out devices 100 may decrease or increase the volume at which to play back the casted sound (S110*k*).

In some aspects, the user may be allowed to control the playback volume of all or some of the audio-out devices 100 at the same level simultaneously at a time. In the aspects, a single volume bar E28 may be displayed along with or in proximity to GUI elements E29 each of which represents an identified audio-out device 100, as illustrated in FIG. 18I. Simply movement of the GUI element E28*a* may invoke issuance of the control request to all of the audio-out devices 100 represented by the GUI elements E29 (S110*j*), so that all of the identified audio-out devices 100 may response to the request by controlling the playback volume at a time (S110*k*). Alternatively, movement of the GUI element E28*a* subsequent to selection of one or more GUI elements E29 may invoke issuance of the control request to the selected audio-out devices 100 represented by the selected GUI elements E29 (S110*j*), so that the selected audio-out devices 100 may respond to the request by controlling the playback volume at a time (S110*k*).

In some aspects, the user may be allowed to control the playback volume of each audio-out device 100 individually. In the aspects, the volume bar E28 may be associated with each audio-out device 100 individually. Specifically, a volume bar E28 may be displayed in association with (e.g., in proximity to) each GUI element E29, as illustrated in FIG. 18J. Movement of the GUI element E28*a* may invoke issuance of the control request to a target audio-out device 100 represented by the GUI element E29 associated with the operated GUI element E28*a* (S110*j*), so that the target audio-out device 100 may respond to the request by controlling the playback volume (S110*k*). Alternatively, a volume bar E28 may appear or pop up in association with (e.g., over) a GUI element E29 in response to selection of the GUI element E29, as illustrated in FIG. 18K. Movement of the GUI element E28*a* subsequently to selection of a GUI element E29 may invoke issuance of the control request to a target audio-out device 100 represented by the selected GUI element E29 (S110*j*), so that the target audio-out device 100 may respond to the request by controlling the playback volume (S110*k*).

In some aspects, for the volume indication, the process P18 may include each audio-out device 100 issuing volume information indicative of the current volume to send the volume information to the identified audio-in devices 100 over the WLAN communication at one or more given points of time, so that each audio-in device 100 may display the GUI element E28*a* at the position corresponding to the current playback volume indicated by the received volume information with respect to the volume bar E28. The volume information may be sent by the audio-out device 100, for example, upon identification of the audio-in devices 100 (S130*h*), upon initiation of playback of the casted sound (S130*i*), and/or continuously or periodically during the playback of the casted sound (S130*i*). In the aspects, movement of the GUI element E28*a* may invoke issuance of the control request for decrease or increase of the volume from the current playback volume indicated by the volume information.

Initiation of Pending Cast

In some embodiments, in case the media playback device 100 receives a cast request for a media content item at the step S200 while performing another task, the media playback device 100 may suspend fetch and playback of the casted media content item according to the steps S210 and S220 until the performance of said another task (i.e., the conflicting task) ends. The fetch and playback of the casted media content item is automatically initiated upon finish or termination of the performance of the conflicting task.

FIG. 19A is a flowchart illustrating an example of a process P19 for the automatic suspension and initiation of playback of a casted media content item, according to some embodiments. In the embodiments, upon reception of a cast request for a media content item (S200), the media playback device 100 may determine whether or not the media playback device 100 is currently performing a task which would potentially conflict with playback of the casted media content item (S140*a*). The task determined at the step S140*a* may be a set of computer program instructions of an app on the media playback device 100 which invoke display of an app screen in an active manner and/or which consume resources of a memory and/or processor of the media playback device 100 over a predetermined threshold. An example of the task may be a set of computer program instructions for launch of an app like a web browser, email client, messaging app, text editor, media player, etc. actively or in the foreground (i.e., not in the background). When there is no such task being executed, namely, there is no task which would potentially conflict with playback of the casted media content item (S140*a*: No), the media playback device 100 may initiate the fetch and playback of the casted media content item (S210, S220). Upon determining that there is a task in progress which would potentially conflict with playback of the casted media content item (S140*a*: Yes), the media playback device 100 may suspend the fetch and playback of the casted media content item (S140*b*) to wait for the conflicting task to end (S140*c*). Upon determining that the media playback device 100 has finished or terminated the conflicting task (S140c: Yes), the media playback device 100 may terminate the suspension to initiate the fetch and playback of the casted media content item (S210, S220). During the suspension of the fetch and playback of the casted media content item (S140c: No), the media playback device 100 may active a UI through which to receive a user selection to override the conflicting task with fetch and playback of the casted media content item (S140d). Upon reception of the user selection to override via the UI (S140d: Yes), the media playback device 100 may terminate the conflicting task to initiate the fetch and playback of the casted media content item (S210, S220). FIG. 19B schematically illustrates an example of a GUI that prompts the user to override the conflicting task, displayed on the display of the media playback device 100 at the step S140d. The GUI may present a GUI element E32 displayed over an active app screen E31 associated with the conflicting task. The app screen E31 may be the screen displayed based on the instructions of the conflicting task, such as the screen of a web browser, email client, messaging app, text editor, media player, etc. The GUI element E32 may be a small icon that represents the pending cast of a media content item, such as a thumbnail of the media content item and an icon that describes the title of the media content item. Selection of the GUI element E32 may invoke overriding performance of the conflicting task with the fetch and playback of the media content item (S140d: Yes).

The process P19 may be so modified as to suspend the fetch and playback of the casted media content item (S140a through S140d) only when the casted media content item is a video content item that invokes video playback. This is because the video playback would conflict with the display of the screen E31 associated with the conflicting task, whereas an audio content item does not make such conflictive because the audio content item does not invoke video playback. In the modified process P19, the media playback device 100 may determine whether or not the media content item requested by cast request received at the step S200 is a video content item, prior to performance of the step S140a, and proceed to the step S140a upon determining affirmatively that the media content item is a video content item that generates video when played back. If the media content item is determined to be an audio content item that does not generate video when played back, the process proceeds to the steps S210 and S220 by skipping the steps S140a through S140d.

Switch of Cast Destination

In some embodiments, a cast destination (first cast destination) determined a first time may be switched or changed to another cast destination (second cast destination) on the basis of movement of the cast device 100 (e.g., movement of the user carrying the cast device 100) in the LAN 2 or over multiple local area networks. Specifically, the cast device 100 may switch the cast destination from a first media playback device 100a to a second media playback device 100b upon movement of the cast device 100 closer to the second media playback device 100b away from the first media playback device 100a, during cast of a media content item to the first media playback device 100a.

FIG. 20A is a flowchart illustrating an example of a process P20 for switch of cast destinations, according to some embodiments. In the process P20, after issuing the cast request to the media playback device 100 (first media playback device 100a) as a cast destination (S100) and while playback of the casted media content item is in progress by the first media playback device 100a (S200, S210, S220), the cast device 100 may continuously determine whether or not the cast device 100 is closer to another media playback device 100 (second media playback device 100b) than to the first media playback device 100a, namely, whether to change the cast destination to the second media playback device 100b (S150a). Upon determining to change the cast destination (S150a: Yes), the cast device 100 may perform the control of the ongoing cast (S110) to change the cast destination. Specifically, the control at the step S110 may include the cast device 100 terminating the ongoing cast directed to the first media playback device 100a according to the step S110a (in the process P2a), steps S110b, S110c, and S110d (in the process P2b), or steps S110e and S110f (in the process P2c); and storing a termination position at which the cast has been terminated in the duration of the casted (played back) media content item on a memory of the cast device 100 (S110i). The termination position is a temporal position or point indicating in time (e.g., seconds, minutes, and/or hours) how far the media content item has been casted (played back) at the time of the cast termination. Then, the cast device 100 may newly cast the terminated media content item (i.e., the media content item cast of which has been terminated at the step S110) to the second media playback device 100b (S100), causing the second media playback device 100b to play back the newly casted media content item (S200, S210, S220). At the step S100, the cast device 100 may newly cast the terminated media content item using the stored termination position.

Specifically, in the process P2a, the cast device 100 may terminate the ongoing streaming of a local media content item (S100a), and store the termination position which corresponds to the streaming position in the duration of the local media content item at the time of the termination (S110i). The cast device 100 may issue the cast request message for acceptance of streaming of the local media content item which starts at the stored termination position (S100a), resulting in initiating streaming of the local media content item at the stored termination position (S100c), so that the second media playback device 100b may initiate playback of the streamed media content item at the termination position (S220).

Specifically, in the process P2b, the cast device 100 may issue the control request message for termination of the ongoing playback of an online media content item (S110b), causing the first media playback device 100a to stop the ongoing playback of the media content item, and store the termination position that corresponds to the playback position in the duration of the online media content item at the time of the termination (S110i). The cast device 100 may issue the cast request message including information indicative of the stored termination position (S100d), so that the second media playback device 100b may subsequently issue the cast request message for initiation of streaming of the online media content item at the stored termination point (S210c), thereby causing the server 200 to initiate streaming of the online media content item at the termination position (S301).

Specifically, in the process P2c, the cast device 100 may issue the control request message for termination of the ongoing streaming of an online media content item (S110e), causing the server 200 to stop the ongoing streaming of the media content item (S110f), and store the termination position that corresponds to the streaming position in the duration of the online media content item at the time of the termination (S110i). The cast device 100a may issue the cast request message including information indicative of the stored termination position (S100e), causing the server 200 to subsequently issue the cast request message for acceptance of streaming of the online media content item which starts at the termination position (S100g), resulting in initiating streaming of the online media content item at the termination position (S303), so that the second media playback device 100b may initiate playback of the streamed media content item at the termination position (S220).

At the step S150a, the cast device 100 may determine if the cast device 100 has gotten closer to the second media playback device 100b on the basis of the WLAN communication with the first and second media playback devices 100a and 100b. Specifically, the cast device 100 may make the determination based on comparison of a first wireless communication quality (Qa) with the first media playback device 100a with a second wireless communication quality (Qb) with the second media playback device 100b. At the step S150a, the cast device 100 may monitor the WLAN communication to see if the cast device 100 has discovered another media playback device 100 (the second media playback device 100b) according to the discovery process; and when the second media playback device 100b is discovered, continuously comparing the first wireless communication quality Qa with the second wireless communication quality Qb. The determination at the step S150a may be affirmative (S150a: Yes) upon determining that the second wireless communication quality Qb is better than the first wireless communication quality Qa by a predetermined threshold. The comparison of the wireless communication qualities (Qa, Qb) may include comparing the absolute or relative signal strength for inbound signals using a measurement index such as the Received Signal Strength Indication (RSSI) and Signal-to-Noise ratio (S/N ratio) between the WLAN communications.

In an aspect, the second media playback device 100b may be present in the same LAN 2 as the first media playback device 100a, as illustrated in FIG. 20B. In the aspect, in response to the wireless communication quality Qb with the second media playback device 100b being better by a threshold than the wireless communication quality Qa with the first media playback device 100a due to the cast device 100m's movement within the LAN 2, the cast of a media content item may be redirected to the second media playback device 100b from the first media playback device 100a according to the process P20. In another aspect, the second media playback device 100b may be present in another LAN 2 (LAN 2b) adjacent to the LAN 2 (LAN 2a) in which the first media playback device 100a is present, where the respective ranges of the LANs 2a and 2b overlap with each other at least in part, as illustrated in FIG. 20C. In the aspect, in response to the wireless communication quality Qb with the second media playback device 100b being better by a threshold than the wireless communication quality Qa with the first media playback device 100a due to the cast device 100m's movement toward the LAN 2b, the cast of a media content item may be redirected to the second media playback device 100b from the first media playback device 100a according to the process P20. Advantageously, playback of a casted media content item originally on the first media playback device 100a can be maintained seamlessly on the second media playback device 100b to which the user with the cast device 100 has approached, in place of on the first media playback device 100a from which the user has moved away.

Resume of Cast

In some embodiments, if cast of a media content item on a media playback device 100 (first media playback device 100a) is lost or accidentally stopped for some reason associated with the WLAN communication, the cast may be resumed on a newly discovered media playback device 100b (second media playback device 100b). Specifically, the cast device 100 may resume the interrupted or accidentally terminated cast to the second media playback device 100b upon discovering the second media playback device 100a within a predetermined time period after the accidental termination.

FIG. 21A is a flowchart illustrating an example of a process P21 for resume of an interrupted cast, according to some embodiments. According to the process P21, the cast device 100 may continuously monitor the cast to determine whether or not the cast is maintained, while casting a media content item to the first media playback device 100a (S151a). In an aspect, the determination at the step S151a may include determining if the WLAN communication with the first media playback device 100a is kept established (S151a), in which case the determination at the step S151a may be negative (S151a: No) upon finding that the WLAN communication has been lost. The WLAN communication may be determined to be lost, for example, when acknowledgement or response messages are not regularly received by the cast device 100 from the first media playback device 100a over the WLAN communication, or when the first media playback device 100a is not discovered according to the discovery process. Such failure of the WLAN communication with the first media playback device 100a may be invoked, for example, when the first media playback device 100a has been turned off or disconnected from the LAN 2, or when the cast device 100 has moved away from the first media playback device 100a enough to be out of the range of the LAN 2. In another aspect, the determination at the step S151a may include determining if the ongoing cast has been terminated due to an interruption, such as a forcible termination of playback of a casted media content item by the first media playback device 100a without an explicit request by the cast device 100 for the termination, and a forcible termination of streaming of a casted online media content item by the server 200 without an explicit request by the cast device 100 for the termination. Such forcible termination may be invoked, for example, when overload occurs on the first media playback device 100 and/or the server 200, or when the ongoing cast has been overridden by another cast initiated by another cast device 100. The determination at the step S151a may be negative (S151a: No) upon finding that the ongoing cast has been terminated due to such interruption.

Upon determining that the cast directed to the first media playback device 100a is no longer maintained (S151a: No), the cast device 100 may store a resume position at which the cast was determined lost at the step S151a in the duration of the casted (played back) media content item on a memory of the cast device 100 (S151b). The resume position may be a temporal position or point indicating in time (e.g., seconds, minutes, and/or hours) how far the media content item has been casted (played back) at the time of the loss of the cast. Then, the cast device 100 may initiate a timer to count a predetermined time period to determine (S151c) to discover a media playback device 100 (second media playback device 100b) to which the cast device 100 can resume the lost cast, according to the discovery process (S151d). Upon failing to discover the second media playback device 100b within the predetermined time period (S151c: Yes), the cast device 100 may end the process P21 by discarding or deleting the stored resume position out of the memory. Upon discovering the second media playback device 100b within the predetermined time period (S151c: No, S151d: Yes), the cast device 100 may resume the lost cast to the newly discovered second media playback device 100b (S100), so that the second media playback device 100b may initiate playback of the media content item (S200, S210, S220). At the step S100, the cast device 100 may resume the cast by newly casting the media content item using the stored resume position for the second media playback device 100b to initiate playback of the media content item at the resume position (S200, S210, S220) for a seamless playback resume.

Specifically, in the process P2a, the cast device 100 may store the resume position which corresponds to the streaming position in the duration of the local media content item at the time of the loss of the cast (S151b). The cast device 100 may issue the cast request message for acceptance of streaming of the local media content item which starts at the stored resume position (S100a), resulting in initiating streaming of the local media content item at the stored resume position (S100c), so that the second media playback device 100b may initiate playback of the streamed media content item at the resume position (S220).

Specifically, in the process P2b, the cast device 100 may store the resume position which corresponds to the playback position in the duration of the online media content item at the time of the loss of the cast (S151b). The cast device 100 may issue the cast request message including information indicative of the stored resume position (S100d), so that the second media playback device 100b may subsequently issue the cast request message for initiation of streaming of the online media content item at the resume position (S210c), thereby causing the server 200 to initiate streaming of the online media content item at the resume position (S301).

Specifically, in the process P2c, the cast device 100 may store the resume position which corresponds to the streaming position in the duration of the online media content item at the time of the loss of the cast (S151b). The cast device 100a may issue the cast request message including information indicative of the stored resume position (S100e), causing the server 200 to subsequently issue the cast request message for acceptance of streaming of the online media content item which starts at the resume position (S100g), resulting in initiating streaming of the online media content item at the resume position (S303), so that the second media playback device 100b may initiate playback of the streamed media content item at the resume position (S220).

In an aspect, the second media playback device 100b may be present in the same LAN 2 as the first media playback device 100a. For example, the second media playback device 100b may be the first media playback device 100a itself which was turned off or disconnected from the LAN 2 once but thereafter has been turned on again or connected to the LAN 2 again within the predetermined time period, in which case the cast to the first media playback device 100a was lost at the step S151a (S151a: No), followed by the first media playback device 100a being discovered again as the second media playback device 100b at the step S151c (S151c: Yes). For example, the second media playback device 100b may be the first media playback device 100a itself in a situation where the cast device 100 moved away out of the range of the LAN 2 to be disconnected from the first media playback device 100a once but thereafter the cast device 100 has returned in the range of the LAN 2, in which case the cast to the first media playback device 100a was lost at the step S151a (S151a: No), followed by the first media playback device 100a being discovered again as the second media playback device 100b at the step S151c (S151c: Yes). In another example, the second media playback device 100b may be another media playback device 100 in the LAN 2 other than the first media playback device 100a, which has been discovered (S151c: Yes) after the cast to the first media playback device 100a was lost (S151a: No). In another aspect, the second media playback device 100b may be present in another LAN 2 (LAN 2b) adjacent to the LAN 2 (LAN 2a) in which the first media playback device 100a is present, as illustrated in FIG. 21B. As illustrated herein, the cast to the first media playback device 100a may be lost in response to the cast device 100 moving away out of the range of the LAN 2a to be disconnected from the first media playback device 100a (S151a: No), and thereafter the second media playback device 100b may be discovered in response to the cast device 100 entering the range of the neighboring LAN 2b (S151c: Yes). Advantageously, the interrupted cast originally directed to the first media playback device 100a may be resumed on the second media playback device 100b in the same or different LAN 2 in which the first media playback device 100a is present. Advantageously, in an environment where multiple media playback devices 100 are present in respectively different LANs 2, a casted media content item may be seamlessly played back on the media playback devices 100 in turn, for example, in response to the user carrying the cast device 100 moving over the LANs 2.

Control UI in Media Playback Device

In some embodiments, a UI for control of an ongoing cast may appear on a media playback device 100, so that the ongoing cast may be controlled through the media playback device 100 instead of through the cast device 100.

FIG. 22A is a flowchart illustrating an example of a process P22 for control of a cast through a UI on a media playback device 100, according to some embodiments. According to the process P22, the playback of a casted media content item at the step S220 may include presenting a UI for control of the streaming of the media content item in parallel to the playback (S220f). In response to a user input through the UI, the media playback device 100 may control the ongoing cast as requested by the user input (S225).

FIG. 22B is a flowchart illustrating an example of a process P22a for the cast control at the step S225 when a local media content item is being casted according to the process P2a, according to some embodiments. As illustrated herein, the control at the step S225 may include issuing a control request message for control of the ongoing streaming of the media content item, and sending the control request message to the cast device 100 over the WLAN communication (S225a), thereby causing the cast device 100 to respond to the control request message by controlling the streaming which is in progress according to the step S100c as requested by the request message (S225b).

FIG. 22C is a flowchart illustrating an example of a process P22b for the cast control at the step S225 when an online media content item is being casted according to the process P2b or P2c, according to some embodiments. As illustrated herein, the control at the step S225 may include issuing a control request message for control of the ongoing streaming of the media content item, and sending the control request message to the server 200 over the Internet communication (S225c), thereby causing the server 200 to respond to the control request message by controlling the streaming which is in progress according to the step S301 or S303 as requested by the request message (S225d).

FIG. 22D schematically illustrates an example of a GUI displayed on a display of the media playback device 100 at the step S225, according to some embodiments. The GUI E34 may be provided or displayed in response to initiation of the playback of the casted media content item, in parallel to the playback (S220f). The display of the GUI E34 may be terminated in response to termination of the playback of the casted media content item (S220f). The GUI E34 may include multiple user-selectable UI elements E34a, E34b, E34c, and E34d. The GUI element E34a may be a progress bar indicative of progress of cast in the duration of the casted media content item, similar to the UI element E10a discussed above. The progress of cast may be progress of streaming by the cast device 100 at the step 100c, indicative of how far the cast device 100 has completed streaming of the media content item within its duration; progress of streaming by the server 200 at the step S301 or S303, indicative of how far the server 200 has completed streaming of the media content item within its duration; or progress of playback by the media playback device 100 at the step S220 within its duration. The progress of streaming by the cast device 100 may be recognized or perceived with reference to streaming packets (e.g., the sequence number, timestamp, etc. in each packet) received at the step S210b. The progress of streaming by the server 200 may be recognized or perceived with reference to streaming packets (e.g., the sequence number, timestamp, etc. in each packet) received at the step S210d or S210f. The progress of playback by the media playback device 100 may be recognized or perceived with reference to the packets (e.g., the sequence number, timestamp, etc. in each packet) on which the playback is being performed at the step S220. The GUI element E34b may move or slide along the progress bar E34a from the left end (start position) to the right end (end position) in accordance with progress of cast, thereby serving as a visual indication of the cast position, namely, the temporal position in the duration at which the streaming or playback of the media content item is performed. The GUI element E34b may be slidable along the progress bar E34a manually by the user using an input of the media playback device 100, so that a user input of sliding or moving the GUI element E34b to the right may invoke issuance of the control request message for fast-forwarding of the ongoing streaming from the current cast position at the step S225a or S225c, while a user input of sliding or moving the GUI element E34b to the left may invoke issuance of the control request message for rewinding of the ongoing streaming from the current cast position at the step S225a or S225c. The GUI element E34c may be a stop icon configured to be selected by the user to invoke issuance of the control request message for termination of the ongoing streaming at the step S225a or S225c. The GUI element E34d may be a pause icon configured to be selected by the user to invoke issuance of the control request message for pause of the ongoing streaming at the step S225a or S225c. When an audio content item (e.g., a music item) is played back at the step S220, the GUI E34 may be displayed on a display of the media playback device 100 in parallel to output of sound generated as a result of the playback thorough a speaker of the media playback device 100. When a video content item (e.g., a video clip, movie item, etc.) is played back at the step S220, the GUI E34 may be displayed over a video presentation C2 generated as a result of the playback, or separately from the video presentation C2 with the GUI E34 being adjacent to the video presentation C2 as illustrated in FIG. 22D, on a display of the media playback device 100.

Video and Audio Split Cast

In some embodiments, the process P2b or P2c may be modified to cast an online media content item containing a video content and an audio content which may be combined together by the server 200. Specifically, the process P2b or P2c may be modified to allow the cast device 100 to direct streaming of the video content item and the audio content item to different media playback devices 100 separately from one another. In the embodiments, the media content item may contain a video content item and audio content item which are separately generated by the server 200 and then combined together by the server 200 into a combined media content item. For example, in an application of a video communication (e.g., video conference, video chat, etc.), the server 200 for management of the video communication may receive an audio stream associated with voice inputted through a microphone of the UE 100 and a video stream associated with images captured by a camera of the UE 100 to combine the video and audio streams into a combined stream. The combined stream (combined media content item) may be streamed by the server 200 to another UE 100 of a participant of the video communication over the Internet, so that the participant UE 100 may play back the received combined stream for audio output and video presentation.

FIG. 23A is a flowchart illustrating an example of a modified process P2b for a "split cast" for casting video and audio content items to different destinations, according to some embodiments. In the embodiments, a video content item and audio content item may be separately generated by the server 200 for streaming. According to the modified process P2b, The issuance of the cast request message at the step S100d may include issuing a first cast request message and second cast request message separately (S100d). The first cast request may be directed to a first media playback device 100 (100a) for the video content item, causing the first media playback device 100a to fetch and play back the video content item (S200, S210, S220). The second cast request may be directed to a second media playback device 100 (100b) for the audio content item, causing the second media playback device 100b to fetch and play back the audio content item (S200, S210, S220). At the step S210, the first and second media playback devices 100a, 100b may issue the request messages for the video content item and audio content item respectively (S210a), causing the server 200 to stream the video content item and audio content item to the first and second media playback devices 100a, 100b respectively (S300, S301). Similarly, the issuance of the control request message at the step S110b may include issuing a first control request message and second control request message separately (S110b). The first control request may be directed to the first media playback device 100a for control of the ongoing streaming of the video content item, while the second control request may be directed to the second media playback device 100b for control of the ongoing streaming of the audio content item. At the step S110, the first and second media playback devices 100a, 100b may issue the control request messages for control of the ongoing streaming of the video content item and audio content item respectively (S110c), causing the server 200 to control the ongoing streaming of the video content item directed to the first media playback device 100a and the audio content item directed to the second media playback device 100b (S110d).

FIG. 23B is a flowchart illustrating an example of a modified process P2c for a "split cast" for casting video and audio content items to different destinations, according to some embodiments. In the embodiments, a video content item and audio content item may be separately generated by the server 200 for streaming. According to the modified process P2c, The cast request message issued at the step S100e may describe a first cast request for streaming of the video content item directed to a first media playback device 100 (100a) and a second cast request for streaming of the audio content item directed to a second media playback device 100 (100b). The issuance of the request message by the server 200 at the step S100g may include issuing a first request message corresponding to the first cast request for streaming of the video content item and a second request message corresponding to the second cast request for streaming of the audio content item, separately (S100g). The first request message may be directed to the first media playback device 100a for the server 200 to stream the video content item to first media playback device 100a (S302, S303), causing the first media playback device 100a to fetch and play back the video content item (S200, S210, S220). The second request message may be directed to the second media playback device 100b for the server 200 to stream the audio content item to the second media playback device 100b, causing the second media playback device 100b to fetch and play back the audio content item (S200, S210, S220). The control request message issued at the step S110e may include a first control request for control of the ongoing streaming of the video content item and a second control request for control of the ongoing streaming of the audio content item (S110e). In response, the server 200 may control the ongoing streaming of the video content item directed to the first media playback device 100a and the ongoing streaming of the audio content item directed to the second media playback device 100b (S110f). In the modified process P2c, the request message issued at the step S100e may include information identifying the first and second media playback devices 100a, 100b, with reference to which the server 200 directs streaming of the video content item and audio content item respectively (S100g, S302, S303).

At the step 100d or S100e, the cast device 100 itself may be determined as one of the first and second media playback devices 100a, 100b, while a media playback device 100 listed in the database 102 of the cast device 100 may be determined as the other one of the first and second media playback devices 100a, 100b. At the step S100d or S100e, a media playback device 100 listed in the database 102 of the cast device 100 may be determined as one of the first and second media playback devices 100a, 100b, while another media playback device 100 listed in the database 102 of the cast device 100 may be determined as the other one of the first and second media playback devices 100a, 100b.

In some aspects, the split cast according to the modified process P2b or P2c may be applied to a video communication among two or more remote users of UEs 100 such as a video chat, video conference, etc. over the Internet. In the video communication, the server 200 for management of the video communication may be configured to manage participation status of UEs 100, calls from a participant (participating UE 100) to another participant, initiation and termination of talks between the UEs 100 in the video communication, etc. During the video communication, the server 200 may be configured to receive images captured by a camera of a participating UE 100 from the UE 100 over the Internet, and generate a video stream (video content item) based on the received images to send the video stream to another participating UE 100. Similarly, the server 200 may be configured to receive sound inputted through a microphone of a participating UE 100 from the UE 100 over the Internet, and generate an audio stream (audio content item) based on the received sound to send the audio stream to another participating UE 100. In the aspects, the UE 100 may be operative under control of a video communication app installed on the UE 100. Under control of the video communication app, the UE 100 may capture images (e.g., images of the user of the UE 100) using a camera of the UE 100 to stream the captured images to the server 200, and receive input of sound (voice) through a microphone of the UE 100 to stream the sound to the server 200, for the video communication.

In an aspect, the modified process P2b or P2c may be performed upon an incoming call of the video communication, as a callee. As illustrated in FIG. 23C, the server 200 may issue a notification message indicative of an incoming call to a UE 100 (first cast device 100m) over the Internet (S401) in response to a call by another UE 100 (second cast device 100n) for a video communication with the first cast device 100m (S400). Under control of the video communication app, in response to reception of the incoming call (S402), the first cast device 100m may provide a UI to notify the incoming call, through which to receive a user input to answer the incoming call (S403). Through the UI, the first cast device 100m may cast the video stream and audio stream generated by the server 200 according to the modified process P2b or P2c. FIG. 23D schematically illustrates an example of a GUI E35 displayed at the step S403. The GUI E35 may include a GUI element E35a for answering the incoming call and a GUI element E35b for rejecting the incoming call. The GUI E35 may also include a GUI element E35c listing UEs 100 as candidates for a cast destination of the video stream generated by the server 200, allowing the user to choose one of the listed UEs 100 as the destination. The GUI E35 may also include a GUI element E35d listing UEs 100 as candidates for a cast destination of the audio stream generated by the server 200, allowing the user to choose one of the listed UEs 100 as the destination. The GUI elements E35c and E35d may list the first cast device 100m itself and one or more media playback devices 100 listed in the database 102 stored on the first cast device 100m. The GUI elements E35c and E35d may be separated from but displayed along with the GUI element E35a, or may be combined with the E35a into one dialog. The GUI elements E35c and E35d may pop up to be active for selection in response to a user selection of the GUI element E35a. A user selection of the GUI element E35a, a first media playback device 100a on the GUI element E35c, and a second media playback device 100b on the GUI element E35d may invoke the cast device 100m answering the incoming call (i.e., issuing an acknowledgement for answering the incoming call to the server 200) and issuing the request message to direct streaming of the video stream and audio stream to the selected first and second media playback devices 100a, 100b respectively (S100d, S100e). As a result, in response to the request message, the server 200 may initiate the video communication between the cast devices 100m and 100n, and then stream the video stream to the selected first media playback device 100a and the audio stream to the selected second media playback device 100b, respectively (S300, S301, S302, S303).

In another aspect, the modified process P2b or P2c may be performed upon calling for a video communication, as a caller. In the aspect, under control of the video communication app, the cast device 100m may provide a UI through which to allow the user to call the user of the cast device 100*n* for a talk in the video communication. An exemplary GUI E36 illustrated in FIG. 23E may include a GUI element E36*a* for initiation of the call as well as the GUI elements E35*c* and E35*d* discussed above. The GUI elements E35*c* and E35*d* may be separated from but displayed along with the GUI element E36*a*, or may be combined with the E36*a* into one dialog. The GUI elements E35*c* and E35*d* may pop up to be active for selection in response to a user selection of the GUI element E36*a*. A user selection of the GUI element E36*a*, a first media playback device 100*a* on the GUI element E35*c*, and a second media playback device 100*b* on the GUI element E35*d* may invoke the cast device 100*m* initiating a call to the cast device 100*n* (i.e., issuing a call request to the server 200 for a talk with the cast device 100*n*) and issuing the request message to direct streaming of the video stream and audio stream to the selected first and second media playback devices 100*a*, 100*b* respectively (S100*d*, S100*e*). As a result, in response to the request message, the server 200 may initiate the video communication between the cast devices 100*m* and 100*n*, and then stream the video stream to the selected first media playback device 100*a* and the audio stream to the selected second media playback device 100*b*, respectively (S300, S301, S302, S303).

In yet another aspect, the modified process P2*b* or P2*c* may be performed while the video communication is in progress. Under control of the video communication app, the cast device 100*m* may provide a UI through which to allow the user to change the cast destination while the video stream and audio stream for the video communication is directed to the cast device 100*m* and/or a media playback device 100. An exemplary GUI E37 illustrated in FIG. 23F, which is displayed during the video communication, may include the GUI elements E35*c* and E35*d* discussed above. A user selection of a first media playback device 100*a* on the GUI element E35*c* may invoke the cast device 100*m* changing the cast destination for streaming of the video stream from the current device (the cast device 100*m* itself or a media playback device 100) to the selected first media playback device 100*a*, namely, invoke issuance of the request message to direct streaming of the video stream to the first media playback device 100*a* with termination of the ongoing streaming of the video stream directed to the current cast destination (S100*d*, S100*e*). A user selection of a second media playback device 100*b* on the GUI element E35*d* may invoke the cast device 100*m* changing the cast destination for streaming of the audio stream from the current device (the cast device 100*m* itself or a media playback device 100) to the selected second media playback device 100*b*, namely, invoke issuance of the request message to direct streaming of the audio stream to the second media playback device 100*b* with termination of the ongoing streaming of the audio stream directed to the current cast destination (S100*d*, S100*e*). As a result, in response to the request message, the server 200 may terminate the ongoing streaming of the video and audio streams directed to respective current cast destinations, and initiate streaming of the video and audio streams directed to the selected first and second media playback devices 100*a* and 100*b* respectively (S300, S301, S302, S303).

According to the aspects, the user may be allowed to direct streaming of the audio stream associated with voice of another user (participant in the talk) and video stream associated with images of said another user to user's desired media playback devices 100, as the user likes, in a video communication. For example, the user may be allowed to listen to said another user's voice through a speaker of the user's UE 100 itself (second media playback device 100*b*) and to watch said another user's image through a display of a remote media playback device 100 (first media playback device 100*a*).

Structures of UE 100

Various structures associated with hardware components and/or software components may be adapted for the UE 100 operative as the cast device and/or media playback device. The UE 100 may be a cell phone, smartphone, tablet, laptop, personal computer (PC), personal digital assistant (PDA), smart watch, head mount display (HMD), display or monitor, loudspeaker, television set, smart TV, microphone, headphone, earphone, and other electronic devices, gadgets, appliances, etc.

FIG. 24A is a block diagram illustrating an example of the structure of the UE 100, according to some embodiments. The UE 100 may comprise a processor 1000, communication circuitry 1001, speaker 1002, microphone 1003, input device 1004, display 1005, camera 1006, video/audio input 1007, memory 1008, and bus 1009.

The processor 1000 may be a circuit, circuitry, module, or other electronically and/or mechanically structured assembly configured to control components of the UE 100. The processor 1000 may be configured generally to process instructions of computer programs stored in the memory 1008 to execute the computer programs, so as to realize a variety of functions of the UE 100. The processor 1000 may be a central processing unit (CPU), micro processing unit (MPU), digital processing unit (DSP), or another general or dedicated processing circuit.

The communication circuitry 1001 may be circuitry for establishing the WLAN communication over the LAN 2 and the Internet communication over the Internet 3. The WLAN communication may be one which is pursuant to IEEE 802.11 specifications also known as Wi-Fi, IEEE 802.15 specifications, wireless optical communication or visible light communication also known as Light Fidelity (Li-Fi), or other short-range or close-range wireless communication for local area networking. The communication circuitry 1001 may also perform a mobile communication using a multiple access protocol such as Code Division Multiple Access (CDMA) protocol to communicate over the mobile network 1, via which to communicate over the Internet 3. The communication circuitry 1001 may be a circuit designed to perform communication in accordance with a single protocol as discussed above, or a circuit or a combination of circuits designed to perform communications in accordance with multiple protocols. The communication circuitry 1001 may be used to perform the WLAN communications and Internet communications discussed above in the discovery process and cast processes.

The speaker (loudspeaker) 1002 may be a hardware component and/or circuitry configured to convert electrical signals into sound. The loudspeaker 1002 may be configured to output sound based on signals fed thereto by the processor 1000. The speaker 1002 may be used to output sound generated as a result of playback of a media content item (e.g., audio part of the media content item, an audio content item, etc.). The speaker 1002 may also be used to provide a voice user interface (VUI) or audio user interface (AUI) as the UIs discussed above. The speaker 1002 may be activated or deactivated in the process P18.

The microphone 1003 is a hardware component and/or circuitry configured to convert sound into electrical signals.

The microphone 1003 may be configured to feed the electrical signals representing the sound to the processor 1000. The microphone 1003 may be used to input voice to generate an audio content item for cast of the audio content item, for example, when the UE 100 is operative as the audio-in device in the PA system or operative as a caller in the video conference discussed above. The microphone 1003 may be activated or deactivated in the process P18.

The input device 1004 may be a circuit, circuitry, or other electronically and/or mechanically structured assembly configured to receive inputs from the user and feed signals indicative of the inputs to the processor 1000. The input 1004 may be a set of mechanical alphabetical and/or numeral keys such as a keyboard and keypad; touch-sensitive sensor configured to detect touches (i.e., taps) of a physical object such as the user's finger and stylus onto the surface of the sensor; microphone through which voice commands are inputted; or another similar type of input device. The input device 1004 may be used to input user selections through the UIs discussed above. The input device 1004 may be used to input user selections to control cast or local playback of a media content item discussed above.

The display 1005 is configured to display video (i.e., graphics) in accordance with video signals generated by and fed from the processor 1000 for visual presentation of information to the user. The display 1005 may be a liquid crystal display (LCD), electro-luminance (EL) display, or another similar type of display device. The input device 1004 and the display 1005 may be integrated with each other to constitute a touch-sensitive display (i.e., touch screen display) that is operable to provide both of display of information and reception of inputs. The display 1005 may be used to display the GUIs discussed above.

The camera 1006 may be a hardware component and/or circuitry configured to take a photo or video by capturing or recording a still image or a sequence of images. The camera 1006 may be configured to feed a video signal representing the image or images to the processor 1000. The camera 1006 may be arranged at such a position of the UE 100 as to capture an image or images of the face of a user when the user watches the display 1005, i.e., at such a position as to have the imaging direction (i.e., the optical axis of the camera 1006) substantially aligned with the display direction of the display 1005. The camera 1006 may be used to capture an image for use in the process P12. The camera 1006 may be used to capture an image to generate a video content item for cast of the video content item, for example, in the video communication discussed above.

The video/audio input 1007 may be an input port or terminal through which to receive video and/or audio signals from an external source through a cable. Reception of the video and/or audio signals through the video/audio input 1007 may be irrespective of, namely, not part of reception of cast of a media content item The video/audio input 1007 may be a TV signal input to be coupled to a TV aerial coax, though which to receive television signals for playback of a media content (TV program) represented by the television signals. TV described herein may include a terrestrial broadcasting, satellite TV, cable TV, etc. The video/audio input 1007 may be an AUX through which to normally receive audio signals from an external sound source such as a media player. The video/audio input 1007 may be the interface discussed above, to which an audio-input peripheral or audio-output peripheral can be plugged to input or output sound, for example, when the UE 100 is operative as the audio-in device or audio-out device in the PA system discussed above. Connection to an audio input or output peripheral via the video/audio input 1007 may be determined in the process P17. Audio input or output via the video/audio input 1007 may be activated or deactivated in the process P18.

The memory 1008 may be a memory device or a storage device configured to store information (i.e., digital data) therein. The memory 1008 may include primary storage accessible directly by the processor 1000 for storing information for immediate use in a computing system, and may also include secondary storage for storing information accessible indirectly via the primary storage by the processor 1000 for storing large amount of data. An example of the memory 1008 may include a volatile memory such as a random access memory (RAM) (for example, a dynamic random access memory (DRAM) or a static random access memory (SRAM)); a non-volatile memory such as a flash memory, an electrically erasable programmable read-only memory (EEPROM), a hard disc drive (HDD), and a solid state drive (SSD); and a combination thereof. A variety of data accessible by the processor 1000 may be stored on the memory 1008. An operating system (OS) and one or more computer programs (application programs or apps) designed to be executed by the processor 1000 on the OS may also be stored (installed) on the memory 1008. The app stored on the memory 1008 may include a web browser, email client, messaging app, text editor, media player, video communication app, video game app, etc., at least one of which may be a cast app for cast of a media content item, a media playback app for fetch and playback of a casted media content item, or a combination thereof. A media content item may be cached on the memory 1008 for use in the process P3. The attribute information 101 may be stored on the memory 1008. The database 102 may be stored on the memory 1008. The database 103 may be stored on the memory 1008. The background image and layout image may be stored on the memory 1008 for use in the process P12. The setting of the UE 100 may be stored on the memory 1008 for use in the processes P16, P17, and P18.

The bus 1009 may be a bus through which the components (at least processor 1000, communication circuitry 1001, speaker 1002, microphone 1003, input device 1004, display 1005, camera 1006, video/audio input 1007, and memory 1008) are connected to one another.

Computer program instructions for the cast operations according to the processes P2 (P2a, P2b, P2c) P3, P4, P5, P6, P7, P8, P9, P10, P11, P12, P13, P14, P15, P16, P17, P18, P19, P20, P21, and P22 (P22a, P22b) discussed above, which cause the UE 100 to perform the steps on the part of the UE 100 (cast device or media playback device) in the cast processes, may be present in the OS or app stored on the memory 1008. The computer program instructions may include a first part thereof that cause the UE 100 operative as the cast device to perform the steps for casting a media content item, and a second part thereof that cause the UE 100 operative as the media playback device to perform the steps for fetching and playing back a casted media content item. The first and second parts may be both included in a single OS or app. Or, the first and second parts may be separately present in forms of two different apps (e.g., the first part being in a form of a cast app, and the second part being in a form of a media playback app), in which case one or both of the apps may be stored on the memory 1008. Computer program instructions for the discovery process discussed above, which cause the UE 100 to perform the process P1, may also be present in the OS or app stored on the memory 1008.

Structures of Server 200

Various structures associated with hardware components and/or software components may be adapted for the server 200. The server 200 may be composed of a single computer or a combination of multiple computers to provide services to clients over the Internet.

FIG. 24B is a block diagram illustrating an example of the structure of the server 200, according to some embodiments. The server 200 may comprise a processor 2000, communication circuitry 2001, input device 2004, memory 2008, and bus 2009.

The processor 2000 may be a circuit, circuitry, module, or other electronically and/or mechanically structured assembly configured to control components of the server 200. The processor 2000 may be configured generally to process instructions of computer programs stored in the memory 2008 to execute the computer programs, so as to realize a variety of functions of the server 200. The processor 2000 may be a CPU, MPU, DSP, or another general or dedicated processing circuit.

The communication circuitry 2001 may be circuitry for establishing the Internet communication over the Internet 3. The communication circuitry 2001 may be used to perform the Internet communications discussed above in the cast processes.

The input device 2004 may be a circuit, circuitry, or other electronically and/or mechanically structured assembly configured to receive inputs from the user and feed signals indicative of the inputs to the processor 2000. The input 2004 may be a set of mechanical alphabetical and/or numeral keys such as a keyboard and keypad; touch-sensitive sensor configured to detect touches (i.e., taps) of a physical object such as the user's finger and stylus onto the surface of the sensor; microphone through which voice commands are inputted; or another similar type of input device.

The memory 2008 may be a memory device or a storage device configured to store information (i.e., digital data) therein. The memory 2008 may include primary storage accessible directly by the processor 2000 for storing information for immediate use in a computing system, and may also include secondary storage for storing information accessible indirectly via the primary storage by the processor 2000 for storing large amount of data. An example of the memory 2008 may include a volatile memory such as a RAM (for example, a DRAM or SRAM); a non-volatile memory such as a flash memory, EEPROM, HDD, and SSD; and a combination thereof. A variety of data accessible by the processor 2000 may be stored on the memory 2008. An OS and one or more computer programs (application programs or apps) designed to be executed by the processor 2000 on the OS may also be stored (installed) on the memory 2008. The app stored on the memory 2008 may include a streaming app for streaming an online media content item. The streaming app may be in a form of a video communication app for routing audio and video streams between a caller and callee, for the video communication discussed above. Computer program instructions for the cast operations according to the processes P2 (P2*a*, P2*b*, P2*c*) P3, P4, P5, P6, P7, P8, P9, P10, P11, P12, P13, P14, P15, P16, P17, P18, P19, P20, P21, and P22 (P22*a*, P22*b*) discussed above, which cause the server 200 to perform the steps on the part of the server 200 in the cast processes, may be present in the OS or app stored on the memory 2008.

The bus 2009 may be a bus through which the components (at least processor 2000, communication circuitry 2001, input device 2004, and memory 2008) are connected to one another.

CONCLUSION AND NOTE

As discussed above, embodiments of the present invention provides efficiency and flexibility in cast of a media content item from a UE to another UE.

Further modifications and alternative embodiments will be apparent to those skilled in the art in view of this disclosure. Accordingly, the above description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

What is claimed is:

1. A computer program product embodied on a non-transitory computer-readable medium, the computer program product including instructions which, when executed by a processor of a mobile computing device having a display, cause the mobile computing device to perform a cast method, the cast method comprising:

performing a discovery process to discover one or more media playback devices over a wireless local area network, wherein each media playback device is configured to be discovered by the mobile computing device through the discovery process and to play back a media content item casted by the mobile computing device;

storing a database listing icons for graphically representing each media playback device, wherein the icons are categorized at least into (A) a first type of icon representing a first product category of media playback device that has an audio output without a video output, (B) a second type of icon representing a second product category of media playback device that has a video output without an audio output, and (C) a third type of icon representing a third product category of media playback device that has both of audio and video outputs;

identifying at least one target media playback device out of the discovered media playback devices as a destination of casting of a media content item, wherein the media content item includes one of (a) an audio content item containing an audio stream without a video stream, (b) a video content item containing a video stream without an audio stream, and (c) a movie content item containing both of audio and video streams;

casting the media content item to the target media playback device over the wireless local area network, causing the target media playback device to fetch streaming of the media content item and play back the streamed media content item, while maintaining display of a first graphical user interface (GUI) on the display, allowing a user to monitor and control the casting through the first GUI, wherein the casting comprises one of (a) casting the audio stream of the audio content item to the target media playback device, (b) casting the video stream of the video content item to the target media playback device, (c1) casting only one of audio and video streams of the movie content item to the target media playback device while playing back locally the other of audio and video streams of the movie content item, and (c2) casting both of audio and video streams of the movie content item to the target media playback device; and when the casted media content item is being played back by the target media playback device, controlling the ongoing casting in response to a user input on the first GUI, wherein:

identifying at least one target media playback device comprises:

displaying one or more first icons representing the discovered one or more media playback devices respectively, wherein each first icon uses one of the first, second, and third types of icon with reference to the database depending on a product category of the discovered media playback device represented by the first icon;

displaying, on a same screen as the first icons, one or more second icons representing one or more playable media content items respectively, along with the one or more first icons;

in response to a user's linkage operation of linking a selected one of the first icons with a selected one of the second icons, identifying a media playback device corresponding to the linked first icon as the target media playback device for a media content item corresponding to the linked second icon, wherein the casting is restricted if (i) a media playback device represented by a first icon using the first type of icon is identified as the target media playback device for a video content item represented by a second icon as a result of the user's linkage operation or (ii) a media playback device represented by a first icon using the second type of icon is identified as the target media playback device for an audio content item represented by a second icon as a result of the user's linkage operation.

2. The computer program product according to claim 1, wherein the user's linkage operation to link the selected first and second icons with one another comprises drag-and-dropping one of the selected first icon and selected second icon onto the other of the selected first icon and second icon.

3. The computer program product according to claim 1, wherein the user's linkage operation to link the selected first and second icons with one another comprises selecting one of the selected first icon and second icon and then subsequently selecting the other of the selected first icon and selected second icon within a predetermined time period.

4. The computer program product according to claim 1, wherein a visual indication is provided to indicate a linkage relationship of the linked first icon and linked second icon.

5. The computer program product according to claim 4, wherein the visual indication is provided by (I) circling the linked first icon and linked second icon together or (II) drawing a line between the linked first icon and linked second icon.

6. The computer program product according to claim 1, wherein the linked first icon and linked second icon are displayed closely together to visually indicate a linkage relationship of the linked first icon and linked second icon.

7. The computer program product according to claim 6, wherein the linked first icon and linked second are displayed in a manner where the linked first icon and linked second icon at least partly overlap one another.

8. The computer program product according to claim 1, wherein identifying at least one target media playback device further comprises: displaying a background image that graphically represents an actual space in which the discovered media playback devices reside such that the first icons are displayed inside the background image while the second icons are displayed outside the background image, allowing for the user's linkage operation to link the selected first and second icons together by (I) drag-and-dropping the selected second icon onto the selected first icon from outside to inside of the background image or (II) selecting one of the selected first icon and the selected second icon and then subsequently selecting the other of the selected first icon and the selected second icon within a predetermined time period.

9. The computer program product according to claim 8, wherein: firstly, the background image is displayed without the first icons or second icons thereon while the first icons are displayed outside the background image, allowing the user to place the first icons on respective desirable positions inside the background image by moving each first icon to a desirable position inside the background image from outside of the background image; and secondly, after all of the first icons are placed on the respective desirable positions inside the background image, the second icons are displayed outside the background image to receive the user's linkage operation to link the first and second icons together (I) by drag-and-dropping the selected second icon onto the selected first icon from outside to inside of the background image or (II) selecting one of the selected first icon and the selected second icon and then subsequently selecting the other of the selected first icon and the selected second icon within a predetermined time period.

10. The computer program product according to claim 1, wherein controlling the ongoing casting comprises: in response to a user selection of the linked first icon or linked second icon while cast of the media content item represented by the linked second icon destined to the media playback device represented by the linked first icon is in progress, popping up a GUI element for control of the ongoing casting, wherein the controlling comprises fast-forwarding, rewinding, pausing, or stopping ongoing streaming of the casted media content item.

11. The computer program product according to claim 1, wherein casting the media content item comprises: sending streaming of the media content item resident on the mobile computing device directly to the target media playback device over the wireless local area network, causing the target media playback device to receive the streaming of the media content item, and wherein the controlling the ongoing casting comprises: fast-forwarding, rewinding, pausing, or stopping the ongoing streaming of the media content item.

12. The computer program product according to claim 1, wherein casting the media content item comprises: issuing a streaming request message to the target media playback device over the wireless local area network, wherein the streaming request message indicates an identification of the media content item resident on a server computer accessible over the internet, causing the target media playback device to respond to the streaming request message by requesting the server computer for initiation of streaming of the media content item over an internet communication, so that the target media playback device receives streaming of the media content item initiated by the server computer over the internet, and wherein the controlling the ongoing casting comprises: issuing a control request message to the target media playback device over the wireless local area network, wherein the control request message indicates one of fast-forwarding, rewinding, pause, and stop, causing the target media playback device to respond to the control request message by requesting the server computer for fast-forwarding, rewinding, pause, or stop of the ongoing streaming over the internet communication.

13. A computer program product embodied on a non-transitory computer-readable medium, the computer program product including instructions which, when executed by a processor of a mobile computing device having a display, cause the mobile computing device to perform a cast method, the cast method comprising:

performing a discovery process to discover one or more media playback devices over a wireless local area network, wherein each media playback device is configured to be discovered by the mobile computing device through the discovery process and to play back a media content item casted by the mobile computing device;

storing a database listing icons for graphically representing each media playback device, wherein the icons are categorized at least into (A) a first type of icon representing a first product category of media playback device that has an audio output without a video output and (B) a second type of icon representing a second product category of media playback device that has both of audio and video outputs;

identifying at least one target media playback device out of the discovered media playback devices as a destination of casting of a media content item, wherein the media content item includes one of (a) an audio content item containing an audio stream without a video stream, (b) a video content item containing a video stream without an audio stream, and (c) a movie content item containing both of audio and video streams;

casting the media content item to the target media playback device over the wireless local area network, causing the target media playback device to fetch streaming of the media content item and play back the streamed media content item, while maintaining display of a first graphical user interface (GUI) on the display, allowing a user to monitor and control the casting through the first GUI, wherein the casting comprises one of (a) casting the audio stream of the audio content item to the target media playback device, (b) casting the video stream of the video content item to the target media playback device, (c1) casting only one of audio and video streams of the movie content item to the target media playback device while playing back locally the other of audio and video streams of the movie content item, and (c2) casting both of audio and video streams of the movie content item to the target media playback device; and when the casted media content item is being played back by the target media playback device, controlling the ongoing casting in response to a user input on the first GUI, wherein:

identifying at least one target media playback device comprises:

displaying one or more first icons representing the discovered one or more media playback devices respectively, wherein each first icon uses one of the first and second types of icon with reference to the database depending on a product category of the discovered media playback device represented by the first icon;

displaying, on a same screen as the first icons, one or more second icons representing one or more playable media content items respectively, along with the one or more first icons;

in response to a user's linkage operation of linking a selected one of the first icons with a selected one of the second icons, identifying a media playback device corresponding to the linked first icon as the target media playback device for a media content item corresponding to the linked second icon, wherein the casting is restricted if (i) a media playback device represented by a first icon using the first type of icon is identified as the target media playback device for a video content item represented by a second icon as a result of the user's linkage operation.

14. A computer program product embodied on a non-transitory computer-readable medium, the computer program product including instructions which, when executed by a processor of a mobile computing device having a display, cause the mobile computing device to perform a cast method, the cast method comprising:

performing a discovery process to discover one or more media playback devices over a wireless local area network, wherein each media playback device is configured to be discovered by the mobile computing device through the discovery process and to play back a media content item casted by the mobile computing device;

storing a database listing icons for graphically representing each media playback device, wherein the icons are categorized at least into (A) a first type of icon representing a first product category of media playback device that has audio playback capability without video playback capability and (B) a second type of icon representing a second product category of media playback device that has both of audio playback capability and video playback capability;

identifying at least one target media playback device out of the discovered media playback devices as a destination of casting of a media content item, wherein the media content item includes one of (a) an audio content item containing an audio stream without a video stream, (b) a video content item containing a video stream without an audio stream, and (c) a movie content item containing both of audio and video streams;

casting the media content item to the target media playback device over the wireless local area network, causing the target media playback device to fetch streaming of the media content item and play back the streamed media content item, while maintaining display of a first graphical user interface (GUI) on the display, allowing a user to monitor and control the casting through the first GUI, wherein the casting comprises one of (a) casting the audio stream of the audio content item to the target media playback device, (b) casting the video stream of the video content item to the target media playback device, (c1) casting only one of audio and video streams of the movie content item to the target media playback device while playing back locally the other of audio and video streams of the movie content item, and (c2) casting both of audio and video streams of the movie content item to the target media playback device; and when the casted media content item is being played back by the target media playback device, controlling the ongoing casting in response to a user input on the first GUI, wherein:

identifying at least one target media playback device comprises:

displaying one or more first icons representing the discovered one or more media playback devices respectively, wherein each first icon uses one of the first and second types of icon with reference to the database depending on a product category of the discovered media playback device represented by the first icon;

displaying, on a same screen as the first icons, one or more second icons representing one or more playable media content items respectively, along with the one or more first icons;

in response to a user's linkage operation of linking a selected one of the first icons with a selected one of the second icons, identifying a media playback device corresponding to the linked first icon as the target media playback device for a media content item corresponding to the linked second icon, wherein the casting is restricted if (i) the identified target media playback device corresponding to the linked first icon is determined not to accept a format of the media content item corresponding to the linked second icon with reference to the database.

\* \* \* \* \*